US009495375B2

(12) United States Patent
Huang et al.

(10) Patent No.: US 9,495,375 B2
(45) Date of Patent: Nov. 15, 2016

(54) BATTERY PACK WITH SUPPLEMENTAL MEMORY

(71) Applicant: MOPHIE, INC., Tustin, CA (US)

(72) Inventors: Daniel Huang, Irvine, CA (US); Andrew Michael Theis, Costa Mesa, CA (US);
(Continued)

(73) Assignee: mophie, inc., Tustin, CA (US)

( * ) Notice: Subject to any disclaimer, the term of this patent is extended or adjusted under 35 U.S.C. 154(b) by 0 days.

(21) Appl. No.: 14/553,944

(22) Filed: Nov. 25, 2014

(65) Prior Publication Data

US 2015/0148093 A1    May 28, 2015

Related U.S. Application Data

(60) Provisional application No. 61/909,578, filed on Nov. 27, 2013, provisional application No. 62/019,824, filed on Jul. 1, 2014.

(51) Int. Cl.
*H04B 7/00* (2006.01)
*G06F 17/30* (2006.01)
(Continued)

(52) U.S. Cl.
CPC .... *G06F 17/30106* (2013.01); *H04M 1/72527* (2013.01); *H04W 52/0225* (2013.01);
(Continued)

(58) Field of Classification Search
CPC ........... H04M 1/0262; H04M 2250/14; H04M 1/0254; H04M 1/026
(Continued)

(56) References Cited

U.S. PATENT DOCUMENTS

| 4,028,515 A | 6/1977 | Desio et al. |
| D267,795 S | 2/1983 | Mallon |

(Continued)

FOREIGN PATENT DOCUMENTS

| CN | 201252577 Y | 6/2009 |
| CN | 301573426 S | 6/2011 |

(Continued)

OTHER PUBLICATIONS

International Search Report and Written Opinion of the International Searching Authority for PCT/US2011/037244, dated Jul. 19, 2011.

(Continued)

*Primary Examiner* — Keith Ferguson
(74) *Attorney, Agent, or Firm* — Knobbe, Martens, Olson & Bear, LLP

(57) ABSTRACT

Features are disclosed relating to a case for a mobile device that provides supplemental battery power and supplemental storage space to the mobile device. Additional features are disclosed relating to an external storage device that can provide supplemental battery power and/or supplemental storage space for one or more devices. Further features are disclosed relating sharing and searching for files. Files may be shared across multiple (e.g., two or more) devices, operated by or associated with multiple users, providing multiple file storage locations. Files may be searched across the multiple devices using, e.g., search terms, tags, and/or other search options. Searching may also be performed with respect to activities performed in connection with subject files.

23 Claims, 13 Drawing Sheets

(72) Inventors: Edward Daniel Suski, Mission Viejo, CA (US); Steven Yu-Chuan Chou, Arcadia, CA (US); Dan Michael Kim, Santa Ana, CA (US); Kyle Andrew Roderick, Brea, CA (US); Kerloss Sadek, Corona, CA (US); Vannin Gale, Anaheim Hills, CA (US); Daoyuan Zhai, Irvine, CA (US)

(51) Int. Cl.
*H04W 52/02* (2009.01)
*H04M 1/725* (2006.01)
*H04M 1/02* (2006.01)
*H04W 28/14* (2009.01)

(52) U.S. Cl.
CPC .......... *H04M 1/0262* (2013.01); *H04W 28/14* (2013.01); *Y02B 60/50* (2013.01); *Y10T 29/49826* (2015.01)

(58) Field of Classification Search
USPC ............ 455/522, 69, 68, 558, 556.1, 556.2, 455/522.1, 553.1, 550.1, 90.3, 90.2, 575.1, 455/412.1, 412.2, 73, 74, 422.1, 403, 426.1, 455/426.2; 320/14, 112; 379/433.01, 379/433.09, 440
See application file for complete search history.

(56) References Cited

U.S. PATENT DOCUMENTS

| | | |
|---|---|---|
| 4,479,596 A | 10/1984 | Swanson |
| 4,515,272 A | 5/1985 | Newhouse |
| D284,372 S | 6/1986 | Carpenter |
| D300,831 S | 4/1989 | Jenkinds et al. |
| D303,799 S | 10/1989 | Fennell et al. |
| 4,951,817 A | 8/1990 | Barletta et al. |
| D312,534 S | 12/1990 | Nelson et al. |
| 5,001,772 A | 3/1991 | Holcomb et al. |
| D322,719 S | 12/1991 | Jayez |
| D327,868 S | 7/1992 | Oka |
| 5,360,108 A | 11/1994 | Alagia |
| 5,368,159 A | 11/1994 | Doria |
| 5,383,091 A | 1/1995 | Snell |
| 5,386,084 A | 1/1995 | Risko |
| 5,508,123 A | 4/1996 | Fan |
| D372,896 S | 8/1996 | Nagele et al. |
| 5,586,002 A | 12/1996 | Notarianni |
| 5,604,050 A | 2/1997 | Brunette et al. |
| 5,610,979 A | 3/1997 | Yu |
| 5,648,712 A | 7/1997 | Hahn |
| D384,327 S | 9/1997 | Nakui |
| 5,708,707 A | 1/1998 | Halttunen et al. |
| 5,711,013 A | 1/1998 | Collett et al. |
| D392,248 S | 3/1998 | Johansson |
| D392,939 S | 3/1998 | Finke-Anlauff |
| 5,786,106 A | 7/1998 | Armani |
| D400,162 S | 10/1998 | Lam |
| D400,163 S | 10/1998 | Lam |
| 5,816,459 A | 10/1998 | Armistead |
| D400,495 S | 11/1998 | Deslyper et al. |
| D400,496 S | 11/1998 | Barber et al. |
| 5,859,481 A | 1/1999 | Banyas |
| 5,864,766 A | 1/1999 | Chiang |
| D405,801 S | 2/1999 | Nagele et al. |
| D407,063 S | 3/1999 | Reis, Jr. et al. |
| 5,876,351 A | 3/1999 | Rohde |
| D407,708 S | 4/1999 | Nagele et al. |
| 5,896,277 A | 4/1999 | Leon et al. |
| 5,932,855 A | 8/1999 | Wang et al. |
| 5,959,433 A | 9/1999 | Rohde |
| 5,973,477 A | 10/1999 | Chang |
| D417,189 S | 11/1999 | Amero, Jr. et al. |
| 6,043,626 A | 3/2000 | Snyder et al. |
| D424,512 S | 5/2000 | Ho |
| 6,069,332 A | 5/2000 | Suchanek et al. |
| D427,193 S | 6/2000 | Fedele |
| 6,081,595 A | 6/2000 | Picaud |
| D428,019 S | 7/2000 | Amron |
| 6,082,535 A | 7/2000 | Mitchell |
| D436,596 S | 1/2001 | Ito et al. |
| 6,171,138 B1 | 1/2001 | Lefebvre et al. |
| D438,004 S | 2/2001 | Watson et al. |
| 6,184,654 B1 | 2/2001 | Bachner, III et al. |
| D439,218 S | 3/2001 | Yu |
| 6,201,867 B1 | 3/2001 | Koike |
| 6,208,115 B1 | 3/2001 | Binder |
| 6,266,539 B1 | 7/2001 | Pardo |
| D446,497 S | 8/2001 | Yu |
| 6,273,252 B1 | 8/2001 | Mitchell |
| D447,462 S | 9/2001 | Kosiba |
| 6,313,982 B1 | 11/2001 | Hino |
| 6,317,313 B1 | 11/2001 | Mosgrove et al. |
| 6,324,380 B1 | 11/2001 | Kiuchi et al. |
| 6,346,791 B1 | 2/2002 | Barguirdjian |
| 6,405,056 B1 | 6/2002 | Altschul et al. |
| D460,411 S | 7/2002 | Wang |
| D460,761 S | 7/2002 | Croley |
| 6,415,138 B2 | 7/2002 | Sirola et al. |
| 6,445,577 B1 | 9/2002 | Madsen et al. |
| 6,471,056 B1 | 10/2002 | Tzeng |
| D469,427 S | 1/2003 | Ma et al. |
| 6,536,589 B2 | 3/2003 | Chang |
| 6,538,413 B1 | 3/2003 | Beard et al. |
| D472,384 S | 4/2003 | Richardson |
| 6,552,513 B1 | 4/2003 | Li |
| 6,555,990 B1 | 4/2003 | Yang |
| 6,583,601 B2 | 6/2003 | Simoes et al. |
| 6,594,472 B1 | 7/2003 | Curtis et al. |
| 6,614,722 B2 | 9/2003 | Polany et al. |
| 6,626,362 B1 | 9/2003 | Steiner et al. |
| D481,716 S | 11/2003 | He et al. |
| D482,529 S | 11/2003 | Hardigg et al. |
| 6,646,864 B2 | 11/2003 | Richardson |
| 6,650,085 B2 | 11/2003 | Lau et al. |
| D484,874 S | 1/2004 | Chang et al. |
| D485,834 S | 1/2004 | Davetas |
| 6,681,003 B2 | 1/2004 | Linder et al. |
| D487,458 S | 3/2004 | Gentil et al. |
| 6,701,159 B1 | 3/2004 | Powell |
| 6,708,887 B1 | 3/2004 | Garrett et al. |
| 6,714,802 B1 | 3/2004 | Barvesten |
| 6,785,566 B1 | 8/2004 | Irizarry |
| D496,029 S | 9/2004 | Skulley et al. |
| 6,819,549 B1 | 11/2004 | Lammers-Meis et al. |
| D500,041 S | 12/2004 | Tsujimoto |
| D503,679 S | 4/2005 | Andre et al. |
| D506,612 S | 6/2005 | Rosa et al. |
| D508,495 S | 8/2005 | Bone et al. |
| D513,123 S | 12/2005 | Richardson et al. |
| 6,980,777 B2 | 12/2005 | Shepherd et al. |
| D513,451 S | 1/2006 | Richardson et al. |
| D513,617 S | 1/2006 | Tierney |
| 6,992,461 B2 | 1/2006 | Liang et al. |
| D514,808 S | 2/2006 | Morine et al. |
| D515,500 S | 2/2006 | Khasminsky |
| D516,021 S | 2/2006 | Cheng |
| D516,309 S | 3/2006 | Richardson et al. |
| D516,553 S | 3/2006 | Richardson et al. |
| D516,554 S | 3/2006 | Richardson et al. |
| D516,807 S | 3/2006 | Richardson et al. |
| D517,007 S | 3/2006 | Yong-Jian et al. |
| D518,477 S | 4/2006 | Cheng |
| D520,502 S | 5/2006 | Xu et al. |
| D520,744 S | 5/2006 | Pangerc et al. |
| 7,050,841 B1 | 5/2006 | Onda |
| 7,069,063 B2 | 6/2006 | Halkosaari et al. |
| D525,582 S | 7/2006 | Chan |
| D525,616 S | 7/2006 | Andre et al. |
| 7,072,699 B2 | 7/2006 | Eiden |
| 7,079,879 B1 | 7/2006 | Sylvester et al. |
| 7,081,736 B2 | 7/2006 | Seil et al. |
| D526,780 S | 8/2006 | Richardson et al. |

(56) References Cited

U.S. PATENT DOCUMENTS

| | | |
|---|---|---|
| D526,958 S | 8/2006 | Shimizu |
| D529,495 S | 10/2006 | Kent et al. |
| D530,079 S | 10/2006 | Thomas et al. |
| 7,151,356 B1 | 12/2006 | Chen |
| D535,252 S | 1/2007 | Sandnes |
| 7,158,376 B2 | 1/2007 | Richardson et al. |
| 7,166,987 B2 | 1/2007 | Lee et al. |
| D537,063 S | 2/2007 | Kim et al. |
| 7,180,735 B2 | 2/2007 | Thomas et al. |
| 7,180,754 B2 | 2/2007 | Qin et al. |
| 7,194,291 B2 | 3/2007 | Peng |
| D540,539 S | 4/2007 | Gutierrez |
| 7,203,467 B2 | 4/2007 | Siddiqui |
| D542,286 S | 5/2007 | Taniyama et al. |
| D542,524 S | 5/2007 | Richardson et al. |
| D543,541 S | 5/2007 | Chung et al. |
| D544,486 S | 6/2007 | Hussaini et al. |
| 7,230,823 B2 | 6/2007 | Richardson et al. |
| D547,056 S | 7/2007 | Griffin et al. |
| D547,057 S | 7/2007 | Griffin et al. |
| D550,455 S | 9/2007 | Barnhart |
| D551,216 S | 9/2007 | Wei |
| D551,252 S | 9/2007 | Andre et al. |
| 7,266,391 B2 | 9/2007 | Warren |
| D551,856 S | 10/2007 | Ko et al. |
| D553,857 S | 10/2007 | Pendergraph et al. |
| D556,679 S | 12/2007 | Weinstein et al. |
| D556,681 S | 12/2007 | Kim |
| D557,205 S | 12/2007 | Kim |
| D557,264 S | 12/2007 | Richardson et al. |
| D557,494 S | 12/2007 | Mayette et al. |
| D557,897 S | 12/2007 | Richardson et al. |
| 7,312,984 B2 | 12/2007 | Richardson et al. |
| D558,667 S | 1/2008 | Park et al. |
| D558,757 S | 1/2008 | Andre et al. |
| D558,972 S | 1/2008 | Oh |
| D558,973 S | 1/2008 | Hussaini et al. |
| D559,267 S | 1/2008 | Griffin |
| D560,229 S | 1/2008 | Yagi |
| D560,231 S | 1/2008 | Lee |
| D561,092 S | 2/2008 | Kim |
| 7,336,973 B2 | 2/2008 | Goldthwaite et al. |
| D563,093 S | 3/2008 | Nussberger |
| 7,343,184 B2 | 3/2008 | Rostami |
| D565,291 S | 4/2008 | Brandenburg et al. |
| D565,571 S | 4/2008 | Trifilio et al. |
| D568,312 S | 5/2008 | Wang et al. |
| D569,629 S | 5/2008 | Yu et al. |
| D570,772 S | 6/2008 | Mahaffey et al. |
| D572,250 S | 7/2008 | Yang |
| D573,946 S | 7/2008 | Ledbetter et al. |
| 7,397,658 B2 | 7/2008 | Finke-Anlauff et al. |
| 7,400,917 B2 | 7/2008 | Wood et al. |
| D574,326 S | 8/2008 | Lim |
| D574,819 S | 8/2008 | Andre et al. |
| D575,056 S | 8/2008 | Tan |
| D575,729 S | 8/2008 | Nomi et al. |
| 7,428,427 B2 | 9/2008 | Brunstrom et al. |
| D577,904 S | 10/2008 | Sasaki |
| D579,902 S | 11/2008 | Kim et al. |
| D581,151 S | 11/2008 | Aipa |
| D581,155 S | 11/2008 | Richardson et al. |
| D581,421 S | 11/2008 | Richardson et al. |
| D582,149 S | 12/2008 | Tan |
| 7,464,814 B2 | 12/2008 | Carnevali |
| D584,732 S | 1/2009 | Cho et al. |
| D584,738 S | 1/2009 | Kim et al. |
| 7,479,759 B2 | 1/2009 | Vilanov et al. |
| D587,008 S | 2/2009 | Richardson et al. |
| D587,896 S | 3/2009 | Aipa |
| D588,147 S | 3/2009 | Finlayson et al. |
| D589,016 S | 3/2009 | Richardson et al. |
| D589,021 S | 3/2009 | Millora |
| D589,953 S | 4/2009 | Turner |
| 7,536,099 B2 | 5/2009 | Dalby et al. |
| D593,319 S | 6/2009 | Richardson et al. |
| D593,746 S | 6/2009 | Richardson et al. |
| D593,940 S | 6/2009 | Nomi et al. |
| D594,833 S | 6/2009 | Park |
| D594,849 S | 6/2009 | Ko |
| 7,555,325 B2 | 6/2009 | Goros |
| D597,089 S | 7/2009 | Khan et al. |
| 7,562,813 B2 | 7/2009 | Humphrey et al. |
| D597,301 S | 8/2009 | Richardson et al. |
| D598,375 S | 8/2009 | Nomi |
| D598,407 S | 8/2009 | Richardson et al. |
| D598,414 S | 8/2009 | Joung et al. |
| 7,577,462 B2 | 8/2009 | Kumar |
| D600,640 S | 9/2009 | Stein et al. |
| D600,908 S | 9/2009 | Richardson et al. |
| D601,583 S | 10/2009 | Andre et al. |
| D601,955 S | 10/2009 | Ekmekdje |
| D601,959 S | 10/2009 | Lee et al. |
| D601,960 S | 10/2009 | Dai |
| 7,609,512 B2 | 10/2009 | Richardson et al. |
| D603,334 S | 11/2009 | Suzuki |
| D603,602 S | 11/2009 | Richardson et al. |
| D603,603 S | 11/2009 | Laine et al. |
| 7,612,997 B1 | 11/2009 | Diebel et al. |
| D605,850 S | 12/2009 | Richardson et al. |
| D606,528 S | 12/2009 | Khan et al. |
| D606,529 S | 12/2009 | Ferrari et al. |
| 7,635,086 B2 | 12/2009 | Spencer, II |
| 7,638,969 B2 | 12/2009 | Woud |
| 7,647,082 B2 | 1/2010 | Holmberg |
| D609,228 S | 2/2010 | Ferrari et al. |
| D609,463 S | 2/2010 | Bullen |
| D610,538 S | 2/2010 | Wu et al. |
| 7,656,120 B2 | 2/2010 | Neu et al. |
| 7,663,878 B2 | 2/2010 | Swan et al. |
| 7,667,433 B1 | 2/2010 | Smith |
| D610,807 S | 3/2010 | Bau |
| D611,042 S | 3/2010 | Ferrari et al. |
| D611,478 S | 3/2010 | Richardson et al. |
| 7,669,829 B2 | 3/2010 | Ogatsu |
| D613,282 S | 4/2010 | Richardson et al. |
| D615,077 S | 5/2010 | Richardson et al. |
| D615,535 S | 5/2010 | Richardson et al. |
| D615,536 S | 5/2010 | Richardson et al. |
| D615,967 S | 5/2010 | Richardson et al. |
| D616,360 S | 5/2010 | Huang |
| D616,361 S | 5/2010 | Huang |
| 7,713,073 B2 | 5/2010 | Lin |
| D617,753 S | 6/2010 | Cheng |
| D617,784 S | 6/2010 | Richardson et al. |
| D617,785 S | 6/2010 | Richardson et al. |
| D617,786 S | 6/2010 | Richardson et al. |
| D617,787 S | 6/2010 | Richardson et al. |
| D618,231 S | 6/2010 | Fahrendorff et al. |
| D618,237 S | 6/2010 | Wang |
| 7,733,637 B1 | 6/2010 | Lam |
| D619,573 S | 7/2010 | Khan et al. |
| D619,574 S | 7/2010 | Richardson et al. |
| D619,991 S | 7/2010 | Huang |
| D620,000 S | 7/2010 | Bau |
| D620,487 S | 7/2010 | Richardson et al. |
| D621,394 S | 8/2010 | Richardson et al. |
| D621,395 S | 8/2010 | Richardson et al. |
| D621,821 S | 8/2010 | Richardson et al. |
| D621,822 S | 8/2010 | Richardson et al. |
| 7,778,023 B1 | 8/2010 | Mohoney |
| 7,778,410 B2 | 8/2010 | Liu et al. |
| 7,782,610 B2 | 8/2010 | Diebel et al. |
| D623,179 S | 9/2010 | Richardson et al. |
| D623,180 S | 9/2010 | Diebel |
| D623,399 S | 9/2010 | McSweyn |
| D623,638 S | 9/2010 | Richardson et al. |
| D623,639 S | 9/2010 | Richardson et al. |
| D623,640 S | 9/2010 | Freeman |
| D624,317 S | 9/2010 | Wenchel et al. |
| D624,533 S | 9/2010 | Richardson et al. |
| D624,747 S | 10/2010 | McSweyn |
| D624,908 S | 10/2010 | Huskinson |
| D624,909 S | 10/2010 | Huskinson |

(56) References Cited

U.S. PATENT DOCUMENTS

| | | |
|---|---|---|
| D624,910 S | 10/2010 | Richardson et al. |
| D625,303 S | 10/2010 | Kim |
| D626,120 S | 10/2010 | Richardson et al. |
| D626,121 S | 10/2010 | Richardson et al. |
| D626,538 S | 11/2010 | Brown et al. |
| D626,539 S | 11/2010 | Brown et al. |
| D626,540 S | 11/2010 | Brown et al. |
| D626,964 S | 11/2010 | Richardson et al. |
| D628,153 S | 11/2010 | Fujii et al. |
| 7,824,211 B1 | 11/2010 | Wu |
| D628,535 S | 12/2010 | Cheng |
| D628,568 S | 12/2010 | Richardson et al. |
| D628,572 S | 12/2010 | Wang |
| D628,994 S | 12/2010 | Griffin, Jr. et al. |
| 7,859,222 B2 | 12/2010 | Woud |
| D631,246 S | 1/2011 | Boettner |
| 7,863,856 B2 | 1/2011 | Sherman et al. |
| 7,863,862 B2 | 1/2011 | Idzik et al. |
| D631,877 S | 2/2011 | Rak et al. |
| D632,648 S | 2/2011 | Yang |
| D632,683 S | 2/2011 | Richardson et al. |
| D632,684 S | 2/2011 | Richardson et al. |
| D632,685 S | 2/2011 | Richardson et al. |
| D632,686 S | 2/2011 | Magness et al. |
| 7,889,489 B2 | 2/2011 | Richardson et al. |
| 7,889,498 B2 | 2/2011 | Diebel et al. |
| D633,493 S | 3/2011 | Akana et al. |
| D633,908 S | 3/2011 | Akana et al. |
| D634,704 S | 3/2011 | Tieleman et al. |
| D634,741 S | 3/2011 | Richardson et al. |
| 7,899,397 B2 | 3/2011 | Kumar |
| 7,907,394 B2 | 3/2011 | Richardson et al. |
| 7,911,530 B2 | 3/2011 | Sawachi |
| D635,961 S | 4/2011 | Gidden et al. |
| D636,386 S | 4/2011 | Richardson et al. |
| D636,387 S | 4/2011 | Willes et al. |
| D636,392 S | 4/2011 | Akana et al. |
| 7,930,011 B2 | 4/2011 | Shi et al. |
| 7,933,122 B2 | 4/2011 | Richardson et al. |
| D637,588 S | 5/2011 | Richardson et al. |
| D637,589 S | 5/2011 | Willes et al. |
| D637,590 S | 5/2011 | Michie et al. |
| D637,591 S | 5/2011 | Willes et al. |
| D637,592 S | 5/2011 | Magness et al. |
| D637,951 S | 5/2011 | Perez |
| D637,952 S | 5/2011 | Tan |
| D638,005 S | 5/2011 | Richardson et al. |
| D638,411 S | 5/2011 | Willes et al. |
| D638,413 S | 5/2011 | Magness et al. |
| D638,414 S | 5/2011 | Magness et al. |
| D638,828 S | 5/2011 | Melanson et al. |
| D638,829 S | 5/2011 | Melanson et al. |
| D638,830 S | 5/2011 | Magness et al. |
| D639,731 S | 6/2011 | Sun |
| D640,679 S | 6/2011 | Willes et al. |
| D640,680 S | 6/2011 | Magness et al. |
| 7,957,524 B2 | 6/2011 | Chipping |
| D641,013 S | 7/2011 | Richardson et al. |
| D641,014 S | 7/2011 | Smith et al. |
| D641,974 S | 7/2011 | Stampfli |
| D642,170 S | 7/2011 | Johnson et al. |
| D642,171 S | 7/2011 | Melanson et al. |
| D642,516 S | 8/2011 | Ueda et al. |
| D642,558 S | 8/2011 | Magness et al. |
| D643,029 S | 8/2011 | Feng |
| D643,424 S | 8/2011 | Richardson et al. |
| D643,427 S | 8/2011 | McGoldrick et al. |
| D644,215 S | 8/2011 | Dong |
| D644,216 S | 8/2011 | Richardson et al. |
| D644,219 S | 8/2011 | Sawada |
| 7,988,010 B2 | 8/2011 | Yang et al. |
| 8,004,962 B2 | 8/2011 | Yang et al. |
| D644,635 S | 9/2011 | Richardson et al. |
| D644,639 S | 9/2011 | Weller et al. |
| D645,049 S | 9/2011 | Faranda et al. |
| D645,050 S | 9/2011 | Faranda et al. |
| D647,084 S | 10/2011 | Fathollahi |
| D647,108 S | 10/2011 | Lee |
| 8,028,794 B1 | 10/2011 | Freeman |
| 8,046,039 B2 | 10/2011 | Lee et al. |
| D647,908 S | 11/2011 | Chen et al. |
| D648,270 S | 11/2011 | Jiang |
| D648,714 S | 11/2011 | Jones, III et al. |
| D648,715 S | 11/2011 | Jones, III et al. |
| D648,716 S | 11/2011 | Jones, III et al. |
| D648,717 S | 11/2011 | Fahrendorff et al. |
| D649,143 S | 11/2011 | Jones, III et al. |
| D649,539 S | 11/2011 | Hong |
| D649,932 S | 12/2011 | Symons |
| D650,810 S | 12/2011 | Lemelman et al. |
| D652,379 S | 1/2012 | Vandiver |
| D652,827 S | 1/2012 | Fahrendorff et al. |
| D652,828 S | 1/2012 | Fahrendorff et al. |
| D653,202 S | 1/2012 | Hasbrook et al. |
| D653,207 S | 1/2012 | Vandiver |
| D653,659 S | 2/2012 | Fahrendorff et al. |
| D654,069 S | 2/2012 | Kwon et al. |
| D654,483 S | 2/2012 | Richardson et al. |
| D654,852 S | 2/2012 | Hansen |
| D654,854 S | 2/2012 | Inskeep |
| D654,931 S | 2/2012 | Lemelman et al. |
| D655,281 S | 3/2012 | Turocy |
| D655,699 S | 3/2012 | Bau |
| D656,096 S | 3/2012 | Sasada et al. |
| D656,495 S | 3/2012 | Andre et al. |
| D658,165 S | 4/2012 | Freeman |
| 8,150,485 B2 | 4/2012 | Lee |
| D658,643 S | 5/2012 | Fahrendorff et al. |
| D659,094 S | 5/2012 | Brand et al. |
| 8,167,127 B2 | 5/2012 | Martin et al. |
| 8,168,319 B2 | 5/2012 | Spare et al. |
| D661,249 S | 6/2012 | Smith et al. |
| D662,050 S | 6/2012 | Tien |
| D662,904 S | 7/2012 | Wu et al. |
| D662,923 S | 7/2012 | Piedra et al. |
| D663,263 S | 7/2012 | Gupta et al. |
| D663,319 S | 7/2012 | Chen et al. |
| D663,684 S | 7/2012 | Yang |
| D663,685 S | 7/2012 | Yang |
| D663,724 S | 7/2012 | Lee |
| D664,091 S | 7/2012 | Pliner et al. |
| D664,501 S | 7/2012 | Inskeep |
| D664,502 S | 7/2012 | Inskeep |
| 8,224,408 B2 | 7/2012 | Tomasini et al. |
| D665,386 S | 8/2012 | Fathollahi |
| D665,732 S | 8/2012 | Saito et al. |
| D665,735 S | 8/2012 | Kang et al. |
| D666,144 S | 8/2012 | Brand et al. |
| 8,245,842 B2 | 8/2012 | Bau |
| 8,247,102 B2 | 8/2012 | Hua |
| D667,783 S | 9/2012 | Zhang et al. |
| D667,788 S | 9/2012 | Mai |
| D670,281 S | 11/2012 | Corpuz et al. |
| D670,689 S | 11/2012 | Wang |
| D671,096 S | 11/2012 | Song et al. |
| D671,105 S | 11/2012 | Rothbaum et al. |
| D671,106 S | 11/2012 | Rothbaum et al. |
| D671,493 S | 11/2012 | Hasbrook et al. |
| 8,321,619 B2 | 11/2012 | Kular et al. |
| D671,937 S | 12/2012 | Akana et al. |
| D672,309 S | 12/2012 | Tien |
| D672,343 S | 12/2012 | Akana et al. |
| 8,328,008 B2 | 12/2012 | Diebel et al. |
| 8,339,775 B2 | 12/2012 | Degner et al. |
| D674,394 S | 1/2013 | Kajimoto |
| D674,748 S | 1/2013 | Ferber et al. |
| D675,156 S | 1/2013 | Vandiver et al. |
| 8,342,325 B2 | 1/2013 | Rayner |
| D675,603 S | 2/2013 | Melanson et al. |
| D676,032 S | 2/2013 | Stump et al. |
| D676,380 S | 2/2013 | Sun |
| D676,432 S | 2/2013 | Hasbrook et al. |
| 8,367,235 B2 | 2/2013 | Huang |
| 8,380,264 B2 | 2/2013 | Hung et al. |

(56) References Cited

U.S. PATENT DOCUMENTS

| | | |
|---|---|---|
| D677,223 S | 3/2013 | Cho |
| D677,249 S | 3/2013 | Li et al. |
| D677,657 S | 3/2013 | Akana et al. |
| D678,187 S | 3/2013 | Huang |
| D678,869 S | 3/2013 | Diebel |
| 8,390,255 B1 | 3/2013 | Fathollahi |
| 8,393,466 B2 | 3/2013 | Rayner |
| D679,271 S | 4/2013 | Liu |
| D679,684 S | 4/2013 | Baker et al. |
| D679,699 S | 4/2013 | Piedra et al. |
| D680,063 S | 4/2013 | Sasada |
| D681,020 S | 4/2013 | Magness et al. |
| D682,196 S | 5/2013 | Leung |
| D682,197 S | 5/2013 | Leung |
| D682,202 S | 5/2013 | Weaver, Jr. et al. |
| D682,777 S | 5/2013 | Gupta et al. |
| D682,781 S | 5/2013 | Wakafuji et al. |
| D682,815 S | 5/2013 | Chang |
| D683,310 S | 5/2013 | McSweyn |
| D683,338 S | 5/2013 | Wilson et al. |
| 8,439,191 B1 | 5/2013 | Lu |
| 8,452,242 B2 | 5/2013 | Spencer, Ii |
| D684,554 S | 6/2013 | Park et al. |
| D684,571 S | 6/2013 | Akana et al. |
| 8,457,701 B2 | 6/2013 | Diebel |
| D685,356 S | 7/2013 | Diebel |
| D685,732 S | 7/2013 | Miller et al. |
| D686,150 S | 7/2013 | Lee et al. |
| D686,152 S | 7/2013 | Lee et al. |
| D686,153 S | 7/2013 | Qu |
| D686,586 S | 7/2013 | Cho |
| D686,606 S | 7/2013 | Hong |
| 8,483,758 B2 | 7/2013 | Huang |
| D687,426 S | 8/2013 | Requa |
| D688,233 S | 8/2013 | Dong |
| D688,660 S | 8/2013 | Akana et al. |
| 8,499,933 B2 | 8/2013 | Ziemba |
| 8,505,718 B2 | 8/2013 | Griffin, Jr. et al. |
| 8,509,864 B1 | 8/2013 | Diebel |
| 8,509,865 B1 | 8/2013 | Lacolla et al. |
| D689,847 S | 9/2013 | To |
| 8,531,833 B2 | 9/2013 | Diebel et al. |
| 8,541,985 B1 | 9/2013 | Wong |
| D690,693 S | 10/2013 | Akana et al. |
| D691,990 S | 10/2013 | Rayner |
| D692,379 S | 10/2013 | Bae et al. |
| 8,547,061 B1 | 10/2013 | Wong |
| 8,560,014 B1 | 10/2013 | Hu et al. |
| D692,825 S | 11/2013 | Izen et al. |
| D693,297 S | 11/2013 | Inskeep |
| D693,798 S | 11/2013 | Chuang et al. |
| D693,801 S | 11/2013 | Rayner |
| 8,579,172 B2 | 11/2013 | Monaco et al. |
| D694,703 S | 12/2013 | Faro |
| D695,214 S | 12/2013 | Roberts et al. |
| D696,234 S | 12/2013 | Wright |
| D697,502 S | 1/2014 | Chu et al. |
| D697,865 S | 1/2014 | Saito et al. |
| D698,774 S | 2/2014 | Wardy |
| D699,177 S | 2/2014 | Higashi |
| D703,652 S | 4/2014 | Melanson et al. |
| 8,687,359 B2 | 4/2014 | Theobald et al. |
| D704,135 S | 5/2014 | Stewart et al. |
| D704,182 S | 5/2014 | Smith |
| D704,688 S | 5/2014 | Reivo et al. |
| D706,255 S | 6/2014 | Akana et al. |
| D706,256 S | 6/2014 | Ward et al. |
| D706,272 S | 6/2014 | Poon |
| D709,058 S | 7/2014 | Hemesath et al. |
| D709,439 S | 7/2014 | Ferber et al. |
| D709,485 S | 7/2014 | Bishop |
| D710,344 S | 8/2014 | Smith et al. |
| D710,795 S | 8/2014 | Gupta et al. |
| D710,839 S | 8/2014 | Chang |
| D711,312 S | 8/2014 | Tien |
| D711,362 S | 8/2014 | Poon |
| D711,863 S | 8/2014 | Wen |
| D714,215 S | 9/2014 | To |
| D714,274 S | 9/2014 | Jung |
| D714,278 S | 9/2014 | Case et al. |
| 8,837,156 B2 | 9/2014 | Sun et al. |
| D716,784 S | 11/2014 | Wen |
| D716,785 S | 11/2014 | White |
| D718,230 S | 11/2014 | To et al. |
| D718,291 S | 11/2014 | Hong |
| D718,293 S | 11/2014 | Namminga et al. |
| D718,754 S | 12/2014 | To et al. |
| D718,755 S | 12/2014 | To et al. |
| 8,917,506 B2 | 12/2014 | Diebel et al. |
| D720,687 S | 1/2015 | Hasbrook |
| D720,738 S | 1/2015 | Rodriguez et al. |
| D720,740 S | 1/2015 | Wicks et al. |
| D721,328 S | 1/2015 | Freeman et al. |
| D721,356 S | 1/2015 | Hasbrook et al. |
| D721,646 S | 1/2015 | Kim |
| D721,685 S | 1/2015 | Hasbrook et al. |
| D721,687 S | 1/2015 | To et al. |
| D722,312 S | 2/2015 | Tages et al. |
| D723,018 S | 2/2015 | White |
| 8,954,117 B2 | 2/2015 | Huang |
| D723,530 S | 3/2015 | Namminga et al. |
| D724,574 S | 3/2015 | Williams |
| D725,091 S | 3/2015 | Wen |
| 8,971,039 B2 | 3/2015 | Huang et al. |
| D727,883 S | 4/2015 | Brand et al. |
| D728,467 S | 5/2015 | Hasbrook |
| D728,468 S | 5/2015 | Ferber et al. |
| D729,729 S | 5/2015 | Rabalais et al. |
| 9,026,187 B2 | 5/2015 | Huang |
| D732,012 S | 6/2015 | Tsai et al. |
| D733,043 S | 6/2015 | Hasbrook et al. |
| 9,077,013 B2 | 7/2015 | Huang et al. |
| 9,088,028 B2 | 7/2015 | Huang et al. |
| 9,088,029 B2 | 7/2015 | Huang et al. |
| D738,301 S | 9/2015 | Symons |
| D738,365 S | 9/2015 | Melanson et al. |
| D739,394 S | 9/2015 | Rayner et al. |
| 9,123,935 B2 | 9/2015 | Huang |
| D740,223 S | 10/2015 | Yoneta |
| D741,844 S | 10/2015 | Rayner et al. |
| 9,153,985 B1 | 10/2015 | Gjovik et al. |
| 9,172,070 B2 | 10/2015 | Huang et al. |
| D744,472 S | 12/2015 | Lerenthal |
| D744,989 S | 12/2015 | Lee |
| D744,993 S | 12/2015 | Diebel |
| D744,995 S | 12/2015 | Lerenthal |
| D746,273 S | 12/2015 | Herbst |
| D746,275 S | 12/2015 | Mohammad |
| D746,801 S | 1/2016 | Pan |
| D748,612 S | 2/2016 | Chan et al. |
| D749,557 S | 2/2016 | Feng |
| D751,058 S | 3/2016 | Cocchia et al. |
| D751,059 S | 3/2016 | Cocchia et al. |
| D751,542 S | 3/2016 | Daniel |
| 9,319,501 B2 | 4/2016 | Huang |
| 9,356,267 B1 | 5/2016 | To et al. |
| 2001/0019804 A1 | 9/2001 | Kurihara et al. |
| 2001/0054148 A1 | 12/2001 | Hoornaert et al. |
| 2002/0065054 A1 | 5/2002 | Humphreys et al. |
| 2002/0111189 A1 | 8/2002 | Chou |
| 2002/0147035 A1 | 10/2002 | Su |
| 2002/0193136 A1 | 12/2002 | Halkosaari et al. |
| 2002/0197965 A1 | 12/2002 | Peng |
| 2003/0000984 A1 | 1/2003 | Vick, III |
| 2003/0096642 A1 | 5/2003 | Bessa et al. |
| 2003/0151890 A1 | 8/2003 | Huang et al. |
| 2003/0217210 A1 | 11/2003 | Carau, Sr. |
| 2003/0218445 A1 | 11/2003 | Behar |
| 2003/0228866 A1 | 12/2003 | Pezeshki |
| 2004/0096054 A1 | 5/2004 | Nuovo |
| 2004/0097256 A1 | 5/2004 | Kujawski |
| 2004/0104268 A1 | 6/2004 | Bailey |
| 2004/0247113 A1 | 12/2004 | Akatsu |
| 2004/0268005 A1 | 12/2004 | Dickie |

(56) References Cited

U.S. PATENT DOCUMENTS

| | | |
|---|---|---|
| 2005/0049016 A1 | 3/2005 | Cho et al. |
| 2005/0088141 A1 | 4/2005 | Lee et al. |
| 2005/0090301 A1 | 4/2005 | Lange et al. |
| 2005/0093510 A1 | 5/2005 | Seil et al. |
| 2005/0116684 A1 | 6/2005 | Kim |
| 2005/0130721 A1 | 6/2005 | Gartrell |
| 2005/0231159 A1 | 10/2005 | Jones et al. |
| 2005/0247787 A1 | 11/2005 | Von Mueller et al. |
| 2005/0248312 A1 | 11/2005 | Cao et al. |
| 2005/0286212 A1 | 12/2005 | Brignone et al. |
| 2006/0010588 A1 | 1/2006 | Schuster et al. |
| 2006/0052064 A1 | 3/2006 | Goradesky |
| 2006/0058073 A1 | 3/2006 | Kim |
| 2006/0063569 A1 | 3/2006 | Jacobs et al. |
| 2006/0099999 A1 | 5/2006 | Park |
| 2006/0105722 A1 | 5/2006 | Kumar |
| 2006/0105824 A1 | 5/2006 | Kim et al. |
| 2006/0125445 A1 | 6/2006 | Cao et al. |
| 2006/0140461 A1 | 6/2006 | Kim et al. |
| 2006/0197674 A1 | 9/2006 | Nakajima |
| 2006/0205447 A1 | 9/2006 | Park et al. |
| 2006/0255493 A1 | 11/2006 | Fouladpour |
| 2007/0004450 A1 | 1/2007 | Parikh |
| 2007/0030711 A1 | 2/2007 | Liu |
| 2007/0093140 A1 | 4/2007 | Begic et al. |
| 2007/0123316 A1 | 5/2007 | Little |
| 2007/0142097 A1 | 6/2007 | Hamasaki et al. |
| 2007/0152633 A1 | 7/2007 | Lee |
| 2007/0161404 A1 | 7/2007 | Yasujima et al. |
| 2007/0167190 A1 | 7/2007 | Moosavi et al. |
| 2007/0187563 A1 | 8/2007 | Ogatsu |
| 2007/0225031 A1 | 9/2007 | Bodkin et al. |
| 2007/0236180 A1 | 10/2007 | Rodgers |
| 2007/0261978 A1 | 11/2007 | Sanderson |
| 2007/0263366 A1 | 11/2007 | Wu et al. |
| 2007/0264535 A1 | 11/2007 | Lee et al. |
| 2007/0297149 A1 | 12/2007 | Richardson et al. |
| 2008/0007214 A1 | 1/2008 | Cheng |
| 2008/0015717 A1 | 1/2008 | Griffin et al. |
| 2008/0026794 A1 | 1/2008 | Warren |
| 2008/0026803 A1 | 1/2008 | Demuynck |
| 2008/0032758 A1 | 2/2008 | Rostami |
| 2008/0058010 A1 | 3/2008 | Lee |
| 2008/0096620 A1 | 4/2008 | Lee et al. |
| 2008/0108395 A1 | 5/2008 | Lee et al. |
| 2008/0119244 A1 | 5/2008 | Malhotra |
| 2008/0123287 A1 | 5/2008 | Rossell et al. |
| 2008/0132289 A1 | 6/2008 | Wood et al. |
| 2008/0139258 A1 | 6/2008 | Park et al. |
| 2008/0150367 A1 | 6/2008 | Oh et al. |
| 2008/0164790 A1 | 7/2008 | Tsang et al. |
| 2009/0009945 A1 | 1/2009 | Johnson et al. |
| 2009/0017883 A1 | 1/2009 | Lin |
| 2009/0051319 A1 | 2/2009 | Fang et al. |
| 2009/0069050 A1 | 3/2009 | Jain et al. |
| 2009/0073650 A1 | 3/2009 | Huang et al. |
| 2009/0096417 A1 | 4/2009 | Idzik et al. |
| 2009/0108800 A1 | 4/2009 | Woud |
| 2009/0111543 A1 | 4/2009 | Tai et al. |
| 2009/0114556 A1 | 5/2009 | Tai et al. |
| 2009/0117955 A1 | 5/2009 | Lo |
| 2009/0128092 A1 | 5/2009 | Woud |
| 2009/0143104 A1 | 6/2009 | Loh et al. |
| 2009/0144456 A1 | 6/2009 | Gelf et al. |
| 2009/0146898 A1 | 6/2009 | Akiho et al. |
| 2009/0152089 A1 | 6/2009 | Hanes |
| 2009/0160399 A1 | 6/2009 | Woud |
| 2009/0160400 A1 | 6/2009 | Woud |
| 2009/0181729 A1 | 7/2009 | Griffin, Jr. et al. |
| 2009/0186264 A1 | 7/2009 | Huang |
| 2009/0205983 A1 | 8/2009 | Estlander |
| 2009/0246621 A1 | 10/2009 | Miebori |
| 2009/0247244 A1 | 10/2009 | Mittleman et al. |
| 2009/0284216 A1 | 11/2009 | Bessa et al. |
| 2009/0301289 A1 | 12/2009 | Gynes |
| 2009/0312058 A9 | 12/2009 | Wood et al. |
| 2009/0314400 A1 | 12/2009 | Liu |
| 2009/0325657 A1 | 12/2009 | Ramsdell et al. |
| 2010/0005225 A1* | 1/2010 | Honda ................. G06F 3/0607 711/103 |
| 2010/0013431 A1 | 1/2010 | Liu |
| 2010/0022277 A1 | 1/2010 | An et al. |
| 2010/0026589 A1 | 2/2010 | Dou et al. |
| 2010/0048267 A1 | 2/2010 | Lin |
| 2010/0056054 A1 | 3/2010 | Yamato et al. |
| 2010/0064883 A1 | 3/2010 | Gynes |
| 2010/0078343 A1 | 4/2010 | Hoellwarth et al. |
| 2010/0088439 A1 | 4/2010 | Ang et al. |
| 2010/0093412 A1 | 4/2010 | Serra et al. |
| 2010/0096284 A1 | 4/2010 | Bau |
| 2010/0113106 A1 | 5/2010 | Supran |
| 2010/0117597 A1 | 5/2010 | Wang |
| 2010/0132724 A1 | 6/2010 | Seidel et al. |
| 2010/0154062 A1 | 6/2010 | Baram et al. |
| 2010/0190046 A1 | 7/2010 | Chen et al. |
| 2010/0195279 A1 | 8/2010 | Michael |
| 2010/0200456 A1 | 8/2010 | Parkinson |
| 2010/0203931 A1 | 8/2010 | Hynecek et al. |
| 2010/0224519 A1 | 9/2010 | Kao |
| 2010/0243516 A1 | 9/2010 | Martin et al. |
| 2010/0302716 A1 | 12/2010 | Gandhi |
| 2010/0328203 A1 | 12/2010 | Hsu |
| 2011/0021255 A1 | 1/2011 | Kim et al. |
| 2011/0034221 A1 | 2/2011 | Hung et al. |
| 2011/0049005 A1 | 3/2011 | Wilson et al. |
| 2011/0055447 A1 | 3/2011 | Costa |
| 2011/0084081 A1 | 4/2011 | Chung et al. |
| 2011/0090626 A1 | 4/2011 | Hoellwarth et al. |
| 2011/0117974 A1 | 5/2011 | Spitalnik et al. |
| 2011/0136555 A1 | 6/2011 | Ramies et al. |
| 2011/0199041 A1 | 8/2011 | Yang |
| 2011/0215767 A1 | 9/2011 | Johnson et al. |
| 2011/0253569 A1 | 10/2011 | Lord |
| 2011/0259664 A1 | 10/2011 | Freeman |
| 2011/0261511 A1 | 10/2011 | Alderson et al. |
| 2011/0297578 A1 | 12/2011 | Stiehl et al. |
| 2011/0309728 A1 | 12/2011 | Diebel |
| 2012/0013295 A1 | 1/2012 | Yeh |
| 2012/0032830 A1 | 2/2012 | Yamamoto |
| 2012/0071214 A1 | 3/2012 | Ash, Jr. et al. |
| 2012/0088555 A1 | 4/2012 | Hu |
| 2012/0088558 A1 | 4/2012 | Song |
| 2012/0115551 A1 | 5/2012 | Cho et al. |
| 2012/0122520 A1 | 5/2012 | Phillips |
| 2012/0161696 A1 | 6/2012 | Cook et al. |
| 2012/0177967 A1 | 7/2012 | Wang |
| 2012/0209745 A1 | 8/2012 | Spencer, II |
| 2012/0258629 A1 | 10/2012 | Kemp |
| 2012/0282977 A1 | 11/2012 | Haleluk |
| 2012/0320501 A1 | 12/2012 | Ackloo |
| 2012/0325637 A1 | 12/2012 | Kikuchi |
| 2013/0023313 A1 | 1/2013 | Kim |
| 2013/0045775 A1 | 2/2013 | Heywood |
| 2013/0084799 A1 | 4/2013 | Marholev et al. |
| 2013/0098790 A1 | 4/2013 | Hong et al. |
| 2013/0125251 A1 | 5/2013 | Johnson |
| 2013/0189923 A1 | 7/2013 | Lewin |
| 2013/0193911 A1 | 8/2013 | Miller et al. |
| 2013/0210475 A1 | 8/2013 | Nylund |
| 2013/0248339 A1 | 9/2013 | Koepsell |
| 2013/0273983 A1 | 10/2013 | Hsu |
| 2013/0307818 A1 | 11/2013 | Pope et al. |
| 2013/0314030 A1 | 11/2013 | Fathollahi |
| 2013/0318282 A1* | 11/2013 | Wakutsu ............. G06F 12/0246 711/102 |
| 2014/0035511 A1 | 2/2014 | Ferber et al. |
| 2014/0042969 A1 | 2/2014 | Miller et al. |
| 2014/0051292 A1 | 2/2014 | Weaver, Jr. et al. |
| 2014/0065948 A1* | 3/2014 | Huang ................. H05K 5/0086 455/7 |
| 2014/0069825 A1 | 3/2014 | Macrina et al. |
| 2014/0147704 A1 | 5/2014 | Roh |
| 2014/0165379 A1 | 6/2014 | Diebel et al. |
| 2014/0199570 A1 | 7/2014 | Cho |

(56) References Cited

U.S. PATENT DOCUMENTS

| | | | |
|---|---|---|---|
| 2014/0239276 A1 | 8/2014 | Lin et al. |
| 2014/0239916 A1 | 8/2014 | To et al. |
| 2014/0268518 A1 | 9/2014 | Huang et al. |
| 2014/0329116 A1 | 11/2014 | Byun |
| 2014/0375182 A1 | 12/2014 | Li et al. |
| 2015/0140386 A1 | 5/2015 | Huang et al. |
| 2015/0141090 A1 | 5/2015 | Hwan et al. |
| 2015/0151402 A1 | 6/2015 | Cazzoli et al. |
| 2015/0214993 A1 | 7/2015 | Huang |
| 2015/0281410 A1 | 10/2015 | Takahashi |
| 2015/0295439 A1 | 10/2015 | Huang et al. |
| 2015/0381226 A1 | 12/2015 | Mogol |
| 2016/0043764 A1 | 2/2016 | Huang |

FOREIGN PATENT DOCUMENTS

| | | |
|---|---|---|
| CN | 202364273 U | 8/2012 |
| CN | 202424278 U | 9/2012 |
| CN | 302063473 S | 9/2012 |
| CN | 302063476 S | 9/2012 |
| CN | 202535667 U | 11/2012 |
| CN | 302510329 S | 7/2013 |
| CN | 302535056 S | 8/2013 |
| CN | 302573150 S | 9/2013 |
| EP | 1732291 A1 | 12/2006 |
| JP | 8-18637 | 1/1996 |
| JP | 2000-175720 | 6/2000 |
| JP | D1459213 | 1/2013 |
| JP | D1474456 | 7/2013 |
| JP | D1474533 | 7/2013 |
| JP | D1474534 | 7/2013 |
| KR | 10-2005-0027961 | 3/2005 |
| KR | 10-2008-0017688 | 2/2008 |
| KR | 20-2010-0005030 | 5/2010 |
| KR | 10-2010-0132724 | 12/2010 |
| KR | 10-2011-0005507 | 1/2011 |
| KR | 10-2011-0062089 | 6/2011 |
| KR | 30-0650361 | 7/2012 |
| TW | D150044 | 11/2012 |
| TW | D156538 | 10/2013 |
| WO | WO 95/15619 | 6/1995 |
| WO | WO 97/33497 | 9/1997 |
| WO | WO 03/065227 A1 | 8/2003 |
| WO | WO 08/151362 A2 | 12/2008 |

OTHER PUBLICATIONS

International Preliminary Report on Patentability for PCT/US2011/037244, dated Nov. 29, 2012.
International Search Report and Written Opinion of the International Searching Authority for PCT/US2011/037249, dated Jul. 13, 2011.
International Preliminary Report on Patentability for PCT/US2011/037249, dated Nov. 29, 2012.
International Search Report and Written Opinion of the International Searching Authority for PCT/US2011/037254, dated Jul. 13, 2011.
International Preliminary Report on Patentability for PCT/US2011/037254, dated Nov. 29, 2012.
International Search Report and Written Opinion of the International Searching Authority for PCT/US2011/037257, dated Sep. 22, 2011.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
International Preliminary Report on Patentability for PCT/US2013/057276, dated Mar. 3, 2015.
International Search Report and Written Opinion of the International Searching Authority for PCT/US2014/017781, dated Jun. 8, 2014.
International Preliminary Report on Patentability for PCT/US2014/017781, dated Aug. 25, 2015.
International Search Report and Written Opinion of the International Searching Authority for PCT/US2014/023592, dated Aug. 28, 2014.
International Preliminary Report on Patentability for PCT/US2014/023592, dated Sep. 15, 2015.
International Search Report and Written Opinion for PCT/US2014/067470, dated Mar. 31, 2015.
International Preliminary Report of Patentability for PCT/US2014/067470, dated Jun. 9, 2016.
International Search Report and Written Opinion for PCT/US2015/065800, dated Apr. 21, 2016.
Mophie Pulse for iPod Touch 4G, http://www.mophie.com/pulse—iPod—Touch—4th—Genvibrating—gaming—case—p/2015_PUL—T4—Gry.htm.
"Sandberg BatteryCase for iPhone 4/4S delivers more band for your buck," dated Mar. 15, 2012, http://www.gizmag.com/sanberg—batterycase—iphone/21839.
Shawn Brown, "Incase Power Slider battery doubles as a case," dated Nov. 19, 2008, http://www.iphonebuzz.com/incase—power—slider—battery—doubles—as—a—case—195224.php.
Nick Guy, "Incipio offGRID Battery Case for iPhone 5/5s," dated Oct. 9, 2013, http://www.ilounge.com/index.php/reviews/entry/incipio—offgrid—battery—case—for—iphone5—5s/.
Jeremy Horwitz, "Mophie Juice Pack Plus for iPhone 5," dated May 21, 2013, http://www.ilounge.com/index.php/reviews/entry/mophie—juice—pack—plus—for—iphone—5/.
Nick Guy, "RND Power Solutions Sync & Charge Dock with Lightning Connector," dated Nov. 18, 2013, http://www.ilounge.com/index.php/reviews/entry/tylt—energi—sl.
Jeremy Horwitz, "Kensington Mini Battery Pack and Charger for iPhone and iPod," dated May 16, 2008, http://www.ilounge.com/index.php/reviews/entry/kensington—mini—batterypack—and—charger—for—iphone—and—ipod/.
Kensington Mini Battery Pack and Charger for iPhone and iPod, dated Sep. 30, 2008, 1 page.
Sven Rafferty, "Mybat External Battery for iPhone and iPod," dated May 18, 2008, http://svenontech.com/reviews/?p=74.
Dave Rees, "Richard Solo Backup Battery for iPhone / iPod Review," dated Jun. 16, 2008, http://the—gadgeteer.com/2008/06/16/richard_solo_backup_battery_for_iphone_ipod/.
Devin Coldewey, "Combination iPhone battery pack and flash from FastMac," dated Nov. 4, 2008, http://crunchgear.com/2008/11/04/combination—iphone—battery—pack—and—flash—from—fastmac/.
"Cheap DIY iPhone External Battery," dated Jul. 22, 2008, http://fastdad.wordpress.com/2008/07/22/cheap—diy—iphone—external—battery/.
Jeremy Horwitz, "iLuv i603 / i604 Rechargeable Lithium Polymer Batteries with Silicone Skin," dated Jun. 27, 2006, http://www.ilounge.com/index.php/reviews/entry/iluv—i603—rechargeable—lithium—polymer—battery—with—silicone—skin/.
Julie Strietelmeier, "Seidio INNODock Desktop Cradle for Treo 650," dated Jul. 28, 2005, http://the—gadgeteer.com/2005/07/28/seidio_innodock_desktop_cradle_for_treo_650/.
Brian Nyhuis, "Mophie Juice Pack Battery Case for Samsung Galaxy S Ill Review," dated Nov. 28, 2012, http://www.legitreviews.com/mophie—juice—pack—battery—case—for—samsung—galaxy—s—iii—review_2084.
"PowerSkin Samsung Galaxy S3 Case with Backup Battery," dated Aug. 19, 2012, http://gadgetsin.com/iphone—4—case—with—battery—pack.htm.
"iPhone 4 Case with Battery Pack," dated Sep. 28, 2010, http://gadgetsin.com/iphone—4—case—with—battery—pack.htm.
Jonathan Pena, "iPhone 5 Cases, Round 3," dated Sep. 16, 2012, http://www.technologytell.com/apple/103833/iphone—5—cases—round—3/.

(56) References Cited

OTHER PUBLICATIONS

Jeremy Horwitz, "Mophie Juice Pack for iPhone," dated Dec. 7, 2007, http://www.ilounge.com/index.php/reviews/entry/mophie—juice—pack—for—iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone—extended—battery—review—mophie—juice—pack/.
Mophie Juice Pack iPhone 1G Product—Figures 1-7—Retrieved from http://www.mophie.com/products/juice—pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogs/Juice_Pack_FAQ on Apr. 10, 2009.
Mophie Juice Pack iPhone 1G Product—Figures 15-16—Retrieved from http://mophie.com/blogs/Juice_Pack_FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie—juice—pack—iphone—3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgearcom/mophie—juice—pack—iphone—3g—review—1222446/.
Mophie Juice Pack iPhone 3G Product—Figures 1-8—Retrieved from http://www.mophie.com/products/juice—pack—iphone—3g on Apr. 10, 2009.
Mophie Juice Pack iPhone 3G Product—Figures 9-10—Retrieved from http://www.mophie.com/pages/iphone—3g—details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/Jan. 0008/4942/assets/mophie juice_pack_3G_manual_rl.pdf on Apr. 10, 2009.
Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several—backup—batteries—can—extend—your—daily—iphone—3g—use/.
Using Your Treo 650 Smartphone by palmOne, dated 2005.
Lisa Gade, "Palm Treo 750," dated Jan. 17, 2007, http://www.mobiletechreview.com/phones/Treo—750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power—slider—ec20003/.
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie—juice—pack—iphone—3g/10342/.
Otterbox Catalog, 2006.
Jeremy Horowitz, "PhoneSuit MiLi Power Pack for iPhone," Jan. 29, 2009, http://www.ilounge.com/index.php/reviews/entry/phonesuit—mili—power—pack—for—iphone/.

Jeremy Horowitz, "FastMac TruePower iV Universal Battery Charger," Dec. 11, 2008, http://www.ilounge.com/index.php/reviews/entry/fastmac—truepower—iv—universal—batterycharger/.
Jeremy Horowitz, "Konnet PowerKZ Extended Power for 'Phone," Apr. 2, 2009, http://www.ilounge.com/index.php/reviews/entry/konnet—powerkz—extended—power—for—iphone/.
"Test: Batterie iPhone SKPAD" with Machine English Translation, Feb. 2, 2009, http://iphonesofa.com/2009/02/02/test—batterie—iphone—skpad.
Kanamori et al., "USB battery-charger designs meet new industry standards," EDN pp. 63-70, dated Feb. 21, 2008.
AVR458: Charging Lithium-Ion Batteries with ATAVRBC100, which appear to include a date of 08/08.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMcett.
Webpage Archive, Mophie.com, Nov. 25, 2007.
Ben Kaufman, "Behind the Invention: the mophie Juice Pack," dated Dec. 31, 2013, https://medium.com/@benkaufman/behind—the—invention—the—mophie—juice—packa0620f74efcf.
Mophie Relo Recharge, dated Feb. 7, 2006, http://songsling.com/recharge.html.
Amazon.com, "Galaxy S6 Battery Case, i-Blason External Protective Battery Case/Cover for Samsung Galaxy S6 2015 Release." Customer Review published Mar. 29, 2015. Retrieved from internet at <http://www.amazon.com/Case—i—Blason—External—ProtectiveVersions/dp/BOOSNS4LME>, Apr. 28, 2016. 7 pages.
*Case-Ari, LLC* v. *mStation, Inc.*, Case No. 1:2010-CV-01874 in the United States District Court for the Northern District of Georgia, filed Jun. 17, 2010.
*Daniel Huang* v. *GC Technology, LLC*, Case No. CV10-4705 CAS (VBKx) in the United States District Court for the Central District of California, filed Jun. 24, 2010.
*Hali-Power, Inc.* v. *mStation Corp.*, Case No. 1:2010-CV-00773 in the United States District Court for the Northern District of New York, filed Jun. 30, 2010.
*Mophie, Inc.* v. *Loza & Loza, LLP*, Case No. SACV11-00539 Doc (MLGx) in the United States District Court for the Central District of California, filed Apr. 7, 2011.
Mophie's Complaint, filed Apr. 7, 2011 in *Mophie, Inc.* v. *Loza & Loza, LLP*, Case No. SACV11-00539 DOC (MLGx) in the United States District Court for the Central District of California.
*Mophie, Inc.* v. *Foreign Trade Corporation*, Case No. 8:12-CV-00292-JST-RNB in the United States District Court for the Central District of California, filed Feb. 24, 2012.
*Mophie, Inc.* v. *Kdlinks Inc.*, Case No. 2:2012-CV-02639 in the United States District Court for the Central District of California, filed Mar. 27, 2012.
*Otter Products, LLC* v. *Mophie, LLC*, Case No. 1:2012-CV-01969 in the United States District Court for the District of Colorado, filed Jul. 27, 2012.
Mophie's Answer, filed Oct. 15, 2012 in *Otter Products, LLC* v. *Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC* v. *Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC* v. *Mophie, LLC*, Case No. 1:2012-CV-01969 in the United States District Court for the District of Colorado.
Mophie's Claim Construction Brief, filed Jun. 14, 2013 in *Otter Products, LLC* v. *Mophie, LLC*, Case No. 1:2012-CV-01969 in the United States District Court for the District of Colorado.
Otter's Claim Construction Brief, filed Jun. 14, 2013 in *Otter Products, LLC* v. *Mophie, LLC*, Case No. 1:2012-CV-01969 in the United States District Court for the District of Colorado.

(56) References Cited

OTHER PUBLICATIONS

Mophie's Brief in Response to Otter's Claim Construction Brief, filed Jun. 24, 2013 in *Otter Products, LLC* v. *Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC* v. *Mophie, LLC*, Case No. 1:2012-CV-01969 in the United States District Court for the District of Colorado.
Otter's Reply in Support of Motion for Summary Judgment of Infringement, filed Jun. 24, 2013 in *Otter Products, LLC* v. *Mophie, LLC*, Case No. 1:2012-CV-01969 in the United States District Court for the District of Colorado.
Joint Claim Construction Statement, filed Jun. 26, 2013 in *Otter Products, LLC* v. *Mophie, LLC*, Case No. 1:2012-CV-01969 in the United States District Court for the District of Colorado.
*Incase Designs, Inc.* v. *Mophie, Inc.*, Case No. 3:2013-CV-00602 in the United States District Court for the Northern District of California, filed Feb. 12, 2013.
Mophie's Amended Answer and Counterclaims, filed May 8, 2013 in *Incase Designs, Inc.* v. *Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc.* v. *Mophie, Inc.*, Case No. 3:2013-CV-00602 in the United States District Court for the Northern District of California.
Mophie's Reply in Support of Motion to Stay and Supporting Declaration, filed Sep. 3, 2013 in *Incase Designs, Inc.* v. *Mophie, Inc.*, Case No. 3:2013-CV-00602 in the United States District Court for the Northern District of California.
*Incase Designs, Inc.* v. *Mophie, Inc.*, Case No. 3:2013-CV-03356 in the United States District Court for the Northern District of California, filed Jul. 18, 2013.
*Incase Designs, Corp.* v. *Mophie, Inc.*, Case No. 3:2013-CV-04314 in the United States District Court for the Northern District of California, filed Sep. 18, 2013.
Mophie Motion 1 - to Be Accorded Benefit, filed Nov. 20, 2013 in Patent Interference No. 105,946(RES).
Declaration of John Feland, Ph.D, in Support of Mophie Motion 1 to Be Accorded Benefit, dated Nov. 20, 2013, in Patent Interference No. 105,946(Res).
Mophie Motion 2 - for Judgment that Incase's Involved Claims Are Unpatentable, filed Nov. 20, 2013 in Patent Interference No. 105,946(Res).
Declaration of John Feland, Ph.D, in Support of Mophie Motion 2 for Judgement That Incase's Involved Claims Are Unpatentable, dated Nov. 20, 2013, in Patent Interference No. 105,946(Res).
Incase Motion 1 - Motion for Benefit, filed Nov. 20, 2013 in Patent Interference No. 105,946(Res).
Incase Motion 2 - Motion to Undesignate Claims, filed Nov. 20, 2013 in Patent Interference No. 105,946(Res).
Incase Motion 3 - Motion for Judgment Based on Lack of Written Description, filed Nov. 20, 2013 in Patent Interference No. 105,946(Res).
Incase Motion 4 - Motion for Unpatentability of Mophie Claims, filed Nov. 20, 2013 in Patent Interference No. 105,946(Res).
Declaration of Andrew Wolfe, filed Nov. 20, 2013 in Patent Interference No. 105,946(Res).
Declaration of Thomas Overthun, filed Nov. 20, 2013 in Patent Interference No. 105,946(Res).
Declaration of Gabriel Dan, filed Nov. 20, 2013 in Patent Interference No. 105,946(Res).
Mophie's Third Amended Complaint, filed Jun. 27, 2014, in *Mophie, Inc.* v. *Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc.* v. *Source Vista*, Case No. 8:13-CV-01321 in the United States District Court for the Central District of California.
Shah's Answer, Affirmative Defenses, and Counterclaims to Plaintiff's Fifth Amended Complaint, filed Sep. 24, 2014, in *Mophie, Inc.* v. *Source Vista*, Case No. 8:13-CV01321 in the United States District Court for the Central District of California.
Expert Report of Dr. David Munson, dated Aug. 28, 2014, in *Mophie, Inc.* v. *Source Vista*, Case No. 8:13-CV-01321 in the United States District Court for the Central District of California.
Expert Report of John Feland, Ph.D, dated Aug. 28, 2014, in *Mophie, Inc.* v. *Source Vista*, Case No. 8:13-CV-01321 in the United States District Court for the Central District of California.
Rebuttal Expert Report of John Feland, Ph.D, dated Sep. 25, 2014, in *Mophie, Inc.* v. *Source Vista*, Case No. 8:13-CV-01321 in the United States District Court for the Central District of California.
Rebuttal Expert Report of Dr. David Munson, dated Sep. 25, 2014, in *Mophie, Inc.* v. *Source Vista*, Case No. 8:13-CV-01321 in the United States District Court for the Central District of California.
Mophie's Second Amended Response to LivingSocial's Interrogatory No. 1[21], dated Aug. 28, 2014, in *Mophie, Inc.* v. *Source Vista*, Case No. 8:13-CV-01321 in the United States District Court for the Central District of California.
Mophie's Second Amended Response to Serve Global's Interrogatory No. 2, dated Aug. 28, 2014, in *Mophie, Inc.* v. *Source Vista*, Case No. 8:13-CV-01321 in the United States District Court for the Central District of California.
Defendant's Memorandum in Support of Motion for Partial Summary Judgement, dated Sep. 23, 2014, in *Mophie, Inc.* v. *Source Vista*, Case No. 8:13-CV-01321 in the United States District Court for the Central District of California.
Declaration of David Munson in Support of Defendant's Motion for Partial Summary Judgment, dated Sep. 22, 2014, in *Mophie, Inc.* v. *Source Vista*, Case No. 8:13-CV-01321 in the United States District Court for the Central District of California.
John Feland, Ph.D. Deposition Transcript, dated Sep. 30, 2014, in *Mophie, Inc.* v. *Source Vista*, Case No. 8:13-CV-01321 in the United States District Court for the Central District of California.
Matthew Brand Deposition Transcript, dated Jul. 23, 2014, in *Mophie, Inc.* v. *Source Vista*, Case No. 8:13-CV-01321 in the United States District Court for the Central District of California.
Dharmesh Shah Deposition Transcript, dated Jul. 11, 2014, in *Mophie, Inc.* v. *Source Vista*, Case No. 8:13-CV-01321 in the United States District Court for the Central District of California.
Defendants' Statement of Uncontroverted Material Fact and Contentions of Law, filed Sep. 22, 2014 in *Mophie, Inc.* v, *Source Vista*, Case No. 8:13-CV-01321 in the United States District Court for the Central District of California.
Memorandum of Points and Authorities in Support of Mophie's Motion for Summary Judgment, filed Sep. 22, 2014, in *Mophie, Inc.* v. *Source Vista*, Case No. 8:13-CV-01321 in the United States District Court for the Central District of California.
Statement of Uncontroverted Facts and Conclusions of Law in Support of Mophie's Motion for Summary Judgment, filed Sep. 22, 2014, in *Mophie, Inc.* v. *Source Vista*, Case No. 8:13-CV-01321 in the United States District Court for the Central District of California.
Mophie's Opposition to Shah and Serve Global's Motion for Partial Summary Judgment, dated Oct. 3, 2014, in *Mophie, Inc.* v. *Source Vista*, Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc.* v. *Source Vista*, Case No. 8:13-CV-01321 in the United States District Court for the Central District of California.
Opposition of LivingSocial to Mophie's Motion for Summary Judgment, dated Oct. 3, 2014, in *Mophie, Inc.* v. *Source Vista*, Case No. 8:13-CV-01321 in the United States District Court for the Central District of California.
Defendants' Opposition to Plaintiff's Motion for Summary Judgment, filed Oct. 3, 2014, in *Mophie, Inc.* v. *Source Vista*, Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie,*

(56) References Cited

OTHER PUBLICATIONS

Inc. v. Source Vista, Case No. 8:13-CV-01321 in the United States District Court for the Central District of California.
David Munson Deposition Transcript, dated Sep. 29, 2014, in Mophie, Inc. v. Source Vista, Case No. 8:13-CV-01321 in the United States District Court for the Central District of California.
Mophie's First Amended Complaint, filed Jun. 25, 2014, in Mophie, Inc. v. Unu Electronics Inc., Case No. 8:13-CV-01705 in the United States District Court for the Central District of California.
Unu's Answer and Counterclaims, filed Jul. 10, 2014, in Mophie, Inc. v. Unu Electronics Inc., Case No. 8:13-CV-01705 in the United States District Court for the Central District of California.
Mophie's Responses to Defendant's Third Set of Interrogatories (No. 12), dated Aug. 21, 2014, in Mophie, Inc. v. Unu Electronics Inc., Case No. 8:13-CV-01705 in the United States District Court for the Central District of California.
Mophie's Responses to Defendant's First set of Requests for Admissions (Nos. 1-46), dated Aug. 19, 2014, in Mophie, Inc. v. Unu Electronics Inc., Case No. 8:13-CV-01705 in the United States District Court for the Central District of California.
Mophie's Responses to Defendant's Second set of Requests for Admissions (Nos. 47-109), dated Aug. 19, 2014, in Mophie, Inc. v. Unu Electronics Inc., Case No. 8:13-CV-01705 in the United States District Court for the Central District of California.
Request for Ex Parte Reexamination of U.S Pat. No. 8,367,235, filed Aug. 14, 2014.
Corrected Request for Ex Parte Reexamination of U.S. Pat. No. 8,367,235, filed Sep. 18, 2014.
Declaration of John Feland, Ph.D. In Support of Mophie's Opposition to Defendants Motion for Partial Summary Judgment, filed Oct. 3, 2014, in Mophie, Inc. v. Source Vista, Case No. 8:13-CV-01321 in the United States District Court for the Central District of California.
LivingSocial's Reply in Support of Motion for Summary Judgment, Filed Oct. 10, 2014, in Mophie, Inc. v. Source Vista, Case No. 8:13-CV-01321 in the United States District Court for the Central District of California.
Defendants' Reply in Support of Motion for Partial Summary Judgment, Filed Oct. 10, 2014, in Mophie, Inc. v. Source Vista, Case No. 8:13-CV-01321 in the United States District Court for the Central District of California.
Reply in Support of Mophie's Motion for Summary Judgment, Filed Oct. 10, 2014, in Mophie, Inc. v. Source Vista, Case No. 8:13-CV-01321 in the United States District Court for the Central District of California.
Mophie's Reply to Counterclaims of LivingSocial, filed Oct. 14, 2014, in Mophie, Inc. v. Source Vista, Case No. 8:13-CV-01321 in the United States District Court for the Central District of California.
Mophie's Reply to Counterclaims of Shah, filed Oct. 14, 2014, in Mophie, Inc. v. Source Vista, Case No. 8:13-CV-01321 in the United States District Court for the Central District of California.
Defendant's Response to Mophie's Fourth Set of Interrogatories, dated Sep. 23, 2014, in Mophie, Inc. v. Unu Electronics Inc., Case No. 8:13-CV-01705 in the United States District Court for the Central District of California.
Plaintiff Mophie's Preliminary Claim Constructions and Identification of Extrinsic Evidence, dated Oct. 14, 2014, in Mophie, Inc. v. Unu Electronics Inc., Case No. 8:13-CV-01705 in the United States District Court for the Central District of California.
Defendant's Preliminary Claim Constructions and Extrinsic Evidence, dated Oct. 14, 2014, in Mophie, Inc. v. Unu Electronics Inc., Case No. 8:13-CV-01705 in the United States District Court for the Central District of California.
Plaintiff Mophie's Opening Brief on Claim Construction, filed Oct. 29, 2014, in Mophie, Inc, v. Unu Electronics Inc., Case No. 8:13-CV-01705 in the United States District Court for the Central District of California.
Declaration of John Feland, Ph.D. In Support of Plaintiff's Preliminary Claim Constructions, filed Oct. 29, 2014, in Mophie, Inc. v. Unu Electronics Inc., Case No. 8:13-CV-01705 in the United States District Court for the Central District of California.
Supplemental Declaration of John Feland, Ph.D. In Support of Plaintiff's Claim Constructions, filed Oct. 29, 2014, in Mophie, Inc. v. Unu Electronics Inc., Case No. 8:13-CV-01705 in the United States District Court for the Central District of California.
Declaration of Sheila N. Swaroop in Support of Mophie's Opening Claim Construction Brief, filed Oct. 29, 2014, in Mophie, Inc. v. Unu Electronics Inc., Case No. 8:13-CV-01705 in the United States District Court for the Central District of California.
Transcript of Deposition of John Feland, dated Oct. 21, 2014, in Mophie, Inc. v. Unu Electronics Inc., Case No. 8:13-CV-01705 in the United States District Court for the Central District of California.
Defendant's Opening Claim Construction Brief, dated Oct. 29, 2014, in Mophie, Inc. v. Unu Electronics Inc., Case No. 8:13-CV-01705 in the United States District Court for the Central District of California.
Order Granting Request for Ex Parte Reexamination of U.S. Pat. No. 8,367,235, in Reexamination Control No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in Mophie, Inc. v. Source Vista, Case No. 8:13-CV-01321 in the United States District Court for the Central District of California.
Mophie's Memorandum in Support of its Motion for Reconsideration, filed Nov. 19, 2014, in Mophie, Inc. v. Source Vista, Case No. 8:13-CV-01321 in the United States District Court for the Central District of California.
Declaration of Sheila N. Swaroop in Support of Mophie's Motion for Reconsideration, filed Nov. 19, 2014, in Mophie, Inc. v. Source Vista, Case No. 8:13-CV-01321 in the United States District Court for the Central District of California.
Order Denying Plaintiff's Motion for Reconsideration, dated Nov. 21, 2014, in Mophie, Inc. v. Source Vista, Case No. 8:13-CV-01321 in the United States District Court for the Central District of California.
Defendants Dharmesh Shah and Serve Global, LLC's Memorandum of Points and Authorities in Support of Defendants's Motion for Attorney's Fees, filed Mar. 21, 2015, in Mophie, Inc. v. Source Vista, Case No. 8:13-CV-01321 in the United States District Court for the Central District of California.
Memorandum of Points and Authorities in Support of Livingsocial, Inc.'s Motion for Legal Fees and Costs, filed Mar. 20, 2015, in Mophie, Inc. v. Source Vista, Case No. 8:13-CV-01321 in the United States District Court for the Central District of California.
Plaintiff Mophie, Inc.'s Opposition to Defendants Dharmesh Shah and Serve Global, LLC's Motion for Attorneys' Fees, filed Apr. 3, 2015, in Mophie, Inc. v. Source Vista, Case No. 8:13-CV-01321 in the United States District Court for the Central District of California.
Plaintiff Mophie, Inc.'s Opposition to Defendant Livingsocial, Inc.'s Motion for Attorneys' Fees, filed Apr. 3, 2015, in Mophie, Inc. v. Source Vista, Case No. 8:13-CV-01321 in the United States District Court for the Central District of California.
Reply to Plaintiff's Opposition to Defendants Dharmesh Shah and Serve Global, LLC's Motion for Attorney's Fees, filed Apr. 10, 2015, in Mophie, Inc. v. Source Vista, Case No. 8:13-CV-01321 in the United States District Court for the Central District of California.
Reply in Support of Livingsocial, Inc.'s Motion for Legal Fees and Costs, filed Apr. 10, 2015, in Mophie, Inc. v. Source Vista, Case No. 8:13-CV-01321 in the United States District Court for the Central District of California.
Amended Final Judgment and Permanent Injunction, dated Dec. 11, 2015, in Mophie, Inc. v. Source Vista, Case No. 8:13-CV-01321 in the United States District Court for the Central District of California.
Order Re Motions for Attorneys' Fees, Motion to Amend Permanent Injunction, Motions for Judgment as a Matter of Law, Motion for Relief From Judgment, and Motion for New Trial, dated Dec. 11,

(56) References Cited

OTHER PUBLICATIONS 2015, in *Mophie, Inc.* v. *Source Vista*, Case No. 8:13-CV-01321 in the United States District Court for the Central District of California.
Daniel Huang Deposition Transcript (Redacted) with Exhibit 121, dated Aug. 21, 2014, in *Mophie, Inc.* v. *Source Vista*, Case No. 8:13-CV-01321 in the United States District Court for the Central District of California.
Mophie's Complaint, filed Dec. 16, 2015, in *Mophie, Inc.* v. *Cute Mobile Inc.*, Case No. 8:15-CV-02086 in the United States District Court for the Central District of California.
Mophie's First Amended Complaint, filed May 25, 2016 in *Mophie, Inc.* v. *Cute Mobile Inc.*, Case No. 8:15-CV-02086 in the United States District Court for the Central District of California.
Reexamination Control No. 90/013,319, filing date Sep. 18, 2014, Huang et al.
U.S. Appl. No. 15/130,196, filing date Apr. 15, 2016, Huang.
U.S. Appl. No. 14/187,046, filing date Feb. 21, 2014, To et al.
U.S. Appl. No. 14/205,167, filing date Mar. 11, 2014, Huang et al.
U.S. Appl. No. 29/382,515, filing date Jan. 4, 2011, Gallouzi et al.
U.S. Appl. No. 29/406,346, filing date Nov. 11, 2011, Brand.
U.S. Appl. No. 29/464,620, filing date Aug. 19, 2013, Tsai.
U.S. Appl. No. 29/478,391, filing date Jan. 3, 2014, Namminga et al.
U.S. Appl. No. 29/478,390, filing date Jan. 3, 2014, Dang et al.
U.S. Appl. No. 29/478,383, filing date Jan. 3, 2014, Dang et al.
U.S. Appl. No. 29/478,388, filing date Jan. 3, 2014, Kim et al.
U.S. Appl. No. 29/499,868, filing date Aug. 19, 2014, Mophie, Inc.
U.S. Appl. No. 29/539,419, filing date Sept 14, 2015, Dang et al.
U.S. Appl. No. 29/510,154, filing date Nov. 25, 2014, Mophie, Inc.
U.S. Appl. No. 29/510,153, filing date Nov. 25, 2014, Mophie, Inc.
U.S. Appl. No. 29/522,987, filing date Apr. 6, 2015, Gjoyik et al.
U.S. Appl. No. 29/510,839, filing date Dec. 3, 2014, Mophie, Inc.
U.S. Appl. No. 29/523,211, filing date Apr. 7, 2015, To et al.
U.S. Appl. No. 29/523,209, filing date Apr. 7, 2015, Mophie, Inc.
U.S. Appl. No. 29/528,266, filing date May 27, 2015, Gjoyik et al.
U.S. Appl. No. 29/534,901, filing date Jul. 31, 2015, Dang et al.
U.S. Appl. No. 29/410,518, filing date Jan. 9, 2014, To.
U.S. Appl. No. 29/464,271, filing date Aug. 14, 2013, To.
U.S. Appl. No. 29/478, 253, Jun. 30, 2015, Namminga.
U.S. Appl. No. 29/501,885, filing date Sep. 9, 2014, Mophie, Inc.
"MBP52L Battery Pack w. Lightning/Micro USB cable for iPad/tablet, iPhone/smartphone, and iPod/MP3 player." Retrieved Oct. 14, 2015. Macally Europe. http://macally—europe.com/mbp521.
"Mophie Powerstation Plus." Posted: Nov. 24, 2014. Marcus Troy. http://marcustroy.com/mophie—powerstation—plus—mophie/.
"On the Go Charger." Posted: Oct. 2012. Rayovac. http://www.rayovac.com/PortablePower/On—The—Go—Keychain—Chargers/PS78—Phone—Boost—800—Apple—Lightning—Pin—Charger.aspx.
Cheng, Jacqui. "Mophie JuicePack Powerstation: fast, high-volume charging for iDevices." Posted: Jul. 8, 2012. arstechnica. http://arstechnica.com/apple/2012/07/ mophie—juicepack—powerstation—fast—high—capacity—charging—for—your —idevices/.
Choy, Ken. "Hyperjuice Pico." Retrieved Oct. 14, 2015. Gizmo Porn. http://www.gizmoporn.com/2013/01 lhyperjuice—pico.html.
Guy, Nick. "Mophie Juice Pack Powerstation Duo" Posted: Apr. 24, 2013. iLounge. http://www.ilounge.com/index.php/reviews/entry/mophie—juice—pack—powerstation—duo/.
Tennant, Roger. "igadgetgeek's 2012 Holiday Gift Guide." Posted: Dec. 20, 2012. igadgetgeek.com. http://www.igadgetgeek.com/home/holiday—gift—guide.

\* cited by examiner

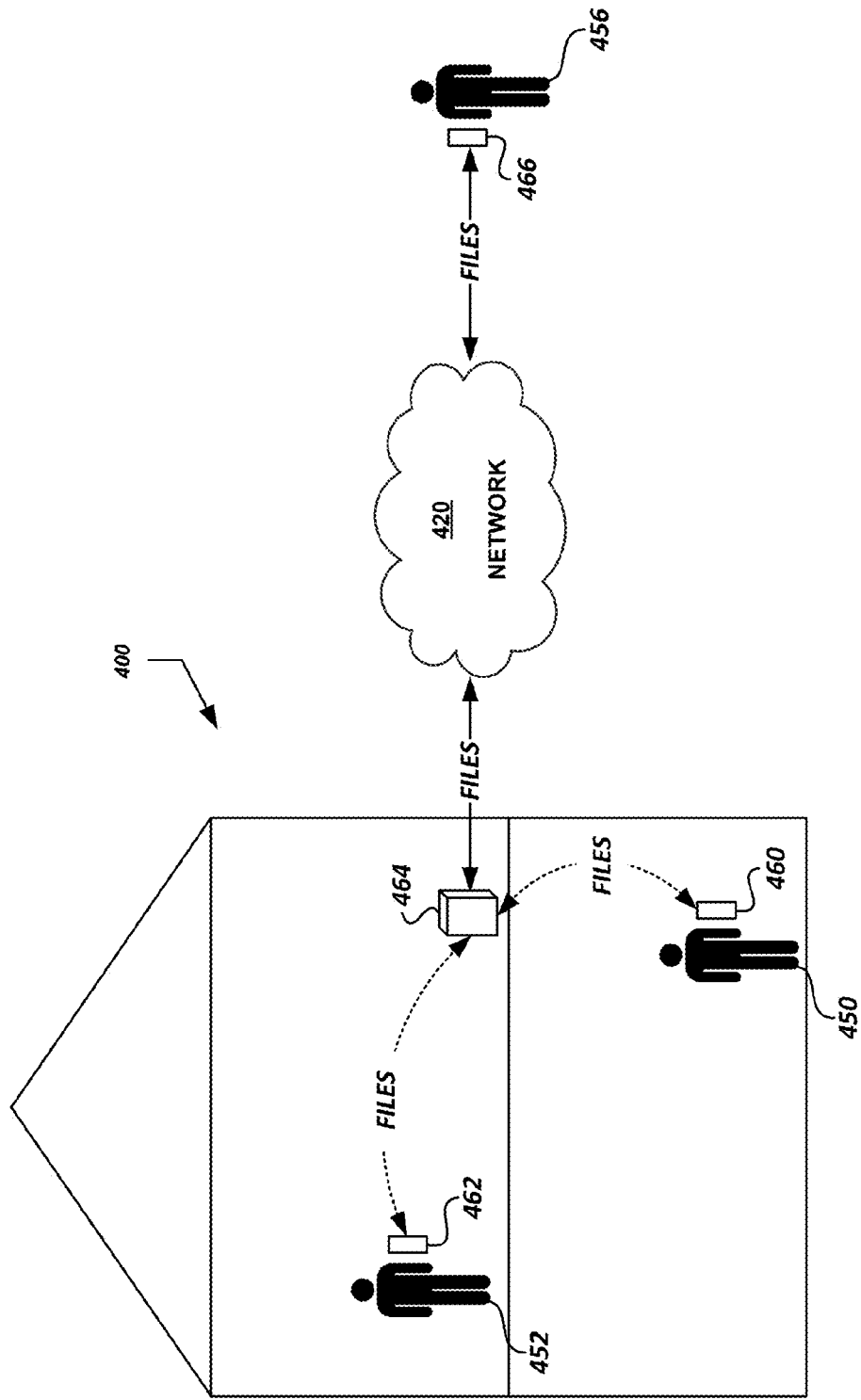

BATTERY PACK WITH SUPPLEMENTAL MEMORY

CROSS-REFERENCE TO RELATED APPLICATIONS

This application claims the benefit of U.S. Provisional Patent Application No. 61/909,578, filed on Nov. 27, 2013, and titled "BATTERY PACK WITH SUPPLEMENTAL MEMORY," and of U.S. Provisional Patent Application No. 62/019,824, filed on Jul. 1, 2014, and titled "BATTERY PACK WITH SUPPLEMENTAL MEMORY," the disclosures of both of which are hereby incorporated by reference in their entireties for all that they disclose.

BACKGROUND

Field of the Disclosure

Various embodiments of this disclosure relate to mobile electronic devices and/or to wearable computing devices, and certain embodiments relate to a battery pack with supplemental memory for use with a mobile electronic device.

Description of the Related Art

Mobile electronic devices sometimes have insufficient memory for storage of a user's files, especially in the case of media files (e.g., video and image files).

SUMMARY OF CERTAIN EMBODIMENTS

Various embodiments disclosed herein can relate to a system that includes a case configured to receive a mobile electronic device. The case can include a top wall, a bottom wall, a power output interface coupled to the bottom wall, the power output interface configured to engage a power input interface of the mobile electronic device, wherein the top wall is movable with respect to the power output interface from a first position in which the case is permitted to be removably attached to the mobile electronic device to a second position in which detachment of the case from the mobile electronic device is inhibited by engagement of the power output interface with the power input interface. The case can include a battery, and the power output interface can be configured to convey electrical power from the battery. The case can include an indicator component configured to indicate an amount of power in the battery. The case can include a non-transitory computer-readable case memory configured to store data accessible by at least the mobile electronic device via the power output interface. The system can include a non-transitory computer readable medium having stored thereon a file management system configured to run on the mobile electronic device, and the file management system can be configured to at least provide, to a media player executing on the mobile electronic device, access to a first media file in the case memory using a server-based communication protocol, and provide, to the media player, access to a second media file in memory of the mobile electronic device using a local storage access protocol.

The file management system can be configured to at least cause the mobile electronic device to transmit the media file to a second mobile electronic device via a wireless communication channel. The file management system can be configured to store metadata in connection with the first media file, and the metadata can include a tag defined by a user. The tag can include an audio recording, in some instances.

Various embodiments disclosed herein can relate to a system that includes a case configured to removably attach to a mobile electronic device. The case can include a battery, a non-transitory computer-readable case memory, an output interface configured to at least engage an input interface of the mobile electronic device, convey electrical power from the battery to the input interface of the mobile electronic device, and provide the mobile electronic device access to data stored in the case memory. The system can include a non-transitory computer readable medium having stored thereon a file management system configured to run on the mobile electronic device, and the file management system can be configured to at least provide, to an application executing on the mobile electronic device, access to data in the case memory.

The system can be used in combination with the mobile electronic device.

The file management system can be configured to provide access to the data in the case memory using a server-based communication protocol. The file management system can be configured to at least cause the mobile electronic device to transmit the data stored in the case memory to a second mobile electronic device via a wireless communication channel. The file management system can be configured to at least provide access to data in memory of the mobile electronic device using a local storage access protocol.

The file management system can be configured to at least store metadata in connection with a file stored in the case memory. The metadata can include a tag defined by a user. The metadata can include a tag generated based at least partly on calendar data stored in memory of the mobile electronic device. The file management system can be configured to provide access to a file stored in the case memory by transmitting, to a remote electronic device, a link to the file stored in the case memory.

The file management system can be configured to at least search a plurality of mobile electronic devices for a file meeting user-supplied search criteria. The file management system can be configured to search the plurality of mobile electronic devices using at least two different network connections in response to a single search request. The file management system can be configured to search the plurality of mobile electronic devices by communicating with file management systems executing on the plurality of mobile electronic devices. The file management system can be configured to at least enable modification of a search result file stored on a remote mobile electronic device of the plurality of mobile electronic devices.

The file management system can be configured to at least enable presentation of a sequence of two or more media files, wherein at least a first media file of the two or more media files is retrieved from a first remote mobile electronic device, and wherein at least a second media file of the two or more media files is retrieved from a second remote mobile electronic device. The sequence of two or more media files can include a playlist of audio files or a slide show of image files.

The file management system can be configured to search for a file based at least in part on user activity information. The user activity information can include an indication of an activity that the user was performing when the file was created or modified.

Various embodiments disclosed herein can relate to a method of manufacturing a case. The method can include providing a housing configured to removably attach to a mobile electronic device. The housing can include a battery and a non-transitory computer-readable case memory. The method can include providing an output interface configured to engage an input interface of the mobile electronic device, and the output interface can be configured to convey electrical power from the battery to a input interface. The output interface can be configured to provide access to data stored in the case memory. The method can include attaching the output interface to the housing. The method can include providing a non-transitory computer readable medium having stored thereon a file management system configured to run on the mobile electronic device. The file management system can be configured to at least provide, to an application executing on the mobile electronic device, access to data in the case memory.

Various embodiments disclosed herein can relate to an electronic storage device, which can include a first wireless communication interface, a second wireless communication interface configured to consume less power than the first wireless communication interface during operation, and a computing device configured to at least (1) transmit, using the second wireless communication interface, indicators regarding availability of the electronic storage device, (2) receive, using the second wireless communication interface, a communication from a mobile electronic device, and (3) in response to the communication (i) activate the first wireless communication interface, where the electronic storage device transmits data to the mobile electronic device using the first wireless communication interface subsequent to activation of the first wireless communication interface, and (ii) subsequent to transmitting the data to the mobile electronic device using the first wireless communication interface, deactivate the first wireless communication interface.

The summary of certain embodiments provided above is not intended to be limiting and provides some example of the various embodiment disclosed herein. Various alternatives and other embodiments are disclosed herein.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 5B shows example data flows and interactions between multiple devices when sharing files.

DETAILED DESCRIPTION OF CERTAIN EMBODIMENTS

Figure 1:
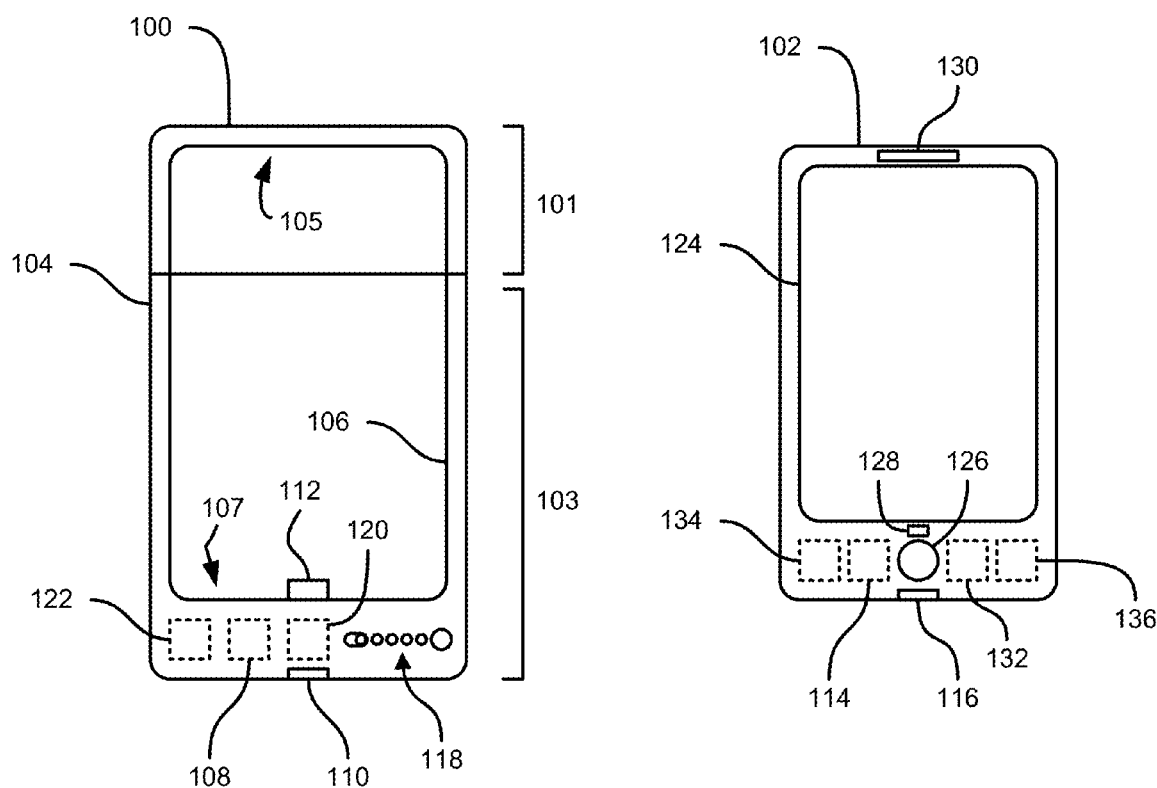
FIG. 1 shows an example embodiment of a case and a mobile electronic device.

FIG. 1 shows an example embodiment of a case 100 (e.g., for use with a mobile electronic device 102, such as a cell phone). Although various embodiments are discussed herein in connection with a cell phone, various other mobile devices can be used, such as a tablet computer, a laptop computer, a wearable computing device (e.g., a smartwatch), etc. The case can include a housing 104. The outer shape of the housing 104 can generally conform to the shape of the mobile electronic device 102. The housing 104 can include a recess 106, which can generally conform to the shape of the mobile electronic device 102. The recess 106 can be configured to receive the mobile electronic device 102 therein. In some embodiments, the case 100 can be configured to provide protection to the mobile electronic device 102 (e.g., protection from impact in the event that the device 102 is dropped). The case 100 and/or the mobile electronic device 102 can include various features similar to those described in U.S. Patent Publication No. 2012/0303520 (the "'520 Publication"), published on Nov. 29, 2012, filed on Jun. 8, 2012 as U.S. patent application Ser. No. 13/492,785, and titled WIRELESS COMMUNICATION ACCESSORY FOR A MOBILE DEVICE, the entirety of which is hereby incorporated by reference and made a part of this specification for all that it discloses.

The case 100 can include a battery 108. The battery 108 can be rechargeable. The battery 108 of the case 100 can be used to provide electrical power to the mobile electronic device 102 (e.g., for recharging the battery 114 of the mobile electronic device 102). The case 100 can include a power input interface 110, which can be configured to deliver electrical power to the battery 108, e.g., for charging the battery 108. The power input interface 110 can include a port, which can be configured to receive an electrical plug (e.g., a micro USB or lightning electrical plug). In some embodiments, the power input interface 110 can include a wireless charging interface (e.g., for inductive charging). For example, the power input interface 110 can be configured to provide electrical power (e.g., to the battery 108 or other electrical components of the case 100 and/or device 102) when placed in an electromagnetic field (e.g., produced by a corresponding power output interface). In some embodiments, the power input interface 110 can be configured to send and/or receive data (e.g., via a wire or a wireless signal).

The case 100 can include a power output interface 112, which can be configured to deliver electrical power to the mobile electronic device 102 from the battery 108 of the case 100 (e.g., for recharging the battery 114 of the device 102). The power output interface 112 can include an electrical plug (e.g., a micro USB or lightning electrical plug). In some embodiments, the power output interface 112 can include a wireless charging interface (e.g., for inductive charging). For example, the power output interface 112 can be configured to produce an electromagnetic field that can cause a power input interface 116 to provide electrical power. In some embodiments, the power output interface 112 can be configured to transfer data (e.g., to or from the mobile electronic device 102). The mobile electronic device 102 can include a power input interface 116, which can be configured to receive electrical power from the power output interface 112 of the case 100. The power input interface 116 can include a port that is configured to receive the electrical plug of the case output interface 112 when the mobile electronic device 102 is coupled to the case 100. In some embodiments, the power input interface 116 can include a wireless charging interface (e.g., for inductive charging). For example, the power input interface 116 can be configured to provide electrical power when placed in an electromagnetic field (e.g., produced by the power output interface 112). In some embodiments, the power input interface 116 can be configured to send and/or receive data. Electrical power can be transferred from the battery 108 of the case 100 to the mobile electronic device 102 for recharging the battery 114 of the mobile electronic device 102 and/or for providing power to other components of the device 102 (e.g., the processor 132 and/or the display 124).

The case 100 can include a user interface 118. The user interface can include one or more user input elements (e.g., buttons, switches, knobs, etc.), which can be configured to receive input from the user. The case 100 can be configured to transfer electrical power from the case battery 108 to the mobile electronic device 102 in response to user input received by the user interface 118. The user interface 118 can include one or more user output elements (e.g., one or more lights, speakers, displays, etc.) configured to provide information to a user. For example, a plurality of lights can be included, which can selectively illuminate (e.g., in response to input from the user to the one or more user input elements) to indicate the amount of charge that the battery 108 has. For example, half the lights can illuminate to indicate that the battery 108 is about half charged.

The case 100 can include a controller 120. The controller can include one or more computing devices (e.g., computer processors). The controller 120 can be implemented using one or more general purpose computer processors, which can be configured to execute computer-executable instructions (e.g., stored on memory 122) to implement various features and processes discussed herein. In some embodiments, the controller 120 can include one or more specialized computing devices (e.g., integrated circuits) which can be configured to implement various features and processes disclosed herein. The controller 120 can be configured to control the transfer of electrical power and/or data to and from the mobile electronic device 102. The controller 120 can also control the user interface 118 and the memory 122 as described herein.

The case 100 can include memory 122, which can include non-transitory computer-readable storage (e.g., flash memory, a hard disc, etc.). In some embodiments, the memory 122 can store computer-executable instructions, which can be executed by one or more computing devices (e.g., the controller 120) to implement various features and processes discussed herein. In some embodiments, the memory 122 can be accessible to the mobile electronic device 102 (e.g., when the mobile electronic device 102 is coupled to the case 108). For example, data can be transferred from the mobile electronic device 102 to the memory 122 and/or from the memory 122 to the mobile electronic device 102 via the power output interface 112 of the case 100 and the power input interface 116 of the mobile electronic device 102. In some embodiments, separate interfaces can be used for transferring electrical power and data between the case 100 and the mobile electronic device 102, and in some implementations, the data and/or the electrical power can be transmitted wirelessly. In some embodiments, the memory 122 can be used as supplemental storage for files (e.g., videos, pictures, music, documents, etc.), which can be accessible to the mobile electronic device 102.

The mobile electronic device 102 can include a display 124, which can be configured to display images (e.g., text, pictures, video, etc.). In some embodiments, the display 124 can be a touchscreen and can be configured to receive input from a user. In some embodiments, the mobile electronic device 102 can include a user interface, which can include user input elements (e.g., one or more buttons 126, switches, knobs, microphones 128, etc.) configured to receive input from the user. The user interface can include user output elements (e.g., one or more lights, speakers 130, etc.) which can be configured to provide information to the user. In some embodiments, the display 124 can be configured to provide information to the user and/or to receive input from the user, and the display 124 can be considered part of the user interface 126. The one or more microphones 128 can be configured to receive voice commands from a user and/or to receive sounds for a phone call. The one or more speakers 130 can be configured to provide notifications and other information to the user and/or to output sound for a phone call.

The mobile electronic device 102 can include a controller 132, which can include one or more computing devices (e.g., computer processors). The controller 132 can be implemented using one or more general purpose computer processors, which can be configured to execute computer-executable instructions (e.g., stored on memory 134 or 122) to implement various features and processes discussed herein. In some embodiments, the controller 132 can include one or more specialized computing devices (e.g., integrated circuits) which can be configured to implement various features and processes disclosed herein. Mobile electronic device 102 can include memory 134, which can include non-transitory computer-readable storage (e.g., flash memory, a hard disc, etc.). In some embodiments, the memory 134 can store computer-executable instructions, which can be executed by one or more computing devices (e.g., the controller 132) to implement various features and processes discussed herein. The mobile electronic device 102 can also include at least one wireless communication interface 136. The wireless communication interface 136 can include one or more antennas and can be configured to receive and/or transmit data (e.g., via WiFi, Bluetooth, Near Field Communication (NFC), Code Division Multiple Access (CDMA), Global Systems for Mobile Communications (GSM), etc.).

The case battery 108 can be used to recharge the battery 114 of the mobile electronic device 102 and/or to provide electrical power directly to the display 124, controller 132, memory 134, user interface, etc. The case battery 108 can provide electrical power to components of the case 100 (e.g., the processor 120, memory 122, and/or user interface 118). The battery 114 of the mobile electronic device 102 can be used to power components on the case 100 (e.g., the processor 120, memory 122, and/or user interface 118), for example, if the battery 108 is depleted. In some cases, using the battery 108 of the case 100 to power the components of the case 100 can be advantageous by avoiding or reducing the draining of the battery 114 of the device 102 by operating the case 100 (e.g., accessing the memory 122).

In some embodiments, the housing 104 may include multiple (e.g., two or more) portions that can be separated from each other. For example, the housing 104 may include at least a first portion 101 and a second portion 103. The first and second portions 101, 103 may form the housing 104 by connecting or coupling to each other (e.g., via one or more tabs on one portion and one or more corresponding recesses on the other portion, by a tongue on one portion and a corresponding groove on the other portion, or by other attachment mechanisms, etc.). A user may install the case 100 onto the mobile electronic device 102 (or install the mobile electronic device 102 into the case 100) by separating the first and second portions 101, 103. For example, the first portion 101 may be moved away from the second portion 103 such that a distance between a top wall 105 of the recess 106 and a bottom wall 107 of the recess 106 is increased (or a distance between the top wall 105 and the power output interface 112 is increased). Thus, additional space may be created to allow the mobile electronic device 102 to be placed into the recess 106. The first portion 101 may then be advanced toward the second portion 103, reducing the distance between the top wall 105 and bottom wall 107, thereby exerting a gripping force one the mobile electronic device 102, causing the power output interface 112 to be inserted into the power input interface 116 of the mobile electronic device 102, or otherwise securing the mobile electronic device 102 within the recess 106.

In some embodiments, the housing 104 may include multiple portions that stack onto each other to "sandwich" or otherwise secure the mobile electronic device 102 into the case 100. For example, the housing 104 may include a back portion that corresponds to the back (e.g., the rear face) of the mobile electronic device 102 and a front portion that corresponds to the front (e.g., the front face or display face) of the mobile electronic device 102. The mobile electronic device 102 may be placed into a recess in a first portion (e.g., the back portion or the front portion), and the complimentary portion (front portion or back portion, respectively) may be coupled to the first portion to secure the mobile electronic device 102.

In some embodiments, the housing 104 (or some portion thereof) may be at least partially flexible such that the mobile electronic device 102 can be inserted into, and removed from, the recess 106, even if the recess 106 is substantially the same size (e.g., width, length, and/or thickness) as the mobile electronic device 102. Alternatively, or in addition, the power output interface 112 of the case 100 may be pivotable or otherwise movable to allow insertion into the power input interface 116 of the mobile electronic device 102. The mobile electronic device can then be placed into the recess 106 of the case 100 as the power output interface 112 pivots or otherwise moves back into its original position or orientation with respect to the housing 104.

In some embodiments, the case 100 can communicate with an external computing device (not shown), such as a personal computer. For example, a cable can extend between the power input interface 110 and the external computing device, and data can be transferred using the cable. In some implementations, the case 100 can include a wireless communication interface, and data can be transferred wirelessly. In some embodiments, the case 110 can be configured transmit data from the mobile electronic device 102 to the external computing device and/or to transmit data from the external computing device to the mobile electronic device 102. For example, by coupling the external computing device to the case 100 via a cable, the external computing device can communicate with the mobile electronic device 102 (e.g., memory 134) and/or the case 100 (e.g., memory 122). In some embodiments, the external computing device can access the memory 134 of the mobile electronic device 102 via the same interface and/or protocols as if the external computing device were communicating directly with the mobile electronic device 102 (e.g., via a cable coupled to the power input interface 116), without the case 100. In some embodiments, the memory 122 of the case 100 can be accessible to the external computing device as an extension of the mobile electronic device 102 (e.g., using the same interface and/or protocols used to access the memory 134 of the mobile electronic device 102). In some embodiments, the memory 122 of the case 100 can be accessible separate from the memory 134 of the mobile electronic device 102 (e.g., as a separate drive). In some embodiments, the memory 122 of the case 100 can be accessible to an external computing device, even when no mobile electronic device 102 is coupled to the case 100. In some embodiments, a user can store files on the memory 122 of the case 100 and can access the files on the memory 122 via an external computing device. Accordingly, the memory 122 on the case 100 can be used for storage and transfer of files instead of a USB flash drive, optical disc, or other computer storage device. Because the memory 122 is incorporated into the case 100 that is coupled to the mobile electronic device 102, the memory 122 can be less likely to be lost, as compared to a small computer storage device such as a USB flash drive or optical disc.

Various embodiments disclosed herein can relate to one or more software programs (e.g., one or more apps) which can run on the mobile electronic device 102 (e.g., using the controller 132), as discussed herein. Various features described herein can be implemented in single software program or in multiple software programs. Various embodiments can relate to one or more computer-readable storage devices (e.g., one or more non-transitory storage media) having executable instructions stored there, and the executable instructions can be configured to run on one or more computer processors to implement various features and processes described herein. In some embodiments, one or more specialized computing devices (e.g., integrated circuits) can be configured to implement various features and processes disclosed herein.

Figure 2A:
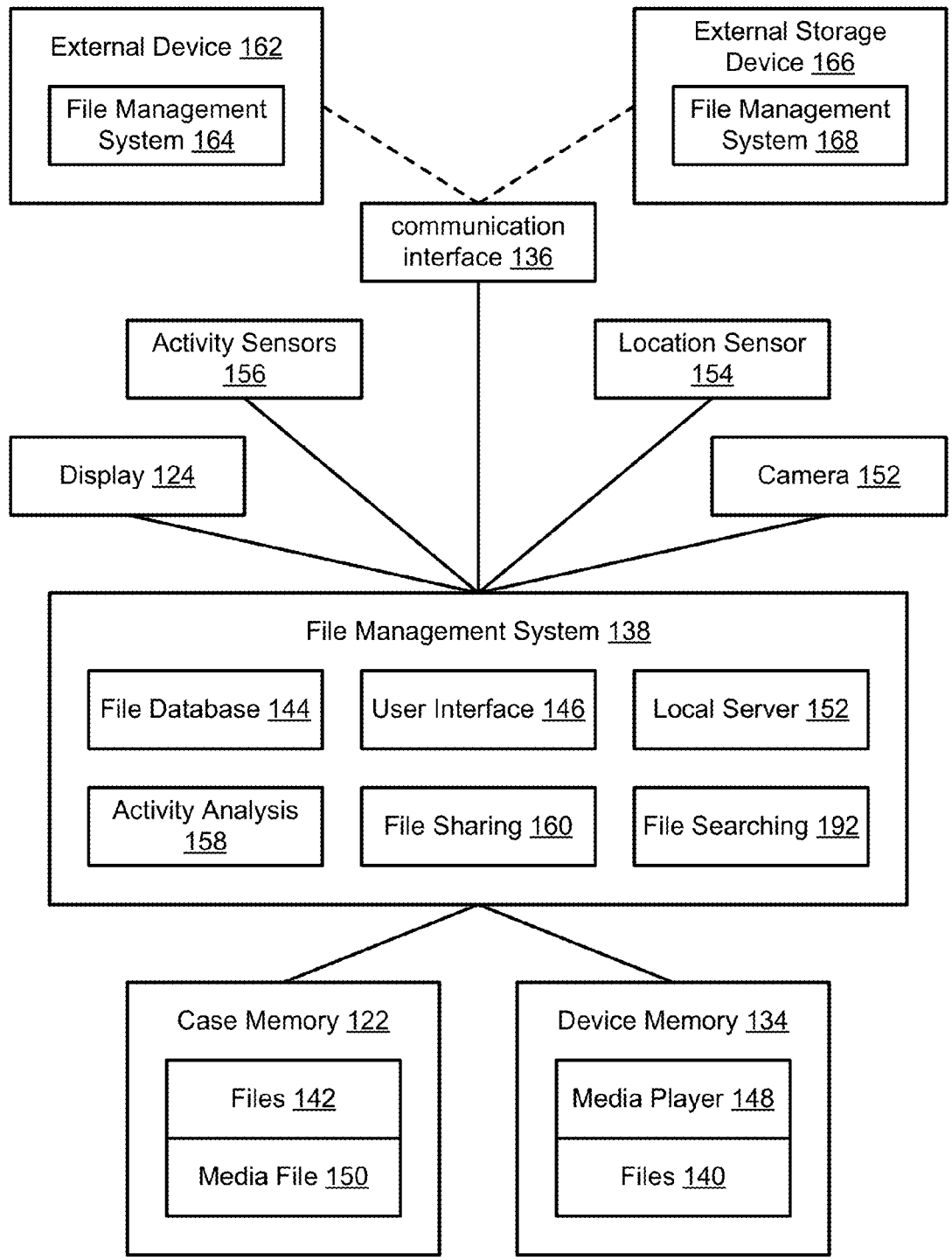
FIG. 2A shows an example embodiment of a file management system for use with the mobile electronic device.

With reference to FIG. 2A, some embodiments can relate to a file management system 138. The file management system 138 can be implemented by the controller 132 (e.g., executing machine-executable instructions stored on the case memory 122 and/or on the device memory 134). For example, the file management system 138 may include one or more executable modules that can be loaded into memory 122 or 134 and executed by the controller 132. The file management system 138 may be integrated into an operating system of the case 100 and/or device 102, or the file management system 138 may be an add-in component, a stand-alone application or service, some combination thereof, etc.

The file management system 138 can be configured to access files 140 on the device memory 134 and files 142 on the case memory 122. The file management system 138 can include a file database 144, which can be stored on one or more computer-readable storage devices (e.g., the case memory 122 and/or the device memory 134). The file database 144 can include metadata associated with the files 140 on the device memory 134 and/or the files 142 on the case memory 122. The metadata can include one or more of the file location, the file type, the file creation time, one or more file edit times, the file version, the location where the file was created, user activity information associated with the file, security information regarding who may access the file and/or what the user may do (e.g., roles, permissions), etc.

The file management system 138 can be configured to provide a user interface 146, which can be a graphical user interface (GUI), (e.g., on the display 124 of the mobile electronic device 102), and the user interface 146 can be configured to enable a user to sort and/or search the files 140 and 142 regardless of whether they are stored on the device memory 134 or on the case memory 122 (or on some other device, as described in greater detail below). For example, the user interface 146 or some other component can be configured to receive input from the user (e.g., via a touch-screen 124, via user input elements 126, via a voice command received by a microphone, etc.). In some embodiments, user input can be received by another device and the user input data can be transmitted to the mobile electronic device 102. For example, a wearable computing device (e.g., a smartwatch, etc.) can be configured to receive input from a user (e.g., via a touch screen, via a voice command received by a microphone, etc.). The wearable computing device can transmit user input data to the file management system 138 (e.g., via the wireless communication interface 136). The file management system 138 can be configured to sort and/or search the files 140 and 142 in response to the user input. For example, the user interface 146 can be configured to enable the user to select a file type, and the user interface can display all files of that type that are stored on either the device memory 134 or the case memory 122, and regardless of the file location (e.g., regardless of what folder the file is in). For example, the user can provide user input selecting image files, and the file management system 138 can access the file database 144 to identify all image files stored in the case memory 122 and/or stored in the device memory 134, and the identified files can be presented (e.g., as icons, or on a list) on the user interface 146. The user interface 146 can enable the user to sort the files by various parameters, such as file type, file creation time, file edit time, location information associated with the file, user activity information associated with the file, etc. The user interface 146 can enable the user to search for files on the case memory 122 and/or on the device memory 134, as discussed herein.

In some embodiments, the file management system 138 can be configured to perform operations (open, view, edit, delete, share, etc.) on the files 140 and/or 142. For example, the user interface 146 can enable the user to provide user input for selecting a file. For example, the user interface 146 can display icons associated with the files 140 and/or 142 and the user can select an icon associated with a file. The user interface 146 can be configured to enable the user to select an operation for the file (e.g., to open, view, edit, delete, or share the file). In some embodiments, the file management system 138 can be configured to open a selected file using a different program. In some embodiments, the file management system 138 can be configured to perform operations (e.g., open, view, edit, delete, or share) on the files 140 and/or 142 directly from the file management system 138 or from a related program that is configured to function with the file management system 138 (e.g., by providing updated metadata regarding the files 140 and/or 142 back to the file management system 138). For example, the file management system 138 can include a media player which can be configured to use (e.g., view or play) media files (e.g., images, videos, or music files). In some embodiments, the file management system 138 can access a media player 148 of the mobile electronic device 102 (e.g., stored in the device memory 134) to use (e.g., view or play) media files.

In some instances, the mobile electronic device 102 may not be designed to use external memory (e.g., the case memory 122). The file management system 138 can enable the mobile electronic device 102 to use files stored on the case memory 122 as well as on the device memory 134. For example, in some instances, the media player 148 of the mobile electronic device 102 is not configured to use a media file 150 that is stored on an external local memory (e.g., on the case memory 122). In some instances the media player 122 of the device 102 can be configured to use (e.g., view or play) media files that are stored on the device memory 134 and/or that are stored remotely on a server (e.g., via the internet). For example, the media player 148 can include a local memory protocol (e.g., a first set of instructions) for accessing a media file on the local device memory 134, and the media player 148 can include a server protocol (e.g., a second set of instructions) for accessing a media file (e.g., streaming a video) from a server (e.g., over the internet). In some embodiments, in order to enable use of a media file 150 stored on the case memory 122, the document management system 138 can include a local server 152 (e.g., a hypertext transfer protocol (HTTP) server) that is configured to access the media file 150 on the case memory and present the media file 150 to the media player 148 as a file being read from a server (e.g., using the server protocol). For example, the local server 152 can stream a media file 150 (e.g., a video or music file) from the case memory 122 to the media player 148.

In some embodiments, files can be created using the file management system 138. For example, the user interface 146 of the file management system 138 can be configured to receive user input associated with creating a new file. For example, the file management system 138 can access a camera 152 of the mobile electronic device 102 to create an image file or video file in response to input received from the user. In some embodiment, the file management system 138 can access the camera program of the mobile electronic device 102 (e.g., stored on the device memory 134) in to create an image file using the camera. For example, the file management system 138 can call the camera application programming interface (API) in response to user input for taking a picture or video.

The file management system 138 can be configured to store metadata for the files 140 and 142 (e.g., in response to the creation of the file). For example, the file management system 138 can generate and/or store metadata for files created using the file management system 138. In some embodiments, the file management system 138 can be running in the background (e.g., as a service of the operating system of the device on which the file management system 138 is running). The file management system 138 can be notified by the operating system or otherwise configured to recognize when a file is created or modified by another program, and the file management system 138 can generate and/or store metadata (e.g., in response to a file being created or modified by a program other than the file management system 138). The metadata can be stored as part of the files 140 and/or 142 themselves, or the metadata can be stored in metadata files (e.g., in the file database 144) that are associated with the files 140 and/or 142. The metadata can include one or more of the file location, the file type, the file creation time, one or more file edit times, the file version, the geographical location where the file was created, user activity information associated with the file, etc.

The metadata can include geographical location information. For example, the file management system 138 can be configured to communicate with a location sensor 154 (e.g., of the mobile electronic device 102) that is configured to provide geographical location information. For the example, the location sensor 154 can be a global positioning system (GPS) element. When a file 140 or 142 is created or modified, the file management system 138 can obtain geographic location information from the location sensor 154 and can store that geographic location information as metadata for the file 140 or 142 (e.g., stored in the file database 144).

The metadata can include user activity information. For example, the file management system can be configured to communicate with one or more activity sensors 156. The activity sensors 156 can be configured to provide user activity information (e.g., sleeping, running, driving, etc.). In some embodiments, multiple activity sensors 156 can provide data which can be analyzed to determine user activity information. An activity analysis element 158 can be included (e.g., as part of the file management system 138 or as a separate program, which can be configured to communicate with the file management system 138). The activity analysis element 158 can be configured to receive data from the one or more activity sensors 156 and determine user activity information based at least in part on the data received from the one or more activity sensors 156. For example, the activity sensors 156 can be included on the mobile electronic device 102 or on a wearable computing device (e.g., a smartwatch, smartband, necklace, ear piece, eyewear, etc.). In some embodiments, multiple activity sensors 156 on multiple devices can provide data to the activity analysis element 158. When a file 140 or 142 is created or modified, the file management system 138 can obtain user activity information from the activity analysis element 158 and/or the one or more activity sensors 156, and can store the user activity information as metadata for the file 140 or 142 (e.g., store in the file database 144). Various features relating to activity determination, which can be used in the systems and methods disclosed herein, are described in U.S. Provisional Patent Application No. 62/057,931, filed Sep. 30, 2014, and titled SYSTEM AND METHOD FOR ACTIVITY DETERMINATION, which is hereby incorporated by reference in its entirety and made a part of this specification for all that it discloses.

The metadata may also or alternatively include descriptive tags, or tags indicative of the context of the file. In some embodiments, the tags may be automatically applied to a file or suggested for a file, defined by or selected by a user, etc. For example, a mobile electronic device 102 may include a camera. A user of the mobile electronic device 102 can use a camera application to capture images and/or videos of particular subjects, such as people, places, events, and the like. Illustratively, the user may capture multiple (e.g., 2, 10, or more) images of a particular subject, such as a graduation party. Later the same day, the user may capture multiple images of a different subject, such as a sporting event. By tagging the images for each event accordingly (e.g., adding a tag to the photos from the graduation party indicating the graduation party at which the photos were taken; adding a tag to the sporting event photos indicating the sporting event at which the photos were taken), the user can later search for and retrieve photos for the specific event without necessarily knowing which date the event took place, that multiple events took place on the same day, etc. By way of example, the tags can be used to indicate a one-time event (e.g., a graduation party), to indicate an event that occurs over the source of multiple days (e.g., a vacation), to indicate a series of related events that occur on different days (e.g., Sally's soccer games), or to indicate a category of events (e.g., work-related events or family-related events). Conventional file management systems, and even image-specific file management systems, may organize images in various ways that make it difficult to locate files of only one of the two subjects. For example, conventional image management systems may organize files by date, and may therefore group the two different events together. As another example, a conventional image management system may organize files by geographic location, and may therefore group the graduation party images with other images taken at the same location at another time (e.g., not in connection with the graduation party).

Figure 2B:
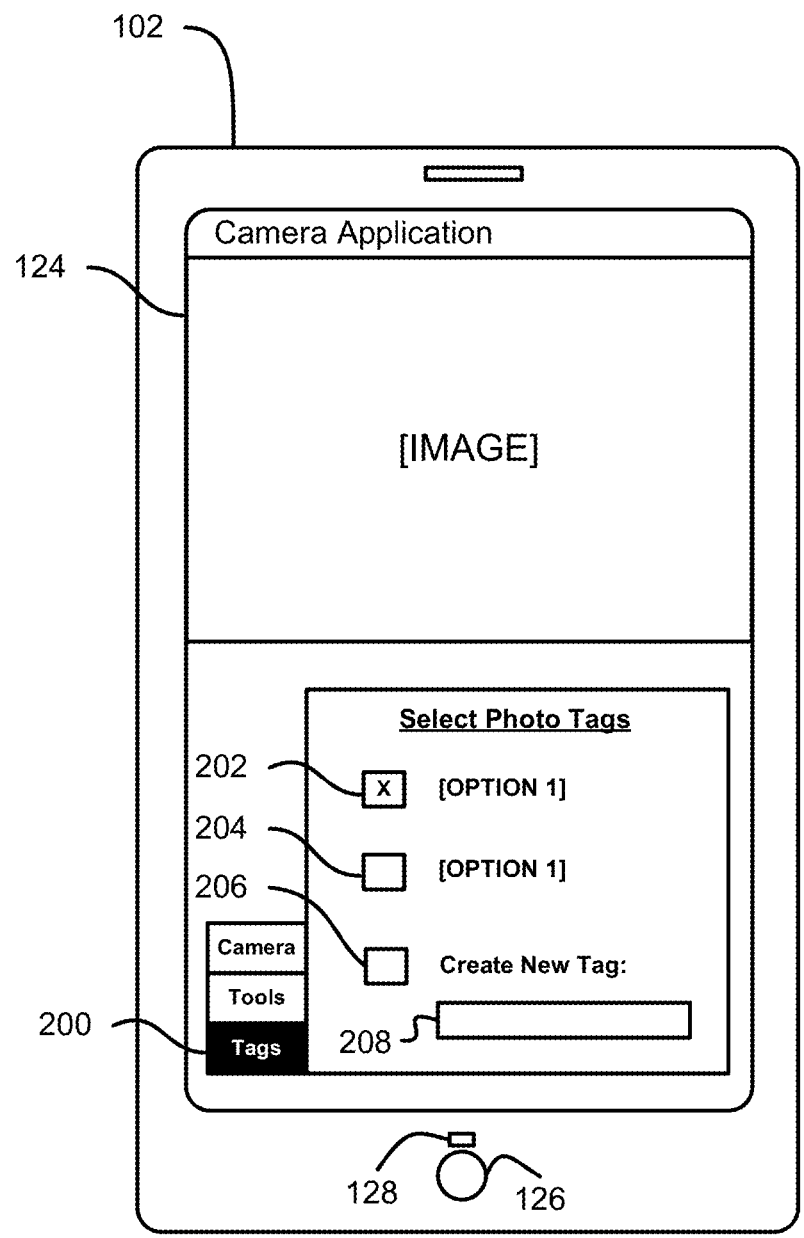
FIG. 2B shows an example interface for tagging files according to some embodiments.

FIG. 2B shows a mobile electronic device 102 displaying, on a visual display 124, an example user interface for adding tags to photos. A user may use a camera application (or some other application or service for capturing photos) on the mobile electronic device 102. The application may provide an option 200 for adding tags to past or future photographs, managing tags, etc. Returning to the example above, a user may be taking photographs for a graduation party. The user may add a tag to each of the photos that are taken at the party so that the user (or other users) may later conduct a search using the tag. Use of the tag in this way can help users more quickly find the photos taken at the party.

As shown, a user may have multiple options 202, 204, and 206 for adding tags. The options may be predefined by the camera application (e.g., the camera application may be programmed with a set of possible tags, such as "graduation," "anniversary," "birthday," "holiday," "vacation," "work," "family," and the like). In some embodiments, users may be permitted to define their own tags instead of, or in addition to, using tags predefined by the camera application. For example, options 202 and 204 may be tag options provided by the camera application or previously added by the user, and option 206 may be an option to add a new tag. A user can select option 206 and enter the new tag in the text box 208. In some embodiments, the system can be configured to allow a user to input a new tag name by a voice command (e.g., by speaking the words "graduation party" into a microphone on the mobile electronic device 102).

In some embodiments, the camera application may automatically generate or recommend tags to the user. For example, the camera application may have access to the user's calendar (e.g., the mobile device 102 may have a calendar application), and can determine that there is a birthday party scheduled for the current date and time. In the example shown in FIG. 2B, the camera application may determine that the user is scheduled to attend both a graduation party and a sporting event. Option 202 may correspond to the graduation party, option 204 may correspond to the sporting event, and option 206 may correspond to a user-definable tag. The user may select option 202, and all photos taken with option 202 selected may be tagged with the graduation party tag.

Tagging a file can include adding metadata to the file, storing tag data in a separate database of file properties, storing the file in a certain location (e.g., a tag-specific drive or directory), etc. The tag data may be automatically generated by the camera application, the file management system 138, or some other module or component. The tag itself may be or include the name of the tag (e.g., for a file tagged with the "graduation party," the tag that is added to the file metadata, stored in the database, etc. may be the words "graduation party"). In some embodiments, the tag may be an identifier of the tag, such as an integer that is uniquely associated with the particular tag. In some embodiments, the tag may be an encoded version of the tag name, or data derived therefrom. For example, the tag may be a hash of the tag name.

In some embodiments, tags may not be text-based, but may instead be audio and/or visual-based tags. For example, a user may tag photographs, documents, and the like with a voice memo, such as a brief spoken description of the associated files. The voice memo may be stored as a file or stream of audio data. The audio data may be embedded into the file or stored separately from the file and associated with the file in some way. For example, a user may speak into (or in the presence of) the microphone 128. Audio data generated by the microphone (or audio data generated using a signal generated by the microphone) may be stored in a data store on the mobile electronic device 102 or otherwise under the control of the file management system 138. As another example, the audio data may be stored at a network storage provider (e.g., a "cloud-based" storage provider) and referenced by metadata embedded into or associated with the file (e.g., a link to a location from where the audio data may be streamed). As yet another example, a spoken utterance made by a user for purposes of adding a memo-based tag may be processed using an automatic speech recognition (ASR) component or service to generate a textual representation of the utterance, such as a transcription of the utterance. The transcription may be embedded into tagged files, stored in association with tagged files, etc. In some embodiments, the textual representation of the utterance can be used for the name of the tag (e.g., "graduation party").

Although the example described above with respect to FIG. 2B relates to tagging of photos, the example is illustrative only. Other types of files may also tagged and searched, such as music files, video files, slide shows, word processing documents, spreadsheets, text messages, emails, and the like.

The tags that are applied to or otherwise associated with files may be used to search, sort, organize, and otherwise manage files. In some embodiments, the file management system 138 may include a file searching element 192, described in greater detail below. The file search element 192 may allow a user to select or submit a tag to use in a file search, and the file search element 192 can locate files with (or associated with) tags that match or satisfy searches in some way. In some embodiments, the system can be used to assign more than one tag to a single image or other type of file (e.g., a photo can be assigned the tags "family" and "graduation party"), which can enable the user to perform searches at various levels of specificity. As also described in greater detail below, the file search element 192 or some other module or component of the file management system 138 can use tags to search for files across multiple devices, potentially belonging to or otherwise operated by different users. As long as the users used the same tag to tag files, the files may be found by searching for the tag regardless of the device on which they are stored.

In some embodiments, the file management system 138 can include a file sharing element 160. The file sharing element 160 can be configured to share files 140 and/or 142 with an external computing device 162 (e.g., a cell phone, a tablet computer, a laptop computer, a desktop computer, or a wearable computing device). In some embodiments, the external computing device 162 can include features similar to those discussed in connection with the mobile electronic device 102. The file sharing element 160 can be configured to communicate with the external device 162 wirelessly, such as via the wireless communication interface 136 (e.g., using one or more of WiFi, Bluetooth, Near Field Communication (NFC), etc.). In some embodiments, the file sharing element 160 can be configured to provide a link to a file 140 or 142 to the external device 162 (e.g., via the wireless communication interface 136). The file sharing element 160 can create a link (e.g., a hypertext transfer protocol (HTTP) link) to the file 140 or 142 to be shared. The link can be transmitted to the external computing device 162 in various manners, such as by a text message, an email, a NFC communication, etc. In some embodiments, the link may include encoded access information, such as an account or device identifier, a security token, or some other information that may be used to determine whether the requestor is permitted to access the linked file. For example, the link may include authentication and/or authorization information that the file sharing element 160 or some other module or component of the file management system 138 can use to enforce security policies with respect to sharing of the linked file. In some embodiments, the external computing device 162 can have a file management system 164 similar to the file management system 138 of the mobile electronic device 102. In some implementations, the file sharing element 160 can be configured to communicate the link via a communication channel between the file management system 138 on the mobile electronic device 102 and the file management system 164 of the external computing device 162.

The external device 162 can use the transmitted link to access the file 140 or 142 that is stored on the case memory 122 or on the device memory 134. In some embodiments, the file sharing element 160 can function as a server. For example, the file sharing element 160 can be configured to provide links to files 140 and/or 142 to an external device 162. A request from the external device 162 associated with a shared link can be received by the file sharing element 160. In response to the request received form the external device 162, the file sharing element 160 can extract any access information provided with the request (e.g., information appended onto the link or embedded within the link and provided to the file sharing element 160 in connection with the request). The file sharing element 160 can then verify that the user/device that is requesting access to the file is permitted to access the file, and provide the external device 162 with access to the file associated with the link. In some embodiments, the file sharing element 160 can transmit a copy of the requested file 140 or 142 to the external computing device 162. In some embodiments, the file sharing element 162 can transmit one or more portions of the requested file 140 or 142 to the external device 162. For example, in some embodiments, the file sharing element 160 can be configured to stream a video file, a music file, or other file type, to the external device 162. In some embodiments, the file sharing element 160 can share a single file 140 or 142 with multiple external devices (e.g., multi-user streaming). In some embodiments, the file sharing element 160 can provide the external device 162 with read-only access to the file. In some embodiments, the file sharing element 160 can receive information from the external device 162 and can modify the shared file 140 or 142 based at least in part on the information received form the external device 162. For example, the external device 162 can send a modified version of the file 140 or 142 to the file sharing element 160 and the file management system 138 can replace the file 140 or 142 with the received modified version thereof, or can modify the file 140 or 142 based at least in part on the modified version thereof.

In some embodiments, the file sharing element 160 can be configured to provide access to the file 140 or 142 without sending a copy of the file 140 or 142 to the external device 162. For example, in some embodiments, the file sharing element 160 can provide image information to the external device 162, and the image information can correspond to the file 140 or 142. In some implementations, the image information can be based at least in part on the image that would be displayed on the display 124 if the file were accessed by the mobile electronic device 102. By way of example, if the shared file 140 or 142 is a text file, the file sharing element 160 can generate an image file of the image that would be displayed on the display 124 if the text file 140 or 142 were opened on the mobile electronic device 102. The image file (or a modified version thereof) can be transmitted to the external computing device 162 for display. Thus, the image displayed on the external computing device 162 can show the formatting of the text, without transmitting the text file itself to the external computing device 162. Other file types (including video files, image files, audio files, etc.) can be similarly hosted by the mobile electronic device 102 to provide the external computing device 162 with access to the files. In some embodiments, audio information that corresponds to the shared file can be transmitted to the external computing device 162 from the file sharing element 160 (e.g., in addition to or instead of the image information discussed above).

By hosting the file on the mobile electronic device 102, the external device 162 can access files 140 and/or 142 on the mobile electronic device 102 which are not themselves compatible with the external computing device 162. Thus, the file sharing element 160 can enable file sharing across different platforms (e.g., between the iOS operating system used by Apple, the Android operating system, the Windows operating system, etc.). For example, in some embodiments, the mobile electronic device 102 can operate on a first platform (e.g., iOS) and the external computing device 162 can operate on a second platform (e.g., Android). A file 140 or 142 can be compatible with the first platform, but not compatible with the second platform. Thus, merely transferring a copy of the file 140 or 142 to the external device 162 may not enable the user of the external device 162 to access the file 140 or 142. The file sharing element 160 can host the file 140 or 142 on the mobile electronic device 102 and can send data (e.g., image and/or audio information) that corresponds to the file 140 or 142 to the external device 162. Thus, the user of the external device 162 can be provided with access to the file 140 or 142 without opening the file on the external device 162.

In some embodiments, the hosted file data (e.g., image information and/or audio information) sent by the file sharing element 160 to the external device 162 can be tailored to the external device 162. For example, the file sharing element 160 can output the data in a format that is compatible with the external computing device 162. Thus, the file sharing element 160 can provide different data depending on the type of the external device 162 (e.g., an iOS platform, an Android platform). In some embodiments, the resolution of the image information transferred by the file sharing element 160 can be based at least in part on the type of the external device 162 (e.g., based on the resolution of the display of the external device 162). In some embodiments, the external device 162 can send information relating to the type of the external device 162 to the file sharing element 160. For example, when the external device 162 requests a file 140 or 142 (e.g., via a link sent from the file sharing element 160), the request can include information relating to the type of the external device 162. In some embodiments, the external device 162 (e.g., the file management system 164 thereof) can modify the hosted file data received from the file sharing element 160 (e.g., to change the format or resolution thereof).

In some embodiments, the file sharing element 160 may communicate (or cause communications) with the external device 166 using a display-based communication protocol that specifies mechanisms for transmitting bitmap presentations of visual display updates and encoded graphical user interface input via a network. Illustratively, the file sharing element 160 may provide a view of a file using Remote Desktop Protocol (RDP), X-Windows protocol, Virtual Network Computing (VNC) protocol, Remote Frame Buffer (RFB) protocol, or the like. In one illustrative example, the file sharing element 160 can receive user input information from the external device 162, and can adjust the hosted file data (e.g., image and/or sound information) that is sent to the external device 162 based on the user input information. Examples of user input include scrolling down in a text document, zooming in or out of the image file, pausing a video file, muting the audio in a video file, changing the treble or base audio elements in a music file, etc. The external device 162 can receive user input (e.g., via a touchscreen, voice command, etc.). The user input data can be sent to the file sharing element 160 (e.g., via the wireless communication interface 136). The file sharing element 160 can interpret the received user input data and can take action based on the received user input data. For example, the user input data can include a location of a touch on a touchscreen of the external device 162, and the file sharing element 160 can map the location of the user input data to a corresponding location on the touchscreen display 124 and can take action that is associated with a touch at the corresponding location of the touchscreen 124. By way of example, a user of the external device 162 can touch the portion of the display on the external device 162 that is displaying the portion of the image data corresponding to a virtual button, and the mobile electronic device 102 can respond by taking the action associated with the virtual button. In similar manner, the user of the external device 162 can provide input that causes the mobile electronic device 102 to take various actions. In some cases, the external device 162 can have read-only access to the files 140 and/or 142. In some implementations, input received by the external device 162 can be used to edit files 140 and/or 142 on the mobile electronic device 102, and in some cases to save modified versions of the files 140 and/or 142.

In some embodiments, the file sharing element 160 can be configured to translate files 140 and/or 142 to a different format (e.g., to be compatible with the external device 162 with which the files 140 and/or 142 are being shared). For example, a request from the external device 162 for a file can include an indication of the type of the external device 162 (e.g., iOS platform or Android platform). If the requested file 140 or 142 is not in a format that is compatible with the external device 162, the files sharing element 160 can modify the requested file 140 or 142 or produce a new modified version of the file 140 or 142 that is compatible with the external device 162, which is then shared with the external device 162. By way of example, the mobile electronic device 102 can have a first platform (e.g., iOS) and can have contact files (e.g., with information relating to one or more of the contacts' names, phone numbers, email addresses, home addresses, etc.) that are in a format compatible with the first platform. The external device 162 can have a second platform (e.g., Android) that uses contact information of a different format that is compatible with the second platform. To share a contact file from the mobile electronic device 102 (e.g., which uses the first platform) to the external device 162 (e.g., which uses the second platform), the file sharing element 160 can produce a new or modified file that is compatible with the second platform. The file sharing element 160 can extract the contact data out of the original file in the original format, and can produce a new or modified contact file from the extracted data that is in a format compatible with the external device 162. The new or modified contact file can be shared with (e.g., transmitted to) the external device 162, which can read the new or modified file, which is in the format that is compatible with the external device 162. Various data conversion techniques can be used to change data from various file formats to another different file formats. The file sharing element 160 can be configured to convert the format of various types of file, including text message files, contact files, image files, video files, document files, etc.

In some embodiments, the receiving device can perform the format conversion (e.g., similar to the format conversion discussed above). Thus, in some cases, a file 140 or 142 can be shared with the external device 162, and the external device 162 can produce a new file or a modified version of the file that is in a different format that is compatible with the external computing device 162.

In some embodiments, the file database 144 can store data in a platform-generic format, or in a format from which platform-specific files can be extracted, generated, etc. For example, the file sharing element 160 can be configured to extract data from a file of a platform-specific format and to save the extracted data in platform-generic format (e.g., in the file database 144). In some embodiments, the file sharing element 160 can be configured to extract the data and provide it in a platform-generic format. When data is to be shared from the mobile electronic device 102 to the external computing device 162, the platform-generic data can be converted to a format that is compatible with the external device 162, or the platform-generic data can be shared with the external device 162, which can convert the data to a file format that is compatible with the external device 162. In some embodiments, the file management system 164 of the external device 162 can be configured to receive and utilize the platform-generic data without converting it to a different format.

In some embodiments, the file management system 164 of the external device 162 can include a file sharing element, which can be similar to the file sharing element 160, and files from the external device 162 can be shared with the mobile electronic device 102 (e.g., similar to the techniques discussed above).

In some embodiments, the file sharing element 160 can be configured to share a plurality of files 140 and/or 142 with the external device 162, and the external device 162 can be used to manage the files 140 and/or 142 that are stored on the case memory 122 and/or on the device memory 134 using the external device 162. In some embodiments, the external device 162 can be a laptop computer or a desktop computer, which in some cases can be better equipped to enable a user to manage a large number of files 140 and/or 142.

Many variations are possible. For example, the file management system 138 can communicate with the external device 162 via a wired connection (e.g., a cable engaged with the power input interface 110) instead of the communication interface 136. Various elements described in connection with the file management system 138 can be separated into one or more additional components, and in some cases can be implemented in a separate device. For example, the activity analysis element 158 can be incorporated into a wearable computing device and can be configured to transmit user activity data to the mobile electronic device 102.

In some embodiments, the mobile electronic device 102 can be configured to communicate with an external storage device 166. In some embodiments, the external storage device can include a file management system 168, which can include features similar to those discussed in connection with the files management system 138 of the mobile electronic device 102.

Figure 3:
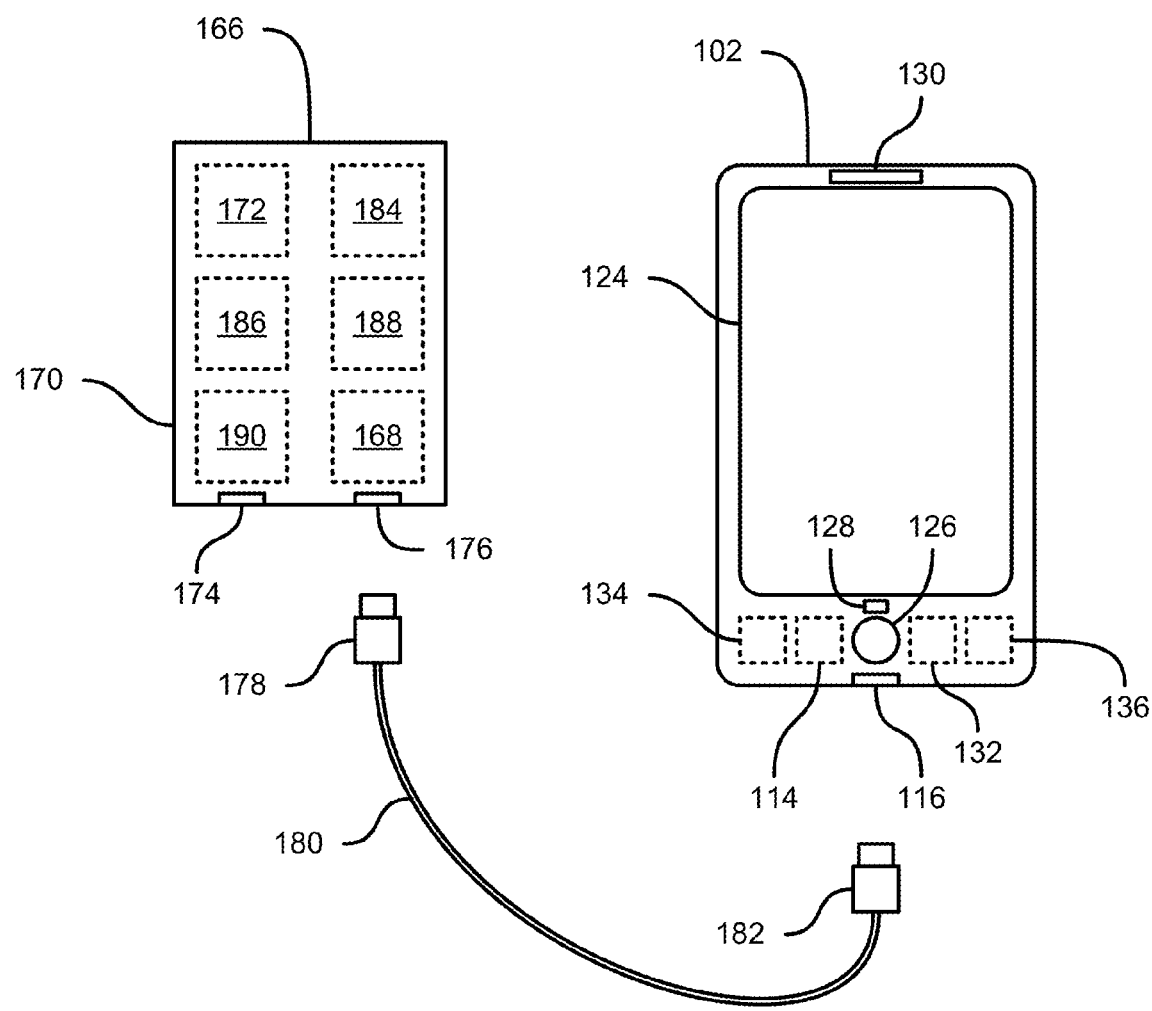
FIG. 3 shows an example embodiment of an external storage device and a mobile electronic device.

FIG. 3 shows an example embodiment of an external storage device 166, which can be used with the mobile electronic device 102. Although the case 100 is not shown in FIG. 3, the external storage device 166 can be used with the mobile electronic device 102 with or without the case 100 attached thereto. The external storage device 166 can include a housing 170, which can support or enclose various other components of the device 166. The external storage device 166 can include a battery 172. The battery 172 can be rechargeable. A power input interface 174 can be configured to provide electrical power to the battery 172 (e.g., for recharging the battery 172). The power input interface 174 can be similar to the power input interface 110 discussed in connection with the case 100. The power input interface 174 can include a port configured to receive an electrical plug, or can be configure to receive electrical power wirelessly (e.g., via inductive charging). The power input interface 174 can also send or receive data (e.g., via a cable coupled to the port).

The battery 172 can be configured to provide electrical power to a power output interface 176. The power output interface 176 can be similar to the power output interface 112 discussed in connection with the case 100. The power output interface 176 can include a port configured to receive an electrical plug 178, or can be configured to perform wireless charging (e.g., via inductive charging). In some embodiments, the power output interface 176 can include an electrical plug (e.g., that is configured to engage the power input interface 110 or 116. The power output interface 176 can be configured to send or receive data (e.g., via a cable coupled to the port). In some embodiments, an electrical cable 180 can be used to transfer electrical power and/or data between the external storage device 166 and the mobile electronic device 102 and/or case 100. In some implementations, electrical plugs 178 and 182 can be positioned at the ends of the cable 180. In some embodiments, a single port on the external storage device 166 can receive electrical power and can output electrical power.

The battery 172 can be electrically coupled to various components of the external storage device 166, and the battery 72 can provide electrical power to operate the various components. In some embodiments, the battery 172 can output electrical power (e.g., via the power output interface 176) to another device (e.g., to the mobile electronic device 102 and/or the case 100). Thus, the external storage device 166 can be used to recharge the battery 114 of the mobile electronic device 102, or the battery 108 of the case, or batteries on various other devices.

The external storage device 166 can include a controller 184. The controller 184 can include one or more computing devices (e.g., computer processors). The controller 184 can be implemented using one or more general purpose computer processors, which can be configured to execute computer-executable instructions (e.g., stored on memory 186) to implement various features and processes discussed herein (e.g., to implement features of the file management system 168). In some embodiments, the controller 184 can include one or more specialized computing devices (e.g., integrated circuits) which can be configured to implement various features and processes disclosed herein.

The external storage device 166 can include memory 186, which can include non-transitory computer-readable storage (e.g., flash memory, a hard disc, etc.). In some embodiments, the memory 186 can store computer-executable instructions, which can be executed by one or more computing devices (e.g., the controller 184) to implement various features and processes discussed herein. The memory 186 can also be used to store files (which can be made accessible to the mobile electronic device 102 and/or to one or more other devices).

The external storage device 166 can include a wireless communication interface 188, which can be configured to communicate wirelessly with other devices (e.g., via WiFi, Bluetooth, NFC, etc.). The wireless communication interface 188 can be used to transfer files, links to files, metadata, other data relating the files that are stored on the memory 186 (e.g., to the mobile electronic device 102 and/or to other electronic devices). In some embodiments data can be transferred via a wire connection (e.g., via the cable 180). In some embodiments, the external storage device 166 can be used as a central storage location for multiple users. In some embodiments, files can be transmitted in parts (e.g., streaming a video) such that access to the file can begin with little to no delay. In some embodiments, the external storage device 166 can use multiple communication protocols. For example, the external storage device 166 can use Bluetooth to communicate with devices within a first range, and WiFi to communicate with devices within a second range that is larger than the first range. In some embodiments, the external storage device 166 can include or can be in communication with a router device (e.g., a 4G router) to enable the external storage device 166 to communicate with remote devices.

In some embodiments, the wireless communication interface 188 may provide multiple (e.g., two or more) distinct communication modes, such as a first or "normal power" mode and a second or "low power" mode. One example of a multi-mode wireless communication interface is a device implementing the Bluetooth 4.0 (or later) standard. Such a device can provide a "classic" Bluetooth communication mode and also a Bluetooth Low Energy ("BLE") mode. As used herein, the terms "low power" and "normal power" are relative terms, and the range of modes and/or devices described using the terms may overlap to some degree. In addition, many "normal power" modes or devices may consume or require much less power than certain other modes or devices. Generally described, the "low power" devices and modes of the present disclosure consume or require less power than the "normal power" devices and modes of the present disclosure.

A multi-mode wireless communication interface 188 may use a normal-power mode to transfer data, such as files managed by the file manager system 168 described herein. The wireless communication interface 188 may use a low-power mode to advertise the availability of the external storage device 166 for connection and use. The wireless communication interface 188 may use a lower-power mode to receive a communication (e.g., a request for data) from another device (e.g., mobile electronic device 102). Illustratively, the external storage device 166 (or certain components thereof, such as the controller 184) may enter a "sleep" mode or some other low- or no-power mode when not in use, such as when the external storage device 166 is not providing power, data, or other resources or functionality to any mobile electronic device 102. As described in greater detail below with respect to FIGS. 6 and 7, the external storage device 166 may still be able to communicate with a mobile electronic device 102 even when the external storage device 166 is in the sleep mode. A mobile electronic device 102 may provide a notification or indication to the external storage device 166 that the mobile electronic device 102 would like to, e.g., transfer a file to or from the external storage device 168. The notification or indication may be provided to the wireless communication interface 188 using an appropriate communications protocol for the low-power mode. The wireless communication interface 188 (or a separate microcontroller in communication therewith, such as a low-power microcontroller) may then cause the primary controller 184 and/or other components of the external storage device 166 to "wake up" or otherwise resume normal operations so that the mobile electronic device 102 can transfer files to or from the external storage device 166. The file transfers may then be conducted using the normal-power mode of the wireless communication interface 188.

In some embodiments, an external storage device 166 may include multiple (e.g., two or more) distinct wireless communication interfaces, rather than a single multi-mode wireless communication interface 188. For example, one wireless communication interface may be a low-power microcontroller ("MCU") with integrated low-power wireless communication capabilities, such as BLE, or which otherwise has access to low-power wireless communication capabilities. A second wireless communication interface may be exclusively or primarily a normal-power communication interface, such as a wireless communication interface integrated with or otherwise utilized by the main or primary controller 184 of the external storage device 166. The low-power communication interface can manage communications with mobile electronic devices 102 (or other electronic devices) while the primary controller 184 and/or other components of the external storage device 166 are in sleep mode. The low-power communication interface can then cause the primary controller 184 and/or other components of the external storage device 166 to wake up and communicate with mobile electronic devices 102 via the normal-power communication interface.

The external storage device 166 can include a user interface 190, which can be similar to the user interface 118 discussed in connection with the case 100. The user interface 190 can be configured to receive input from a user (e.g., a command to transfer electrical power, such as via the power output interface 176, or a command to indicate am amount of charge for the battery 172. The user interface 190 can output information to the user (e.g., the amount of charge remaining for the battery).

The external storage device 166 can include a file management system 168, which can have one or more of the features disclosed in connection with the file management system 138. For example, the external storage device 166 can include a file sharing element, which can be similar to, or the same as, the file sharing element 160 disclosed in connection with the device 102. The disclosure relating to the file sharing element 160 is applicable to the files sharing element of the external storage device 166 and is not repeated here for sake of brevity. The external storage device 166 can provide links to files stored in the memory 186 to the device 102 and/or to other devices. The external storage device 166 can receive requests associated with the provided links and can share, or otherwise provide access to, files that are related to the requests (e.g., similar to the discussion herein relating to the file sharing element 160. The external storage device 166 can be configured to host requested files and provide data (e.g., image and/or audio information) associated with the hosted files, as discussed herein. In some embodiments, the file sharing element of the external storage device 166 can share a single file with multiple external devices (e.g., multi-user streaming).

In some embodiments, the file sharing element of the external storage device 166 can be configured to translate files stored in the memory 186 to a different format (e.g., to be compatible with the mobile electronic device 102, or other receiving device), similar to the discussion above in connection with the file sharing element 160. In some embodiments, the receiving device can perform the format conversion. In some embodiments, the external storage device 166 can be configured to provide and/or store data in a platform-generic format, similar to the discussion above in connection with the file management system 138.

In some embodiments, a local server 152 (e.g., on the mobile electronic device 102 or on the external storage device 166) can be used to present files that are stored on the memory 186 of the external storage device 166 to the media player 148 of the mobile electronic device 102, similar to the discussion above.

Figure 4A:
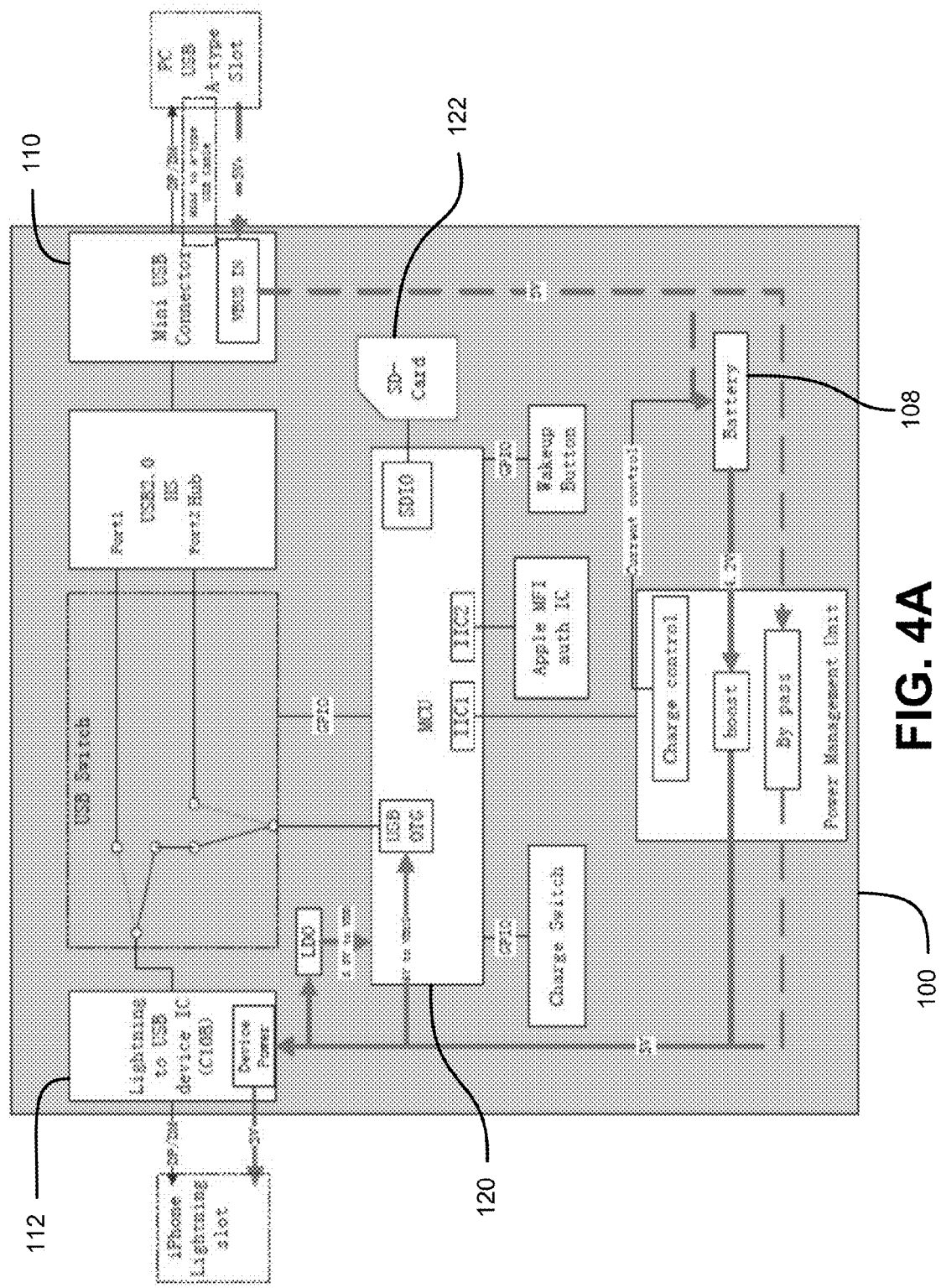
FIG. 4A shows features of an example embodiment of a case for use with a mobile electronic device.
Figure 4B:
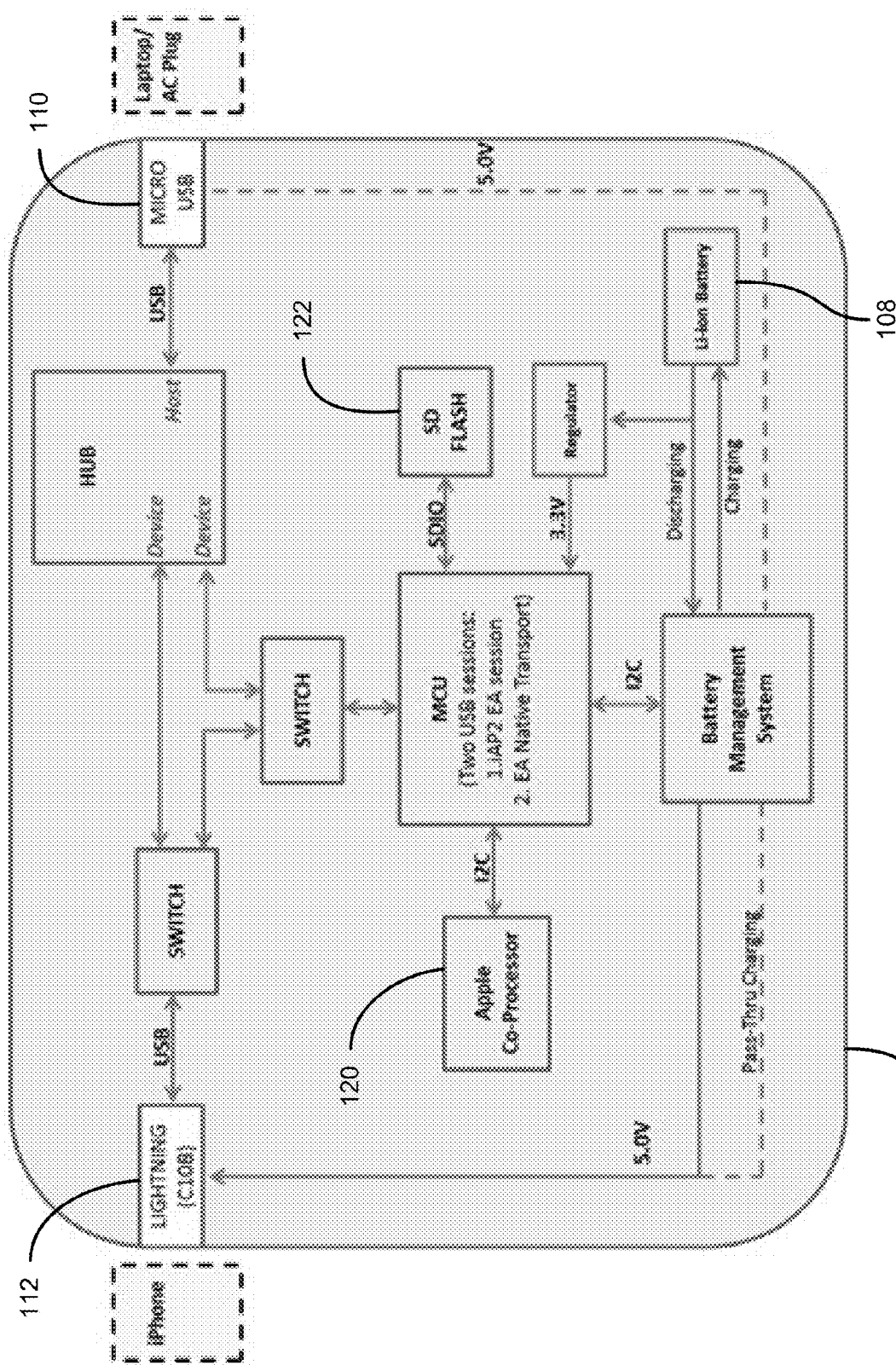
FIG. 4B shows features of an example embodiment of a case for use with a mobile electronic device.

FIG. 4A shows various features of an example embodiment of the case 100. FIG. 4B shows various features of another example embodiment of the case 100. Electrical power can be delivered to the battery 108 from the power input interface 110 (e.g., when the power input interface 110 is coupled to a power source). The electrical power can be routed through a battery management system, which can be configured to route electrical power (e.g., received from the power input interface 110) to the case battery 108 and/or to the power output interface 112 (e.g., for relaying the electrical power to the mobile electronic device 102 (e.g., for recharging the battery 114). Electrical power from the battery 108 can be directed (e.g., by the battery management system) to the power output interface 112 (e.g., for recharging the battery 114 of the mobile electronic device 102). Data can be communicated between the power input interface 110, the power output interface 112, the controller 120, and the memory 122. Data can be communicated between the power input interface 110 and the power output interface 112, which can enable an external device, such as a computer that is coupled to the power input interface and the mobile electronic device 102 that is coupled to the power output interface 112 to communicate with each other. Data can be communicated between the power input element 110 and the components of the case 100 (e.g., the memory 122 and the controller 120), which can enable the case and an external device (e.g., a computer) attached to the power input interface to communicate with each other. Data can also be communicated between the power output interface 112 and the components of the case 100 (e.g., the memory 122 and the controller 120), which can enable the case 100 and the mobile electronic device 102 to communicate with each other. Many variations are possible.

In some embodiments, a first type of wireless communication (e.g., NFC) can be used to establish a connection or authorization between two devices, and a second type of wireless communication (e.g., WiFi) can be used to transfer files and other data between the two devices. The first type of wireless communication can have a shorter range than the second type of wireless communication. For example, NFC can have a relatively short range of communication (e.g., generally only a few centimeters), thus NFC communication can be used to establish authorization to share files between two devices. Because NFC communication generally requires that the two devices be placed in very close proximity to each other (e.g., touching), the use of NFC to establish sharing authorization can reduce the chance that sharing authorization is unintentionally provided to a device. However, because NFC has a relatively short range, a different type of wireless communication (e.g., WiFi or Bluetooth, etc.) can be used to transfer files and data between the two devices, thereby enabling file sharing between authorized devices when they are outside the range of NFC.

By way of example, the external device 162 can be brought into close enough proximity of the mobile electronic device 102 for an NFC connection between the devices 102 and 162. The file management system 138 can store an indication that the external device 162 is authorized for file sharing. Files 140 and/or 142 can then be shared with the external device 162 (e.g., via a different type of wireless communication such as WiFi, Bluetooth, etc.). In some cases, the external device 162 can store an indication that the mobile electronic device 102 is authorized for sharing, and the external device 162 can share files with the device 102 (e.g., via WiFi). By way of another example, the mobile electronic device 102 can be brought into close enough proximity to the external storage device 166 to establish an NFC connection between the mobile electronic device 102 and the external storage device 166. The mobile electronic device 102 and/or the external storage device 166 can store an indication that the other device is authorized for file sharing, and files can be shared via a different non-NFC wireless communication protocol. In some embodiments a user interface can enable the user to specify the files that are authorized for sharing. In some embodiments, the authorization can last for an amount of time and can expire. In some embodiments, multiple devices can have file sharing authorization at the same time.

With reference again to FIG. 2A, the file management system 138 can include a file searching element 192. The searching element 192 can be configured to search for files that are located on the device memory 134, on the case memory 122, on an external computing device 162, and/or on an external storage device 166. The search element 192 can receive a query, which can include text. The query can be inputted by a user (e.g., via the touchscreen display 124, via the user input elements, via a voice command, etc.). The search element 192 can be configured to parse the query and identify parts of the query that relate to different categories of data, and the search element 192 can perform the search based on the different portions of the query that relate to different categories of data. Fuzzy logic, natural language understanding, and other such techniques can be used to parse a query. For example, the search can be based on one or more of the following categories of data: file/notification type, action type, time information, geographic location information, and user activity information. The searching can include searching the metadata of files to identify files that fit the query. For example, the query "show me all text messages I received while driving yesterday" can be parsed into various components. The file/notification type can be "text messages." The action type can be "received." The time information can be "yesterday." The user activity information can be "driving." The file searching element 192 can then identify all the files that satisfy the query (e.g., by searching the metadata). This example, query could enable a user to quickly identify a text message that was missed while driving even if the user does not know who it was from or exactly when it was received. By way of another example, the query "show me all photos that I took in Europe last year" can be parsed so that the file/notification type is "photos," so that the action type is "taken," so that the geographic location information is "in Europe," and so that the time information is "last year."

In some embodiments, the query may include tags that the user would like to use when searching. For example, as described above with respect to FIG. 2B, a user may take photographs at a graduation party, and may tag the photos accordingly (e.g., by selecting or creating a "graduation party" tag before or after taking pictures). When searching for tagged items, the user may simply search for the tag, or provide other search terms and options (e.g., dates, times, locations, etc.). The searching element 192 can search the device memory 134, case memory 122, memory on an external computing device 162 and/or external storage device 166, etc. for files with tags matching (or substantially matching) the queried tag.

Figure 5A:
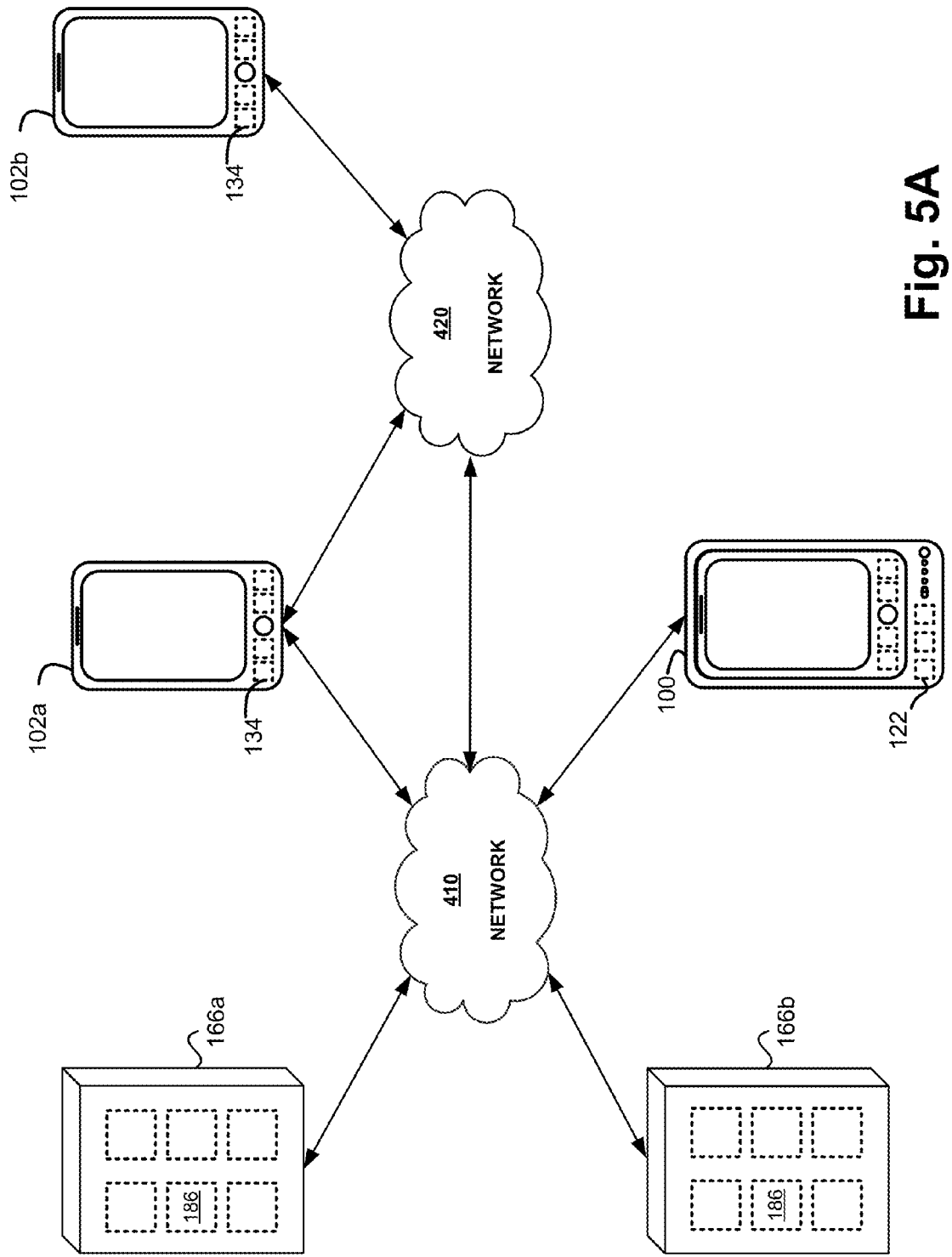
FIG. 5A shows an example network environment in which a file management system can search files across multiple devices.

FIG. 5A shows an example network environment in which files can be searched and shared across multiple (e.g., two or more) devices. Various combinations of external storage devices 166a and 166b, mobile electronic devices 102a and 102b, and cases 100 can communicate with each other via one or more communication networks 410 and 420. One or both of the networks may be a publicly accessible network of linked networks, possibly operated by various distinct parties, such as the Internet. In other embodiments, one or both of the networks 410 and 420 may include a private network, personal area network, local area network, wide area network, cable network, satellite network, cellular telephone network, etc. or combination thereof, each with access to and/or from the Internet. For example, network 410 may be a WiFi-based local area network, such as a local area network implemented in a home or office. The network 410 may be provided by various network computing components, such as routers, wireless access points, and the like. As another example, the network 420 may be a mobile device network, such as a fourth-generation (4g) cellular phone network, or the network 420 may be the Internet.

A user of any of the various devices 166a, 166b, 102a, 102b, and/or 100 may use a file management system, such as one of the file management systems described herein, to search for files on any one or more of the various devices 166a, 166b, 102a, 102b, and/or 100. For example, a user of device 102a may initiate a search query, which may include search terms, tags, and/or other search options. A file management system 138 executing on device 102a may search memory 134 of the device 102a for files that match the terms, tags, and other search options. The file management system 138 may also search for files, on the external storage device 166a, matching the terms, tags, and other search options. To perform such a search, the file management system 138 on the device 102a may establish communications with the external storage device 166a via the network 410. The file management system 138 can transmit search parameters (search terms, tags, and/or other search options) to the external storage device 166a, and a file management system 168 executing on the external storage device 166a can perform the search and return any matching files (or data regarding any matching files) to the device 102a. In some embodiments, the file management system 138 on the mobile electronic device 102a may perform the search for files on the external storage device 166a, rather than a separate file management system 168 on the external storage device 166a. For example, the file management system 138 on the mobile electronic device 102a may have access to information about files on the external storage device 166a obtained via periodic or dynamic synchronization procedures during which various devices exchange information about their stored files.

The file management system 138 may also use the search parameters to search for files on other devices connected to the network 410, such as external storage device 166b, case 100, etc. In addition, the file management system 138 may use the search parameters to search for files on other devices connected to a different network, such as network 420. As described above, network 410 may be a WiFi-based local area network, such as home or office network. The mobile electronic device 102a may use a different network connection, such as cellular telephone network 420 to connect to mobile electronic device 102b. The mobile electronic device 102a may search for files on the other mobile electronic device 102b in a manner similar to that used to search for files in the external storage device 166a, described above. Illustratively, the mobile electronic device 102a may use both network connections currently, or in response to a single search request.

The file management system 138 may determine which devices to include in the search based on device grouping configuration information, dynamic device discovery, etc. For example, one or more users may define a device group that includes a specified set of devices, such as the devices 166a, 166b, 102a, 102b, and/or 100 shown in FIG. 5A. The mobile device 102a may then search the memory or other file storage of each of those devices (or some subset thereof) in response to search requests. In some embodiments, the mobile device 102a may use a default contact method, such as attempting to contact a device over a local area network first. If that contact method fails, the mobile device 102a may use a secondary contact method, such as attempting to contact the device over a cellular telephone network and/or the Internet. In addition, or alternatively, file management system 138 may dynamically discover devices on which to search for files. For example, the file management system 138 of mobile electronic device 102a may determine which devices are currently accessible via the local area network 410, and may transmit search queries to those devices. The example search methods and configurations described and shown are illustrative only, and are not intended to be limiting. In some embodiments, additional and/or alternative search methods and configurations may be used.

The file management system 138 can present search results from multiple devices seamlessly, such that the user is shielded from the underlying device on which each search result is stored. For example, a user may search images tagged with the "graduation party" tag described above. Rather than just searching for images on the user's own device 102a, or on an external device 166a to which the user may have stored the images, the user can instead search for images on any device that is reachable via a network connection. If other users on the same local area network, or in the same device group configuration, have images tagged "graduation party" stored on their devices, such images may be returned to the user searching from device 102a, even though the user of device 102a may not have taken the images, tagged the images, known where the images where stored, or even known that the images existed prior to conducting the search.

FIG. 5B shows an illustrative example of seamless cross-device searching and file sharing. As shown, users 450 and 452 may have mobile electronic devices 460 and 462 respectively (e.g., mobile electronic devices 102 or devices in cases 100, described above). The users 460 and 462 may be in close proximity, such as in a home 400, and may therefore be connected to the same WiFi-based local area network. In addition, there may be an external storage device 464 that is also connected to the local area network. The external storage device 464 or the local area network may be connected to or in communication with a second network 420, which may be a cellular telephone network or the Internet. A third user 456 with mobile electronic device 466 may be outside the home 400. The mobile electronic device 466 of the third user 456 may not be connected to or in direct communication with the local area network of the home 400, but my instead be connected to or in communication with the network 420.

User 456 may initiate a search for tagged files. Illustratively, the user 456 may initiate a search for files tagged with the "graduation party" tag described above. The file management system 138 on the user's device 466 can initiate searching for images within memory of the user's device 466, and also images on devices 460, 462 and 464, even though one or more of those devices may not necessarily be connected to the same network 420 as the third user's device 466. The file management system 138 may present results to the user, and the user may interact with the results without regard to the particular device on which any given image file may be stored. For example, the user 456 may define a slide show of images tagged with the "graduation party" tag. The slideshow may include images from multiple different devices 460, 462, 464, and/or 466, devices connected to different networks (e.g., the local area network of the house 400 and/or a cellular telephone network 420), etc. The user 456 may initiate playback of the slide show from outside of the home 400, and the mobile electronic device 466 can access image files on one or more other devices 460, 462, and/or 464 as needed via the cellular phone network 420, the external storage device 464, and the local area network of the home 400. Subsequently, the user 456 may enter the home 400 and initiate playback of the slide show. The device 466 may in this case access images files on the other devices 460, 462, and/or 464 as needed via the local area network of the home 400. The slideshow may continue to work even if one or both of the other devices 460 and/or 462 is no longer in the home 400, as long as the user devices 460 and/or 462 is accessible via some other network, such as the cellular network 420.

Although the example described above with respect to FIG. 5B focuses on the use of seamless cross-device searching and sharing of files, the example is illustrative only, and is not intended to be limiting. In some embodiments, a user may search for, access, and share any other type of file. For example, the third user 456 may define a playlist of music, and individual songs on the playlist may be stored as individual files on any number of different computing devices. The user 456 may then start playback of the playlist on device 466, and music files from mobile devices 460 and 462 and/or external storage device 466 may be accessed and played on device 466 as needed. In addition, the user 456 may initiate playback of the playlist regardless of which network connection or connections are currently available to the mobile electronic device 466 as long as the various other devices 460, 462, and/or 464 are accessible to the device 466 via some network.

In some embodiments, files may be stored only once for all devices 460, 462, 464 and/or 466 of a group, even if multiple users have initiated storage of their own copies of a given file. For example, the storage provided by the combination of devices 460, 462, 464 and/or 466 of a given group may be allocated by a file management system 138 (or multiple file management systems executing on different devices) on an as-needed basis group-wide, rather than a device-specific, user-specific basis. Therefore, if first user 450 stores a file on external storage device 464 (or some other device, such as mobile electronic device 460), a subsequent user that initiates storage of an identical file will instead be associated with the file stored by the first user 450. For example, the file management system 138 executing on a second user's device 462 may determine whether an identical copy of the file has been stored on any other device of the group of devices and, if so, the file management system can store metadata indicating the location and identity of file in lieu of storing a duplicate copy of the file.

In some embodiments, tags may be used to determine which users may access shared files. For example, the first user 450 may store a particular file on the external storage device 464, but may not wish to have the file available to any and all users associated with the group. The first user 450 may add a tag to the file (as described above) linking the tag to a particular subset of users, such as a "personal" tag indicating that the file is not to be shared with any other user or device (in which case the file may be stored on the user's specific device 460 by default), a "public" tag indicating that any user or device of the group may access the file, a "home" tag indicating that only members of the user's household may access the file, etc.

Returning to FIG. 2A, a search query can also include information regarding one or more actions to be performed on the results. For example, the user can provide input to "delete all contacts that were modified last week," and the query can be parsed to have a file/notification type of "contacts," an action type of "modified," and time information of "last week." The query can also be parsed to identify that the action to be performed on the identified files is "delete." The time information can be a specific time, or a range of times. The geographic location can be specific location or a more general area. In some embodiments, the file searching element 192 can provide additional information that is determined to be relevant to the submitted query. For example, the user can submit a query of "how was my sleep last night?" The file searching element 192 can parse the query and provide an appropriate response, such as "You slept for 7 hours and the score of your sleep was 85%." The file searching element 192 can access an appropriate program for computing the sleep score, or the file searching element 192 can be configured to make this determination itself. The file searching element 192 can also provide additional information or questions, such as "would you like to see how well your sleep compares to the national average?" or "would you like to see how well your sleep compares to your friends?" The search techniques discussed above can be used for searching files on a computer and for searching for files on the internet as well.

Various embodiments disclosed herein can relate to wearable computing devices, such as those discussed in PCT Patent Application No. PCT/US2014/045549, filed Jul. 7, 2014, and titled METHOD AND SYSTEM FOR COMMUNICATIVELY COUPLING A WEARABLE COMPUTER WITH ONE OR MORE NON-WEARABLE COMPUTERS, which claims the benefit of U.S. Provisional Patent Application No. 61/845,316 (the "'316 Application"), filed Jul. 11, 2013, and titled METHOD AND SYSTEM FOR COMMUNICATIVELY COUPLING A WEARABLE COMPUTER WITH ONE OR MORE EXTERNAL COMPUTERS, both of which are hereby incorporated by reference in their entirety and made a part of this specification for all that they disclose. As described herein and in the '316 Application, wearable computing devices can be used to determine user activity information. The mobile electronic device 102 and/or the wearable computing device can take action based at least in part on the determined user activity. For example, if a determination is made that the user is driving, the user's electronic calendar can be consulted and the device can present or offer to present driving directions to the location of the next appointment in the calendar.

When the determination is made that a user has stopped an activity, the mobile electronic device 102 and/or the wearable computing device can provide the user with a summary of the activity that was stopped. For example, if the determination is made that the user was running and has now stopped, the device can inform the user with information about the run (e.g., of how far the user ran, the average speed, the improvement over one or more prior runs, a map of the run, etc.). In some instances, the device can make an inquiry to the user of whether the user has completed the run or has merely stopped temporarily (e.g., to stretch). By way of another example, when the determination is made that the user was sleeping and is now awake, the mobile electronic device 102 and/or the wearable computing device can provide the user with a summary of the user's sleep (e.g., number of hours, score of the estimated quality of sleep, etc.). In some instances, the device can make an inquiry to the user of whether the user is finished sleeping or has only awoken temporarily (e.g., to use the bathroom). In some embodiments, the mobile electronic device 102 and/or the wearable computing device can stop delivering notifications to the user, or can change the notifications, during the time that the user is asleep (e.g., as discussed in the '316 Application). In some embodiments, when the user wakes up, the mobile electronic device 102 and/or the wearable computing device can provide notifications to the user that were suppressed while the user was sleeping.

In some embodiments, the activity analysis element 158 can conduct analysis on the activities of the user and can recommend modifications in the user's behavior. For example, by analyzing the user's sleep patterns, the activity analysis element 158 can determine that when the user goes to sleep within less than one hour after finishing a run, the user's sleep quality is lower than when the user finishes running at least two hours before going to sleep. The mobile electronic device 102 and/or the wearable computing device can provide a recommendation that the user's schedule be changed so that the user can go running earlier in order to improve the user's quality of sleep. In some embodiments, the activity analysis can include information from a plurality of individuals and in some cases can analyze user activity data on a macro scale. For example, analyzing the user activity data could determine what activities are commonly performed during the time prior to a heart attack. In the event that the user activities for an individual user indicate a risk of heart attack, the mobile electronic device 102 and/or the wearable computing device can provide a notification to the user (e.g., a warning or recommendation to change behavior).

Various embodiments disclosed herein relate to systems and methods relating to building automation (e.g., home automation). For example, one or more rooms can include sensors that are configured to sense the presence of a user in the room. The user can be wearing a wearable computing device (e.g., a smartwatch), that can communication wirelessly with the sensors. In some embodiments, the one or more sensors can determine whether a user wearing a compatible wearable computing device is present. In some embodiments, the mobile electronic device 102 and/or the wearable computing device is configured to determine a location of the user (e.g., by communicating with the one or more sensors in the one or more rooms). A building automation system can be configured to change parameters of a room in response to the presence of a user. For example, user preferences can be stored in one or more computer-readable memory devices, and the building automation system can include a controller (e.g., including one or more computing devices) that is configure to access the user's preferences from the one or more memory devices and to implement changes based on the user preferences. For example, the building automation system can chance the brightness of the lights, the temperature of the room, the volume of a media device, etc. If multiple users are present the preferences for a dominant user can be used, or the preferences of the users can be averaged, or combined using a weighted algorithm.

In some embodiments, the building automation system can be configured to change parameters of a room based at least in part on the user activity information (e.g., determined using the wearable computing device). For example, if the user is sleeping, the building automation system can turn the lights in the room down or off, and can turn a media device off, or turn the volume down. By way of another example, if the user activity is determined to be running on a treadmill, the building automation can lower the temperature of the room. Many variations are possible.

Figure 6:
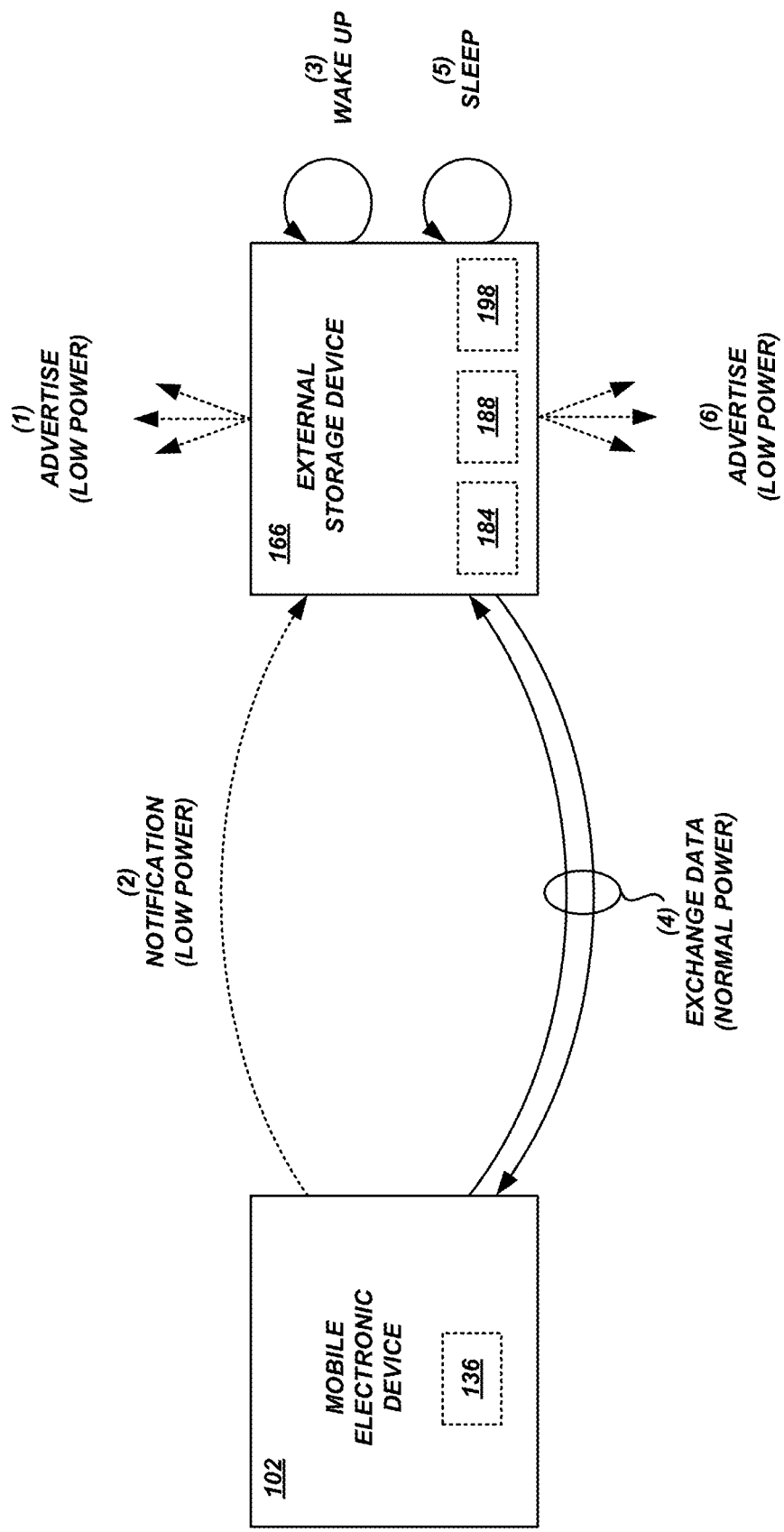
FIG. 6 shows example data flows and interactions between an external storage device and a mobile electronic device.

FIG. 6 shows example interactions and data flows between a mobile electronic device 102 and an external storage device 166. The mobile electronic device 102 and external storage device 166 may be similar or identical in many respects to the mobile electronic device 102 and external storage device 166 described above. As shown in FIG. 6, the external storage device 166 may have a main or primary controller 184, wireless communication interface 188, and a low-power wireless communication interface 198. The low-power wireless communication interface 198 may have an integrated MCU, or it may be in communication with a separate low-power MCU (not shown).

The mobile electronic device 102 may also have a wireless communication interface 136. Illustratively, the mobile electronic device 102 and external storage device 166 may communicate wirelessly using various wireless standards and protocols. Although the examples described below focus on the use of Bluetooth and BLE, these examples are illustrative only and are not intended to be limiting. In some embodiments, the mobile electronic device 102 and external storage device 166 may communicate using other wireless standards, protocols, and technologies, such WiFi, 4G LTE, Bluetooth, ZigBee, Ant, and the like.

The external storage device 166 may be in a low-power or "sleep" state, or it may be in a normal-power or "wake" state, depending upon current operating conditions. For example, the default state of the external storage device 166 may be the sleep state when it is not providing power, communications, or other features to mobile electronic devices (or to other computing devices). In this way, the external storage device 166 can minimize the use of its battery power. However, even though the external storage device 166 may be in the sleep state, the low-power wireless communication interface 198 may remain active and capable of communicating with other devices. For example, if the low-power wireless communication interface 198 is configured to communicate using BLE, then it may advertise its availability to nearby electronic devices at (1). This advertisement can consume substantially less battery power than would be required by the wireless communication interface 188 to advertise availability or remain ready for communication using classic Bluetooth.

At (2), a nearby mobile electronic device 102 in receipt of such an advertisement may notify the external storage device 166 that it would like to connect to the external storage device 166 (e.g. open and maintain a wireless communication channel, rather than exchange advertisements, notification, indications, and the like). For example, a user of the mobile electronic device 102 may wish to access data stored on the external storage device 166. The wireless communication interface 136 of the mobile electronic device 102 can transmit a request or notification to the external storage device using the appropriate low-power protocol.

Figure 7:
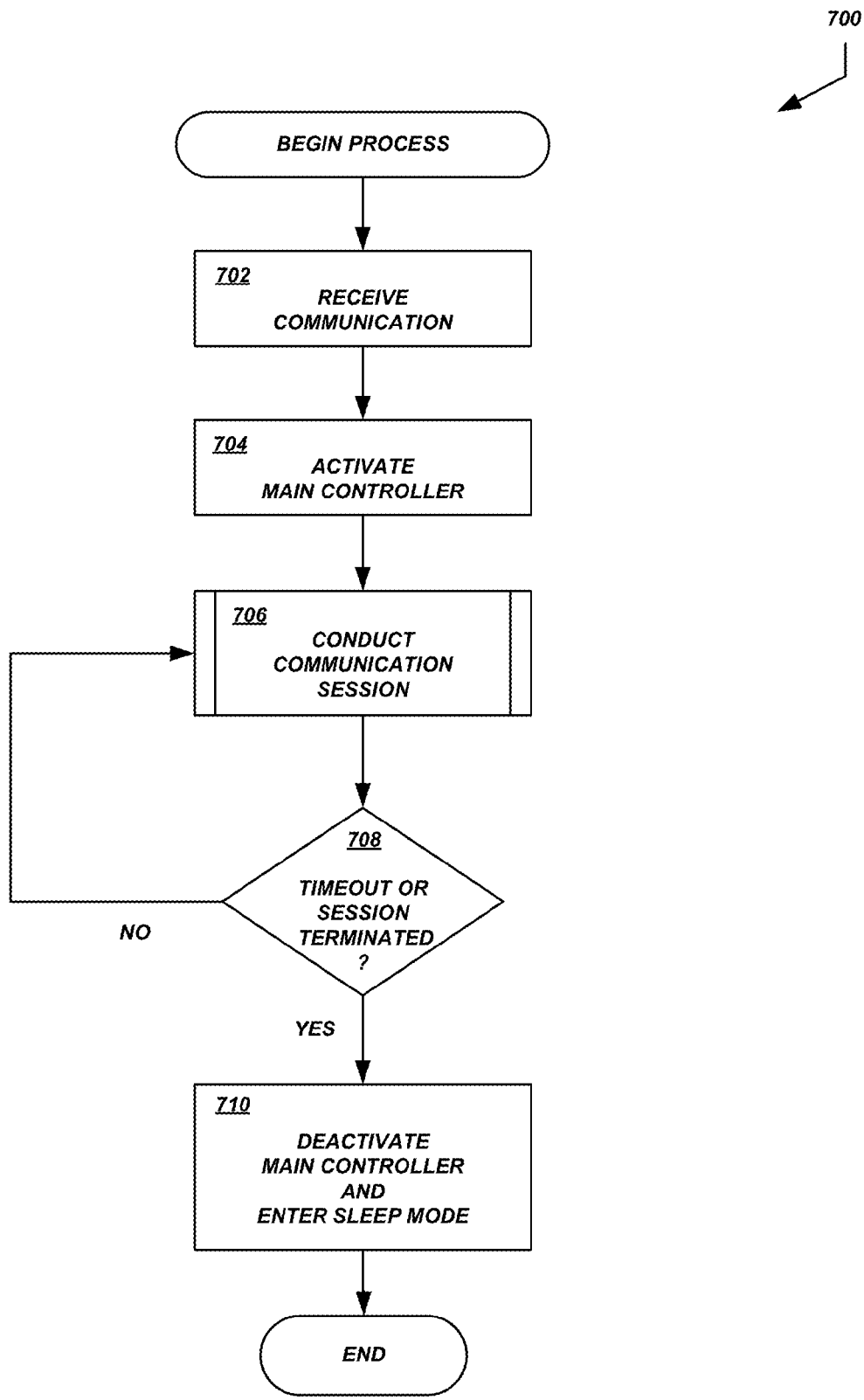
FIG. 7 shows an example process for activating components of an external storage device to provide communication-based services to a mobile electronic device.

FIG. 7 is a flow diagram of an illustrative process 700 that may be executed by the external storage device 166 to respond to notifications or requests received from other computing devices while the external storage device 166 is in the sleep state. The process may be implemented in a set of executable program instructions stored on a non-transitory computer-readable medium. The program instructions can be loaded into memory (e.g., RAM) and executed by a processor (e.g., the low-power MCU integrated with or in communication with the low-power communication interface 198). In some embodiments, the process 700 may be implemented in hardware, such as an integrated circuit.

At block 702, low-power communication interface 198 can receive a communication from another computing device, such as the notification received from the mobile electronic device 102 at (2), above.

At block 704, the low-power MCU can activate the main controller 184, wireless communication interface 188, and/or other components of the external storage device 166. The activation of the components from the sleep state can occur very quickly, thereby minimizing or reducing any latency perceived by a user of the mobile electronic device 102 when compared to communicating with an external storage device 166 that is not in sleep mode. For example, the activation of the external storage device 166 components may take less than about 1.0 second, less than about 0.5 seconds, or less than about 0.1 seconds.

At block 706, the main controller 184, wireless communication interface 188, and/or other components of the external electronic device 166 can conduct a communication session with the mobile electronic device 102. As shown in FIG. 6, the communication session may include the exchange of data at (4) between the mobile electronic device 102 and the external storage device 166, as described in greater detail above. The exchange of data may include the transmission or streaming of one or more files to the mobile electronic device 102 for use, the transmission of one or more files to the external storage device 166 for storage, or any other appropriate exchange.

At decision block 708, the low-power MCU can determine whether a communication timeout has occurred. If so, the process 700 can proceed to block 710, whether the main controller 184 and/or any other components activated in block 704 can return to sleep mode. If no timeout has occurred, the process may return to (or remain in) block 706, where the communication session is conducted. In some embodiments, a communication session may be terminated by one or both devices. In such cases, the MCU can return the components of the external storage device 166 to sleep mode without waiting for a timeout period to pass.

Returning to FIG. 6, the low-power wireless communication interface 198 may resume advertising availability at (6) after the main controller 184, normal power wireless communication interface 186, and/or other components of the external storage device 166 have resumed sleep mode at (5).

In some embodiments, the low-power wireless communication interface 198 may not advertise availability when other components of the external storage device 166 are in sleep mode. Instead, the lower-power wireless communication interface 198 may monitor various wireless frequencies or frequency bands—in a process referred to as "listening"—for requests, advertisements, or other communications from the mobile electronic device 102 (or other devices). The wireless communication interface 136 of the mobile electronic device 102 can initiate communication with the external storage device 166 while the external device 166 is in sleep mode by transmitting a request, notification, or other communication to the external storage device 166 using the appropriate low-power protocol. The wireless communication interface 198 can receive the communication and activate the main controller 184, wireless communication interface 188, and/or other components of the external storage device 166 in order to conduct a communication session with the mobile electronic device 102. Upon completion of the communication session, expiration of a timeout period after the last communication activity, or in response to some other determination, the main controller 184, normal power wireless communication interface 186, and/or other components of the external storage device 166 can resume sleep mode. The low-power wireless communication interface 198 may resume "listening" for communications.

Figure 8:
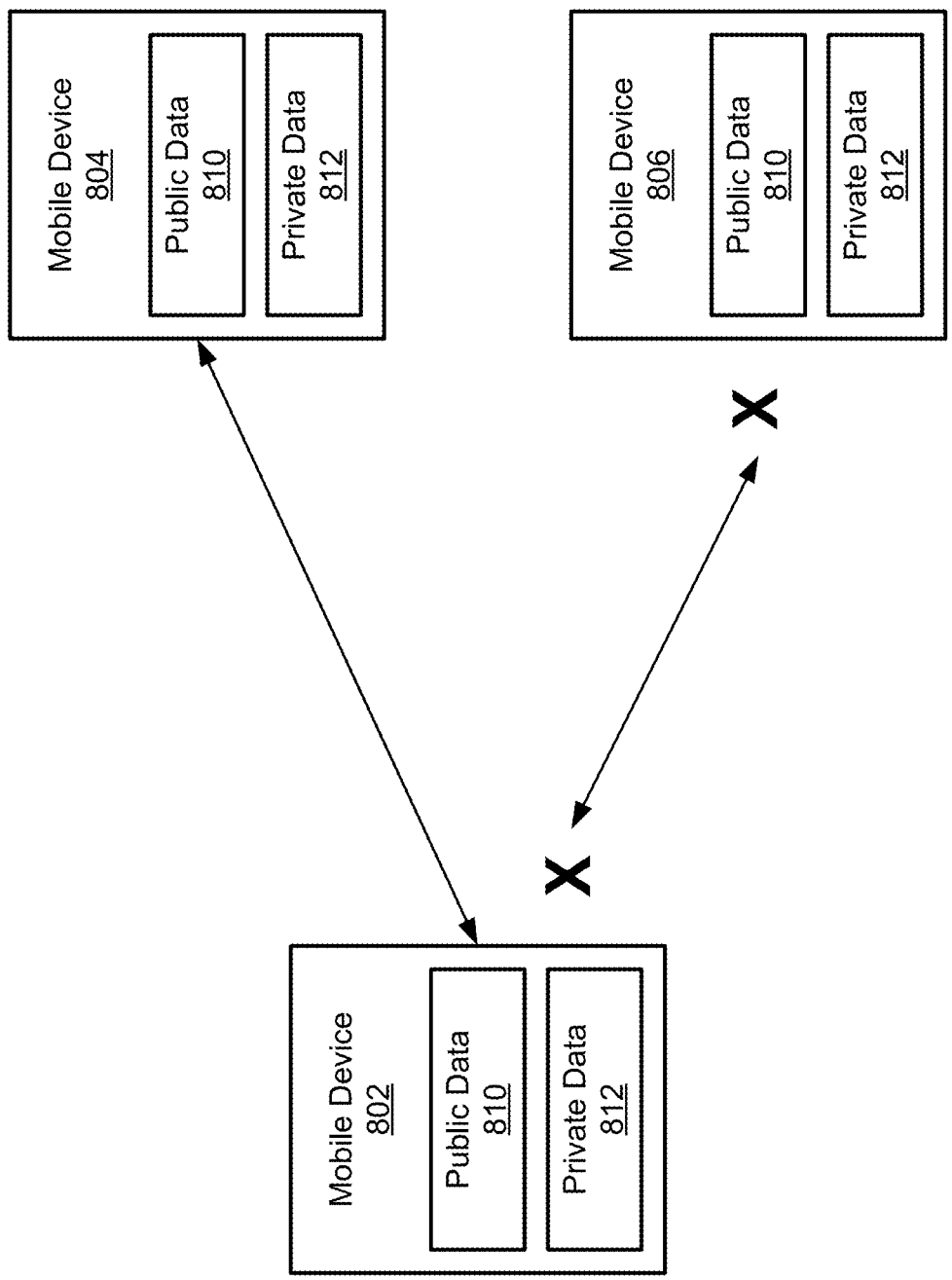
FIG. 8 shows an example embodiment of mobile devices configured to share public and/or private data.

With reference to FIG. 8, in various embodiments, mobile devices can exchange information with each other. The mobile devices 802, 804, and 806 can be cell phones (e.g., smart phones), tablet computers, wearable computing devices (e.g., smartwatches or smart bands), protective battery cases, external storage devices, or combinations thereof, etc. In some embodiments, wearable computing devices (e.g., smartwatches or smart bands) can communicate directly with each other (e.g., rather than to a host device such as a cell phone). The mobile devices 802, 804, and 806 can communicate by various wireless communication protocols, including Bluetooth, Bluetooth Low Energy, ZigBee, etc. The mobile devices 802, 804 and 806 can include features described in connection with the case 100, the mobile device 102, the file management system 138 (and other features discussed in connection with FIG. 2A), and the external storage device 166.

In some embodiments, the mobile devices 802, 804, 806 can include public data 810 and private data 812. The mobile devices can be configured to share the public data 810 more freely than the private data 812. For example, in some embodiments, the public data 810 can be shared without restriction (e.g., made available to all devices within the communication range). In some embodiments, the private data 812 can be restricted so that it cannot be shared with other devices, or so that it is only shared upon permission received from the user. In some embodiments, the public data 810 can be restricted to some degree as well. For example, the public data 810 can be shared only to approved devices, such as devices that the user has put onto an approved device list, or devices belonging to Facebook friends of the user. The mobile devices 802, 804, 806 can have several tiers of data with varying levels of restriction that are customizable by the user, although FIG. 8 only shows public data 810 and private data 812.

By way of example, the public data 810 of mobile device 802 can include the user's name and a link to the user's social medial (e.g., Facebook) profile. The private data 812 can include the photos, videos, calendar appointments, contacts, etc. The mobile device 802 can be configured to share the public data 810 only with devices on an approved list (e.g., specified previously by the user of device 802). Thus, device 802 can be configured to share the public data 810 with approved mobile device 804 (e.g., automatically when devices 802 and 804 are close enough for communication), and the device 802 can be configured to not share the public data 810 with unapproved mobile device 806.

The devices 802, 804, 806 can store data received from other devices, and the devices 802, 804, and 806, can store data associated with the interaction between devices (e.g., the identity of the other device or user, the time that the devices started the interaction, the time the devices stopped the interaction, and/or the duration of the interaction). Thus, when devices 802 and 804 come into communication proximity with each other, each device 802 and 804 can store that interaction time, and when the devices 802 and 804 move out of communication proximity, each device 802 and 804 can store that time as well. This information can be used by a searching element (e.g., similar to or the same as file searching element 192). For example, a user can submit a query such as, "who did I see last week while I was jogging," "who was at the party last night," or "how long did I see Mike yesterday." As discussed herein, the searching element can parse the query and can identify different categories of data (e.g., time: "last week," activity: "jogging,"). The searching element can use the stored data to determine who the user interacted with and when.

In some embodiments, a user interface can allow a user to enable or disable sharing of data (e.g., even public data 810 that would otherwise be shared). The user interface can allow a user to enable or disable receiving of data (e.g., even public data broadcast by other devices).

Figure 9:
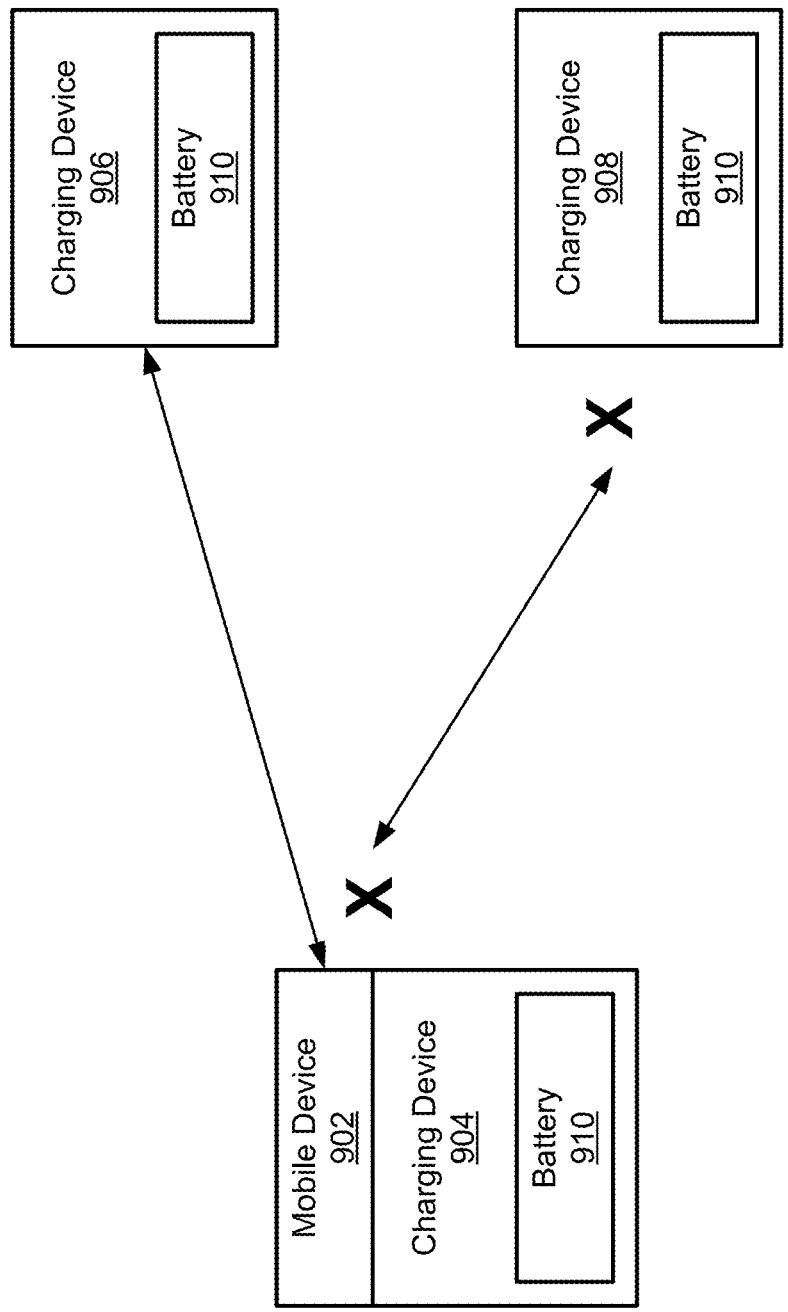
FIG. 9 shows an example embodiment of charging devices configured to share battery information with a mobile device.

With reference to FIG. 9, in some embodiments, charging devices 904, 906, and 908 having supplemental batteries 910 can share information regarding the available battery power of the supplemental batteries 910. In the example embodiment of FIG. 9, charging device 904 can be a battery case (e.g., battery case 100 discussed herein) coupled to the mobile device 902, and charging devices 906 and 908 can be external storage devices (e.g., external storage devices 166 discussed herein). The information can be communicated using various wireless communication protocols, including Bluetooth, Bluetooth Low Energy, ZigBee, etc. In some embodiments, the battery information can be transferred from the charging device 904 to the mobile device 902 via a wired connection (e.g., if the mobile device is mounted in a battery case charging device 904). In some embodiments, an external charging device 906 can communicate the battery information to the mobile device 902 directly, or relayed through the charging device 904 that is coupled to the mobile device 902.

In some embodiments, the charging devices 904, 906, 908 can provide the battery information in response to a request received from another device (e.g., from the mobile device 902, such as a cell phone, tablet computer, etc.). For example, a user can send a query from the mobile device 902 requesting information about available battery power. In the example of FIG. 9, the charging device 904 belongs to the user and is a battery case 100 coupled to the mobile device 902, the charging device 906 belongs to the user and is an external storage device 166 (e.g., in the user's backpack). The charging device 908 belongs to a different user and is within the wireless communication range. In some embodiments, the charging devices 904, 906, 908 can share the battery information only with approved devices. For example, the mobile device 902 can request battery information only from devices that are on a list of devices owned by the same user (e.g., charging devices 904 and 906). In some embodiments, the mobile device 902 can request battery information from all available sources (e.g., charging devices owned by the same user, charging devices owned by other users within the communication range, charging devices that are for sale or available for public use within the communication range). The battery information can be categorized and displayed on the mobile device 902. For example, a display can show the amount of battery power available on charging devices that belong to the user, on charging devices owned by other nearby users, on charging devices for sale nearby, etc.). In some embodiments, charging devices can transmit location information (e.g., GPS coordinates) to a mobile device 902 to help the user of the mobile device to find the charging device 906. The mobile device 902 can display a map showing the locations of available charging devices. The charging devices can include a user interface to allow a user to enable or disable the sharing of battery information from the charging devices, or to configure the parameters and restrictions of battery information sharing.

In some embodiments, the mobile device 902 can provide information about how long it will take for the battery of the mobile device 902 to become fully charged, for example, based on one or more of the current onto the battery, the current off of the battery, a battery charge decay algorithm, and a voltage output from the battery.

Figure 10:
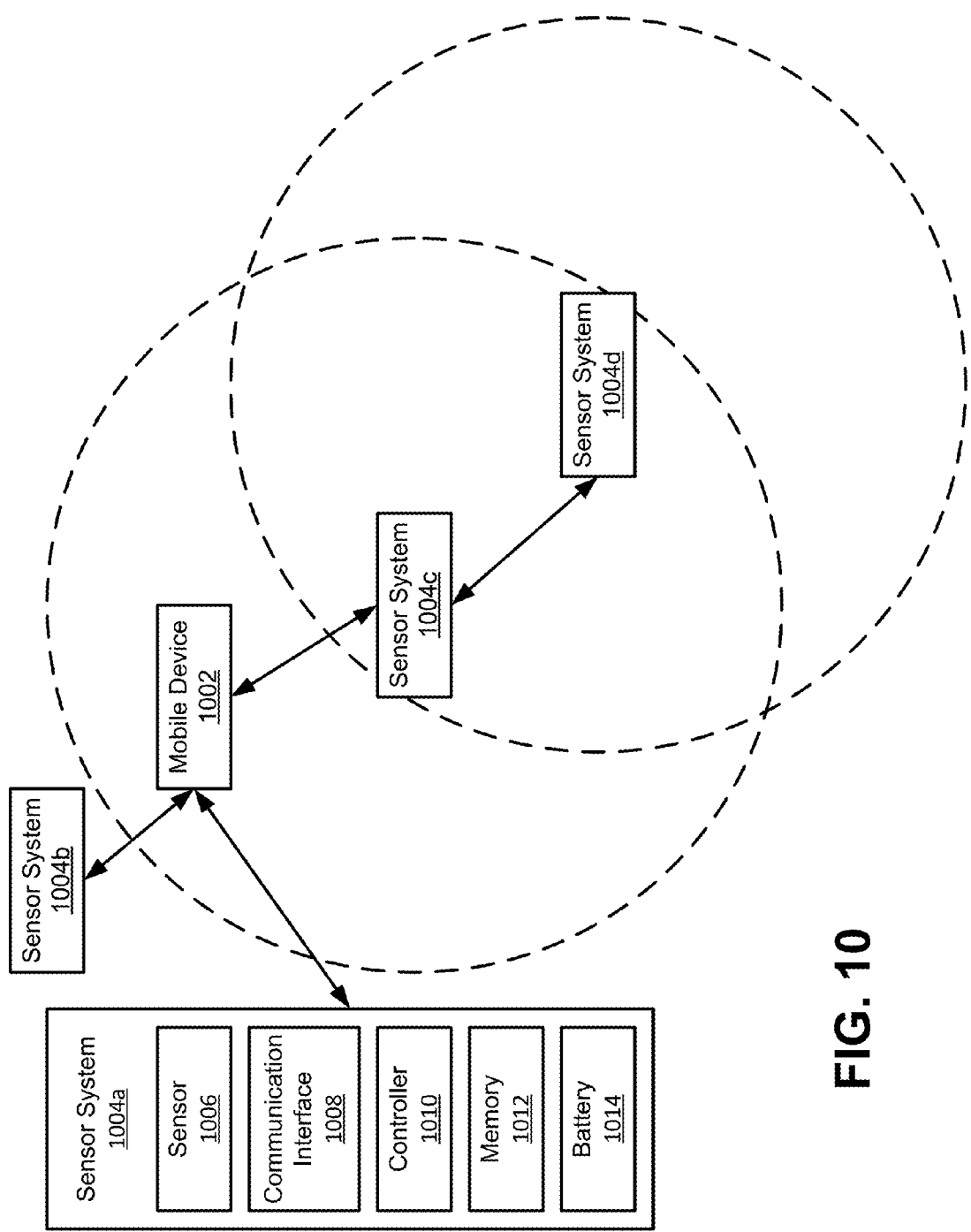
FIG. 10 shows an example embodiment of sensor systems configured to communicate information to a mobile device.

With reference to FIG. 10, in some embodiments, a mobile device 1002 can communicate wirelessly with sensor systems 1004a-d to gather information. For simplicity the components of the sensor systems 1004a-d are shown in connection with sensor system 1004a, and the other sensor systems 1004b-d can include similar components. The sensor system 1004a can include one or more sensors 1006 (e.g., a temperature sensor, a humidity sensor, a light sensor, a microphone, etc.). The sensor system 1004a can include a communication interface 1008 configured to communicate with the mobile device 1002 and/or with other sensor systems 1004b-d by a wireless communication protocol (e.g., Bluetooth, Bluetooth Low Energy, Wifi, ZigBee, etc.). In some embodiments, Bluetooth Low Energy can be used because of its low power consumption. The sensor system 1004a can include a controller 1010 configured to operate the components of the sensor system 1004a as discussed herein. The sensor system 1004a can include memory 1012, which can store information collected by the one or more sensors 1006. In some embodiments, the memory 1012 can store the information from a sensor 1006 for a time (e.g., one day, two days, four days, one week, or two weeks, etc.), and after that time, the controller 1010 can calculate average values to be stored in the memory 1012 (e.g., daily averages, weekly averages, etc.). The sensor system 1004a can include a battery 1014 to provide power to the components of the sensor system 1004a. The sensor system 1004a can be configured to consume very little power such that a small battery (e.g., a button cell battery) can operate the sensor system 1004a for extended periods of time (e.g., days, months, or years).

The sensor systems 1004a-d can be configured to send information to a mobile device 1002 in response to a query sent by the mobile device 1002. For example, a user can use the mobile device 1002 to send a query asking for temperature information. A sensor system 1004a-d having a temperature sensor that is within communication range can send temperature information to the mobile device in response to the query. The mobile device 1002 can request past information (e.g., what was the temperature at this location 2 hours ago, or yesterday, or last week). The sensor system 1004*a-d* can access past information from the memory and send the information to the mobile device 1002.

In some embodiments, information can be relayed from one sensor system 1004*d* to another 1004*c*. In the embodiment of FIG. 10, the mobile device 1002 is within the communication range of sensor system 1004*c*, but not 1004*d*. Information from sensor system 1004*d* can be sent to sensor system 1004*c*, which can send the information to the mobile device 1002. By way of example, mobile device 1002 can request humidity information. If the sensor systems 1004*a-c* that are within direct communication range of the mobile device 1002 cannot provide the requested humidity information, the sensor systems 1004*a-c* can relay the request to other sensor systems 1004*d* that are out of direct communication range with the mobile device 1002. In FIG. 10, sensor system 1004*c* (e.g., which can include a temperature sensor) can relay the request for humidity information to the sensor system 1004*d* (which can include a humidity sensor). The sensor system 1004*d* can send the requested humidity information to the sensor system 1004*c*, and the sensor system 1004*c* can send the requested humidity information to the mobile device 1004*b*. In some embodiments, the memory 1012 of the sensor system can store information about the other surrounding sensor systems so that the sensor systems 1004*a-d* can appropriately direct queries to other sensor systems 1004*a-d*.

Sensor systems 1004*a-d* can be used in connection with building automation systems (e.g., home automation systems). As discussed above, sensors can detect the presence of a user in a room. Sensor systems 1004*a-d* can be used to detect environmental information as discussed herein (e.g., temperature, humidity, light levels, sound volume). An automation controller can change parameters based on the user presence information and/or the environmental information. The automation controller can use various different communication protocols. For example, a relatively short-range communication protocol (e.g., Bluetooth or Bluetooth Low Energy) can be used by the automation controller to communicate with sensor systems 1004*a-d* and devices within short ranges. A longer-range communication protocol (e.g., Wifi) can be used to communicate with sensor systems 1004*a-d* and devices at longer ranges. In some embodiments, the automation controller can include, or be in communication with, a router (e.g., 4G router) which can enable communication with remote devices. In some embodiments, the automation controller can communicate with remove devices via the internet.

In some embodiments, content providing devices can be used to download content (e.g., videos). For example, videos and other content can be downloaded by a cell phone, a tablet computer, a laptop, a personal computer, a smart TV, a DVR system, etc. In some instances, a user must wait for the video to at least partially download before the user can begin to watch the video. In some embodiments, a content providing device can predict videos and/or other content that a user is likely to want and can pre-download that content before the user has requested to view the content. Thus, if the user later requests to view the pre-downloaded content, the user can view the content without waiting for the content to be downloaded. By way of example, if a user requests to watch one episode of a show, the content providing device can also download one or more of the subsequent episodes of that show. In some embodiments, the pre-downloaded content can be stored in a restricted (e.g., encrypted) manner so that the user cannot view the pre-downloaded content until that content is paid for.

One or more of the features illustrated in the drawings and/or described herein may be rearranged and/or combined into a single component or embodied in several components. Additional components may also be added. While certain example embodiments have been described and shown in the accompanying drawings, it is to be understood that such embodiments are merely illustrative of and not restrictive. Thus, the inventions are not limited to the specific constructions and arrangements shown and described, since various other modifications may occur to those ordinarily skilled in the art based on the present disclosure.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Method step and/or actions disclosed herein can be performed in conjunction with each other, and steps and/or actions can be further divided into additional steps and/or actions.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA), or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine, etc. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

It is to be understood that the claims are not limited to the precise configuration and components illustrated above. Various modifications, changes and variations may be made in the arrangement, operation and details of the methods and apparatus described above.

The following is claimed:

1. A system comprising:
   a case configured to receive a mobile electronic device, the case comprising:
      a top wall;
      a bottom wall;
      a power output interface coupled to the bottom wall, the power output interface configured to engage a power input interface of the mobile electronic device, wherein the top wall is movable with respect to the power output interface from a first position in which the case is permitted to be removably attached to the mobile electronic device to a second position in which detachment of the case from the mobile electronic device is inhibited by engagement of the power output interface with the power input interface;
      a battery, wherein the power output interface is configured to convey electrical power from the battery;
      an indicator component configured to indicate an amount of power in the battery; and
      a non-transitory computer-readable case memory configured to store data accessible by at least the mobile electronic device via the power output interface; and
   a non-transitory computer readable medium having stored thereon a file management system configured to run on the mobile electronic device, the file management system configured to at least:
      provide, to a media player executing on the mobile electronic device, access to a first media file in the case memory using a server-based communication protocol; and
      provide, to the media player, access to a second media file in memory of the mobile electronic device using a local storage access protocol.

2. The system of claim 1, wherein the file management system is further configured to at least cause the mobile electronic device to transmit the media file to a second mobile electronic device via a wireless communication channel.

3. The system of claim 1, wherein the file management system is further configured to store metadata in connection with the first media file, the metadata comprising a tag defined by a user.

4. The system of claim 3, wherein the tag comprises an audio recording.

5. A system comprising:
   a case configured to removably attach to a mobile electronic device, the case comprising:
      a battery;
      a non-transitory computer-readable case memory; and
      an output interface configured to at least:
         engage an input interface of the mobile electronic device;
         convey electrical power from the battery to the input interface of the mobile electronic device; and
         provide the mobile electronic device access to data stored in the case memory; and
   a non-transitory computer readable medium having stored thereon a file management system configured to run on the mobile electronic device, the file management system configured to at least provide, to an application executing on the mobile electronic device, access to data in the case memory.

6. A combination of the system of claim 5 and the mobile electronic device.

7. The system of claim 5, wherein the file management system is configured to provide access to the data in the case memory using a server-based communication protocol.

8. The system of claim 5, wherein the file management system is further configured to at least cause the mobile electronic device to transmit the data stored in the case memory to a second mobile electronic device via a wireless communication channel.

9. The system of claim 5, wherein the file management system is further configured to at least provide access to data in memory of the mobile electronic device using a local storage access protocol.

10. The system of claim 5, wherein the file management system is further configured to at least store metadata in connection with a file stored in the case memory.

11. The system of claim 10, wherein the metadata comprises a tag defined by a user.

12. The system of claim 10, wherein the metadata comprises a tag generated based at least partly on calendar data stored in memory of the mobile electronic device.

13. The system of claim 5, wherein the file management system is further configured to provide access to a file stored in the case memory by transmitting, to a remote electronic device, a link to the file stored in the case memory.

14. The system of claim 5, wherein the file management system is further configured to at least search a plurality of mobile electronic devices for a file meeting user-supplied search criteria.

15. The system of claim 14, wherein the file management system is further configured to search the plurality of mobile electronic devices using at least two different network connections in response to a single search request.

16. The system of claim 14, wherein the file management system is further configured to search the plurality of mobile electronic devices by communicating with file management systems executing on the plurality of mobile electronic devices.

17. The system of claim 14, wherein the file management system is further configured to at least enable modification of a search result file stored on a remote mobile electronic device of the plurality of mobile electronic devices.

18. The system of claim 5, wherein the file management system is further configured to at least enable presentation of a sequence of two or more media files, wherein at least a first media file of the two or more media files is retrieved from a first remote mobile electronic device, and wherein at least a second media file of the two or more media files is retrieved from a second remote mobile electronic device.

19. The system of claim 18, wherein the sequence of two or more media files comprises a playlist of audio files or a slide show of image files.

20. The system of claim 5, wherein the file management system is configured to search for a file based at least in part on user activity information.

21. The system of claim 20, wherein the user activity information comprises an indication of an activity that the user was performing when the file was created or modified.

22. A method of manufacturing a case, the method comprising:
  providing a housing configured to removably attach to a mobile electronic device, the housing comprising a battery and a non-transitory computer-readable case memory;
  providing an output interface configured to engage an input interface of the mobile electronic device, wherein the output interface is further configured to convey electrical power from the battery to a input interface, and wherein the output interface is further configured to provide access to data stored in the case memory;
  attaching the output interface to the housing; and
  providing a non-transitory computer readable medium having stored thereon a file management system configured to run on the mobile electronic device, the file management system configured to at least provide, to an application executing on the mobile electronic device, access to data in the case memory.

23. An electronic storage device comprising:
  a first wireless communication interface;
  a second wireless communication interface configured to consume less power than the first wireless communication interface during operation; and
  a computing device configured to at least:
    transmit, using the second wireless communication interface, indicators regarding availability of the electronic storage device;
    receive, using the second wireless communication interface, a communication from a mobile electronic device; and
    in response to the communication:
      activate the first wireless communication interface, wherein the electronic storage device transmits data to the mobile electronic device using the first wireless communication interface subsequent to activation of the first wireless communication interface; and
      subsequent to transmitting the data to the mobile electronic device using the first wireless communication interface, deactivate the first wireless communication interface.

* * * * *